(12) United States Patent
Fujii

(10) Patent No.: US 9,221,991 B2
(45) Date of Patent: Dec. 29, 2015

(54) COPOLYMER, AQUEOUS COATING COMPOSITION CONTAINING COPOLYMER, AND METHOD FOR FORMING MULTILAYER COATING FILM

(75) Inventor: Takeshi Fujii, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 711 days.

(21) Appl. No.: 13/500,939

(22) PCT Filed: Sep. 8, 2010

(86) PCT No.: PCT/JP2010/065880
§ 371 (c)(1),
(2), (4) Date: Apr. 9, 2012

(87) PCT Pub. No.: WO2011/052304
PCT Pub. Date: May 5, 2011

(65) Prior Publication Data
US 2012/0202082 A1     Aug. 9, 2012

(30) Foreign Application Priority Data

Oct. 29, 2009   (JP) ................................ 2009-249204
Feb. 15, 2010   (JP) ................................ 2010-030442
Mar. 30, 2010   (JP) ................................ 2010-079177

(51) Int. Cl.
| | |
|---|---|
| *C09D 175/04* | (2006.01) |
| *C09D 151/06* | (2006.01) |
| *C09D 7/00* | (2006.01) |
| *C09D 5/38* | (2006.01) |
| *C09D 5/44* | (2006.01) |
| *C09D 5/29* | (2006.01) |
| *C09D 133/08* | (2006.01) |
| *C08F 265/04* | (2006.01) |
| *C08F 226/10* | (2006.01) |
| *C08F 220/28* | (2006.01) |
| *C08F 220/56* | (2006.01) |
| *C08G 18/08* | (2006.01) |
| *C08G 18/81* | (2006.01) |
| *C08G 18/62* | (2006.01) |
| *B05D 7/00* | (2006.01) |
| *C08L 33/06* | (2006.01) |

(Continued)

(52) U.S. Cl.
CPC .............. *C09D 133/08* (2013.01); *B05D 7/532* (2013.01); *B05D 7/572* (2013.01); *C08F 220/28* (2013.01); *C08F 220/56* (2013.01); *C08F 226/10* (2013.01); *C08F 265/04* (2013.01); *C08G 18/0866* (2013.01); *C08G 18/6229* (2013.01); *C08G 18/8116* (2013.01); *C09D 5/29* (2013.01); *C09D 5/38* (2013.01); *C09D 5/4457* (2013.01); *C09D 7/002* (2013.01); *C09D 151/06* (2013.01); *C09D 175/04* (2013.01); *C08L 33/064* (2013.01); *C08L 33/066* (2013.01); *C08L 51/06* (2013.01); *C08L 67/02* (2013.01); *Y10T 428/31725* (2015.04); *Y10T 428/31931* (2015.04); *Y10T 428/31935* (2015.04)

(58) Field of Classification Search
CPC .... C09D 175/04; C09D 151/06; C09D 7/002; C09D 5/4457; C09D 5/38; C09D 5/29; C09D 133/08; C08F 265/04; C08F 226/10; C08F 220/56; C08F 220/28; C08G 18/0866; C08G 18/6229; C08G 18/8116; B05D 7/532; B05D 7/572; C08L 33/064; C08L 33/066; C08L 51/06; C08L 67/02; Y10T 428/31725; Y10T 428/31931; Y10T 428/31935
USPC ........................................................ 524/555
See application file for complete search history.

(56) References Cited

U.S. PATENT DOCUMENTS

| | | |
|---|---|---|
| 5,770,648 A | 6/1998 | Antonelli et al. |
| 6,107,392 A | 8/2000 | Antonelli et al. |
| 2005/0159555 A1 | 7/2005 | Shimanaka et al. |

(Continued)

FOREIGN PATENT DOCUMENTS

| | | |
|---|---|---|
| EP | 1 555 274 | 7/2005 |
| JP | 9-501732 | 2/1997 |

(Continued)

OTHER PUBLICATIONS

International Search Report issued Dec. 21, 2010 in International (PCT) Application No. PCT/JP2010/065880, of which the present application is the national stage.

(Continued)

*Primary Examiner* — Angela C Scott
(74) *Attorney, Agent, or Firm* — Wenderoth, Lind & Ponack, L.L.P.

(57) ABSTRACT

An object of the present invention is to provide a copolymer having the characteristic of developing high viscosity, and lowering its viscosity with an increase in rate of shear, particularly a copolymer having the characteristic of developing viscosity, and lowering its viscosity with an increase in rate of shear even in an aqueous coating composition that contains a surfactant. The present invention provides a copolymer obtainable by copolymerization of a monomer component (m) that includes: (m-1), a macromonomer having (i) a backbone that comprises a polymer chain having a number average molecular weight of 1,000 to 10,000 obtainable by polymerizing a monomer component (I) that contains 5 to 100 mass % of a C4-C24 alkyl-containing polymerizable unsaturated monomer (a), and (ii) a polymerizable unsaturated group; and (m-2) a polymerizable unsaturated monomer containing a hydrophilic group.

8 Claims, No Drawings

(51) Int. Cl.
*C08L 51/06* (2006.01)
*C08L 67/02* (2006.01)

(56) References Cited

U.S. PATENT DOCUMENTS

| | | |
|---|---|---|
| 2006/0100350 A1 | 5/2006 | Barsotti et al. |
| 2008/0139738 A1 | 6/2008 | Ma |
| 2009/0252879 A1* | 10/2009 | Yukawa et al. ............ 427/372.2 |
| 2012/0022205 A1 | 1/2012 | Fujii |

FOREIGN PATENT DOCUMENTS

| | | |
|---|---|---|
| JP | 09-272796 | 10/1997 |
| JP | 2000-001662 | 1/2000 |
| JP | 2001-503098 | 3/2001 |
| JP | 2002-194037 | 7/2002 |
| JP | 2005-232443 | 9/2005 |
| WO | 2007/126134 | 11/2007 |
| WO | 2009/075389 | 6/2009 |
| WO | 2010/101196 | 9/2010 |

OTHER PUBLICATIONS

Written Opinion issued Dec. 21, 2010 in International (PCT) Application No. PCT/JP2010/065880, of which the present application is the national stage.

* cited by examiner

COPOLYMER, AQUEOUS COATING COMPOSITION CONTAINING COPOLYMER, AND METHOD FOR FORMING MULTILAYER COATING FILM

TECHNICAL FIELD

The present invention relates to copolymers, and viscosity-controlling agents including the same. Specifically, the invention relates to additives for coating compositions, particularly to copolymers suitable as viscosity-controlling agents that can develop viscosity in aqueous coating compositions that contain surfactants. The invention also relates to aqueous coating compositions that contain such copolymers, and methods for forming multilayer coating films using such aqueous coating compositions.

CROSS-REFERENCE TO RELATED APPLICATIONS

This application claims priority to JP Application No. 2009-249204, filed Oct. 29, 2009, JP Application No. 2010-30442, filed Feb. 15, 2010, and JP Application No. 2010-79177, filed Mar. 30, 2010, the disclosure of which is incorporated herein by reference in its entirety.

BACKGROUND ART

Objects (substrates) to be coated that require high levels of appearance, such as automobiles, are generally painted using methods that employ atomization of coating compositions, in consideration of, for example, the appearance of the coating film formed, and production efficiency. Spray painting and rotational atomizing painting are specific examples of such painting methods.

Generally, the coating composition used for atomization painting should preferably have low viscosity, and form small granules when released in a spray or when atomized as in, for example, rotational atomization, in order to produce a coating film with excellent smoothness. Once applied to the substrate to be coated, the coating composition should preferably have high viscosity, which discourages mixing with the overlaid coating composition and produces a coating film with excellent distinctness of image (hereinafter referred to as DOI). When the coating composition contains a luster pigment such as an aluminium pigment, the high coating composition viscosity after the composition has been applied to the substrate restricts the movement of the luster pigment in the coating composition, and thus produces a coating film that has good luster. Generally, a coating film with good luster is one in which brightness changes over a wide range depending on the viewing angle of the coating film, and in which the luster pigment in the coating film is relatively uniform, thus producing hardly any metallic mottling. Coating films that exhibit such large brightness changes depending on the viewing angle are generally described as having a high flip-flop property.

For these reasons, in terms of forming a coating film having superior appearance, it is preferable that the coating composition have low viscosity under high rate of shear as in atomizing, and high viscosity under low rate of shear after the application. In other words, it is preferable that the coating composition be one in which the viscosity decreases with an increase in rate of shear.

Such a coating composition that lowers its viscosity while increasing rate of shear can be produced using, for example, a method in which an associated thickener is blended into the coating composition. The associated thickener is generally a thickener that includes a hydrophilic portion and a hydrophobic portion per molecule, and that effectively exhibits a thickening effect with the network structure formed in an aqueous medium by the adsorption of the hydrophobic portion onto the surfaces of the pigments or emulsion granules in the coating composition, or by the association of the hydrophobic portions.

The associated thickener generally develops viscosity with the network structure formed by hydrophobic interaction. Associative strength is relatively weak in hydrophobic interaction, and as such the network structure is disrupted and the viscosity decreases upon applying a large shear force. Specifically, the coating composition containing the associated thickener has the characteristic of lowering its viscosity with an increase in rate of shear.

Recent concerns over environmental pollution caused by the vaporization of organic solvents have led to the development of aqueous coating compositions.

Aqueous coating compositions may typically include a surfactant used to disperse a hydrophobic resin component in water.

However, the use of the associated thickener in such aqueous coating compositions containing a surfactant is problematic, because the viscosity-developing effect of the associated thickener may become weak, and DOI or luster of the resulting coating film may be lowered. Specifically, because the aqueous coating composition has low viscosity upon being applied to the substrate to be coated, the coating composition may mix with the overlaid coating composition and lower DOI of the resulting coating film; or the luster pigments, when contained in the aqueous coating composition, may move in the coating composition upon application and disorient themselves, lowering the flip-flop property or causing metallic mottling. Attempts to increase the viscosity upon application by increasing the content of the associated thickener in the aqueous coating composition often result in a coating film with poor smoothness, because the increased thickener content also increases the viscosity under high rate of shear, and increases the size of the coating composition granules produced when atomizing the coating composition.

For example, Patent Literature 1 describes a viscosity-controlling agent that includes a hydrophobic portion and a hydrophilic portion, obtained by hydrophobic modification of a hydrophilic polymer, and/or hydrophilic modification of a hydrophobic polymer. The viscosity-controlling agent is described as being capable of reducing the concentration dependence of the aqueous dispersion viscosity. Further, according to this publication, an aqueous coating composition that uses the viscosity-controlling agent can exhibit stable flowability, and can stably produce a coating film with a good finish, regardless of the paint conditions, particularly the temperature and humidity conditions. However, viscosity development by the viscosity-controlling agent is not always sufficient. Specifically, sufficient viscosity may not be obtained when the viscosity-controlling agent is used in a coating composition that contains a surfactant. In this case, the resulting coating film may suffer from poor DOI and poor flip-flop property, or may produce metallic mottling.

Patent Literature 2 describes an associated thickener produced by adding one molecule of alkenyl succinic anhydride or alkyl succinic anhydride to a polyethylene glycol compound for each of at least two amino groups attached to the ends of the polyethylene glycol compound molecule. The associated thickener is described as being desirable as a thickener for latexes and aqueous coating compositions for its ability to improve the ease of solution adjustment without accompanying large viscosity changes following changes in the amount of associated thickener used, and to make quality control of the products easier. However, viscosity development by the associated thickener is not always sufficient. Specifically, sufficient viscosity may not be obtained when the associated thickener is used in a coating composition that contains a surfactant. In this case, the resulting coating film may suffer from poor DOI and poor flip-flop property, or may produce metallic mottling.

Patent Literature 3 describes an aqueous coating composition that includes an emulsion resin (A) of a specific structure, a specific viscosity-controlling agent (B), and a hydrophobic solvent (C). The aqueous coating composition is described as being capable of forming a coating film that has reduced metallic mottling, and excellent flip-flop property and smoothness. However, a coating film with sufficient DOI and luster, or a coating film with sufficient water resistance cannot always be obtained even with the use of this aqueous coating composition.

CITATION LIST

Patent Literature

PTL 1: Japanese Unexamined Patent Publication No. 2000-1662
PTL 2: Japanese Unexamined Patent Publication No. 1997-272796
PTL 3: Pamphlet of WO2007/126134

SUMMARY OF INVENTION

Technical Problem

It is an object of the present invention to provide a copolymer having the characteristic of easily developing viscosity, and lowering its viscosity with an increase in rate of shear, particularly a copolymer having the characteristic of developing viscosity, and lowering its viscosity with an increase in rate of shear, even in an aqueous coating composition that contains a surfactant. Another object of the present invention is to provide a coating composition that contains the copolymer, and with which a coating film having superior DOI can be formed. It is another object of the invention to provide a coating composition that includes the copolymer and a luster pigment, and with which a coating film having superior luster with a high flip-flop property and suppressed metallic mottling can be formed. Yet another object of the invention is to provide a coating film-forming method that uses the coating composition, and an article painted with the coating composition.

Solution to Problem

The present inventors conducted intensive studies to achieve the foregoing objects, and found that a copolymer of a graft polymer structure containing a main chain as obtainable by polymerizing a monomer component that includes a polymerizable unsaturated monomer containing a hydrophilic group, and a side chain as a relatively high molecular weight polymer obtainable by polymerizing a monomer component that contains a specific polymerizable unsaturated monomer has the characteristic of easily developing viscosity, and lowering its viscosity with an increase in rate of shear. Specifically, the copolymer has the characteristic of developing viscosity, and lowering its viscosity with an increase in rate of shear even in an aqueous coating composition that contains a surfactant.

Specifically, the present invention provides a copolymer, a viscosity-controlling agent including the same, an aqueous coating composition containing the copolymer, a coating film-forming method that uses the aqueous coating composition, and an article painted with the aqueous coating composition.

Item 1. A copolymer obtainable by copolymerization of a monomer component (m) comprising:
(m-1) a macromonomer having (i) a backbone that comprises a polymer chain having a number average molecular weight of 1,000 to 10,000 obtainable by polymerizing a monomer component (I) that contains 5 to 100 mass % of a C4-C24 alkyl-containing polymerizable unsaturated monomer (a), and (ii) a polymerizable unsaturated group; and
(m-2) a polymerizable unsaturated monomer containing a hydrophilic group.

Item 2. The copolymer according to Item 1, wherein component (m-2) is at least one nonionic polymerizable unsaturated monomer containing a hydrophilic group selected from the group consisting of N-substituted (meth)acrylamide, polymerizable unsaturated monomer having a polyoxyalkylene chain, and N-vinyl-2-pyrrolidone, and wherein the content of component (m-1) is in a range of from 1 to 29 mass %, and the content of component (m-2) is in a range of from 20 to 99 mass %, based on the total mass of monomer component (m).

Item 3. The copolymer according to Item 1 or 2, wherein monomer component (I) contains, at least a part thereof, 5 to 60 mass % of a hydroxy-containing polymerizable unsaturated monomer, based on the total mass of monomer component (I).

Item 4. The copolymer according to any one of Items 1 or 3, wherein component (m-2) is at least one kind of polymerizable unsaturated monomer containing a hydrophilic group selected from the group consisting of acrylic acid and methacrylic acid, and wherein the content of component (m-1) is in a range of from 1 to 40 mass %, and the content of component (m-2) is in a range of from 5 to 75 mass %, based on the total mass of monomer component (m).

Item 5. An aqueous coating composition containing the copolymer according to any one of Items 1 to 4 and a film-forming resin (A).

Item 6. The aqueous coating composition according to Item 5, wherein the film-forming resin (A) is a water-dispersible hydroxy-containing acrylic resin (A1') having an acid value of 1 to 100 mg KOH/g and a hydroxy value of 1 to 100 mg KOH/g, obtainable through copolymerization of monomer component (b) comprising 5 to 70 mass % of a hydrophobic polymerizable unsaturated monomer (b-1), 0.1 to 25 mass % of a hydroxy-containing polymerizable unsaturated monomer (b-2), 0.1 to 20 mass % of a carboxy-containing polymerizable unsaturated monomer (b-3), and 0 to 94.8 mass % of a polymerizable unsaturated monomer (b-4) other than the polymerizable unsaturated monomers (b-1) to (b-3).

Item 7. The aqueous coating composition according to Item 5 or 6, wherein component (m-2) is at least one kind of polymerizable unsaturated monomer selected from the group consisting of N-substituted (meth)acrylamide, polymerizable unsaturated monomer having a polyoxyalkylene chain, N-vinyl-2-pyrrolidone, 2-hydroxyethyl acrylate, acrylic acid and methacrylic acid.

Item 8. The aqueous coating composition according to any one of Items 5 to 7, wherein monomer component (m) contains 1 to 40 mass % of component (m-1) and 5 to 99 mass % of component (m-2), based on the total mass of monomer component (m).

Item 9. The aqueous coating composition according to any one of Items 6 to 8, wherein the water-dispersible hydroxy-containing acrylic resin (A1') is a core-shell-type water-dispersible hydroxy-containing acrylic resin (A1'-1), which has a core-shell structure having, as a core, copolymer (I) containing, as monomer components, 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule, based on the total mass of monomer components constituting the core, and wherein the core-shell-type water-dispersible hydroxy-containing acrylic resin (A1'-1) contains 5 to 70 mass % of a hydrophobic polymerizable unsaturated monomer (b-1), 0.1 to 25 mass % of a hydroxy-containing polymerizable unsaturated monomer (b-2), 0.1 to 20 mass % of carboxy-containing polymerizable unsaturated monomer (b-3), and 0 to 94.8 mass % of a polymerizable unsaturated monomer (b-4) other than the polymerizable unsaturated monomers (b-1) to (b-3), based on the total mass of monomer components constituting the core and the shell.

Item 10. The aqueous coating composition according to any one of Items 6 to 8, wherein the water-dispersible hydroxy-containing acrylic resin (A1') is a core-shell-type water-dispersible hydroxy-containing acrylic resin (A1'-2) comprising a core portion that is a copolymer (I) consisting of, as monomer components, about 0.1 to 30 mass % of a polymerizable unsaturated monomer having two or more polymerizable unsaturated groups per molecule and about 70 to 99.9 mass % of a polymerizable unsaturated monomer having one polymerizable unsaturated group per molecule; and a shell portion that is a copolymer (II) consisting of, as monomer components, 5 to 80 mass % of a hydrophobic polymerizable unsaturated monomer (b-1), 0.1 to 50 mass % of a hydroxy-containing polymerizable unsaturated monomer (b-2), 0.1 to 50 mass % of a carboxy-containing polymerizable unsaturated monomer (b-3), and 0 to 94.8 mass % of polymerizable unsaturated monomer (b-4) other than the polymerizable unsaturated monomers (b-1) to (b-3), and wherein the solids content mass ratio of copolymer (I) to copolymer (II) is in a range of 5/95 to 95/5.

Item 11. Item The aqueous coating composition according to any one of Items 5 to 10, wherein the film-forming resin (A) is a resin having an ester bond.

Item 12. The aqueous coating composition according to any one of Items 0.5 to 11, wherein the film-forming resin (A) is a water-dispersible acrylic resin obtainable by emulsion polymerization using a surfactant.

Item 13. An article coated with the aqueous coating composition according to any one of Items 5 to 12.

Item 14. A method for forming a multilayer coating film, comprising the steps of:
(1) applying the aqueous coating composition according to any one of Items 5 to 12 to an object to form a base coating film;
(2) applying a clear coating composition on an uncured base coating film to form a clear coating film; and
(3) heating the uncured base coating film and uncured clear coating film to simultaneously cure both coating films.

Item 15. A method for forming a multilayer coating film, comprising the steps of:
(1) applying a first coloring coating composition to an object to form a first colored coating film;
(2) applying the aqueous coating composition according to any one of Items 5 to 12 on the uncured first colored coating film to form a second colored coating film;
(3) applying a clear coating composition on the uncured second colored coating film to form a clear coating film; and
(4) simultaneously heat-curing the uncured first colored coating film, uncured second colored coating film, and uncured clear coating film.

Item 16. An article having a multilayer coating film formed by the method according to Item 14 or 15.

Item 17. A viscosity-controlling agent comprising the copolymer according to any one of Items 1 to 4.

Advantageous Effects of Invention

A copolymer of the present invention has the characteristic of easily developing viscosity, and lowering its viscosity with an increase in rate of shear. Specifically, the copolymer has the characteristic of developing viscosity, and lowering its viscosity with an increase in rate of shear even in an aqueous coating composition that contains a surfactant. An aqueous coating composition of the present invention can be used to form a coating film having superior DOI. Further, an aqueous coating composition of the present invention can be used to form a coating film that has high flip-flop property, and superior luster with suppressed metallic mottling.

DESCRIPTION OF EMBODIMENTS

A copolymer of the present invention is described below in detail.

I. Copolymer of the Present Invention

A copolymer of the present invention can be obtained by copolymerization of a monomer component (m) that includes:
(m-1) a macromonomer having (i) a backbone that comprises a polymer chain having a number average molecular weight of 1,000 to 10,000 obtainable by polymerizing a monomer component (I) that contains 5 to 100 mass % of a C4-C24 alkyl-containing polymerizable unsaturated monomer (a), and (ii) a polymerizable unsaturated group; and
(m-2) a polymerizable unsaturated monomer containing a hydrophilic group.

A copolymer of the present invention has the characteristic of easily developing viscosity, and lowering its viscosity with an increase in rate of shear. Specifically, the copolymer has the characteristic of developing viscosity, and lowering its viscosity with an increase in rate of shear even in an aqueous coating composition that contains a surfactant. With such a superior viscosity characteristic, a copolymer of the present invention is preferably used as a viscosity-controlling agent. Further, because of the ability to form a coating film having excellent DOI and luster, a copolymer of the present invention is particularly suitable as a viscosity-controlling agent for coating compositions.

C4-C24 Alkyl-Containing Polymerizable Unsaturated Monomer (a)

For example, monoesterified products of (meth)acrylic acid with a monohydric alcohol having a C4-C24 alkyl group can be used as the C4-C24 alkyl-containing polymerizable unsaturated monomer (a). Specific examples include alkyl or cycloalkyl (meth)acrylates such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, lauryl (meth)acrylate, tridecyl (meth)acrylate, stearyl (meth)acrylate, isostearyl (meth)acrylate, cyclohexyl (meth)acrylate, methyl cyclohexyl (meth)acrylate, tert-butyl cyclohexyl (meth)acrylate, cyclododecyl (meth)acrylate, isobornyl (meth)acrylate, adamantyl (meth)acrylate, tricyclodecanyl (meth)acrylate, etc. These may be used singly, or in a combination of two or more.

The term "(meth)acrylate" used in this specification means acrylate or methacrylate, and the term "(meth)acrylic acid" means acrylic acid or methacrylic acid. Additionally, the term "(meth)acryloyl" means acryloyl or methacryloyl, and the term "(meth)acrylamide" means "acrylamide or methacrylamide".

In terms of DOI of the resulting coating film, the C4-C24 alkyl-containing polymerizable unsaturated monomer (a) is preferably a polymerizable unsaturated monomer having a C6-C18 alkyl group, more preferably a polymerizable unsaturated monomer having a C8-C13 alkyl group. 2-Ethylhexyl methacrylate, dodecyl methacrylate, and tridecyl methacrylate are preferable, and 2-ethylhexyl methacrylate is particularly preferable.

Monomer Component (I)

The monomer component (I) contains 5 to 100 mass % of the C4-C24 alkyl-containing polymerizable unsaturated monomer (a). In terms of DOI of the resulting coating film, it is preferable that the content of the C4-C24 alkyl-containing polymerizable unsaturated monomer (a) in the monomer component (I) be 30 to 95 mass %, preferably 45 to 90 mass %, further preferably 55 to 85 mass %.

The monomer component (I) may also contain a polymerizable unsaturated monomer (b), in addition to the C4-C24 alkyl-containing polymerizable unsaturated monomer (a). In this case, the monomer component (I) includes the C4-C24 alkyl-containing polymerizable unsaturated monomer (a), and a polymerizable unsaturated monomer (b) that is different from the C4-C24 alkyl-containing polymerizable unsaturated monomer (a).

Examples of the polymerizable unsaturated monomer (b) that is different from the C4-C24 alkyl-containing polymerizable unsaturated monomer (a) include: alkyl (meth)acrylates having a C1-C3 alkyl group, such as methyl (meth)acrylate, ethyl (meth)acrylate, n-propyl (meth)acrylate, isopropyl (meth)acrylate, etc.; aromatic ring-containing polymerizable unsaturated monomers such as benzyl (meth)acrylate, styrene, α-methyl styrene, vinyl toluene, etc.; polymerizable unsaturated monomers having an alkoxysilyl group, such as vinyltrimethoxysilane, vinyltriethoxysilane, vinyl tris(2-methoxyethoxy)silane, γ-(meth)acryloyloxypropyltrimethoxysilane, γ-(meth)acryloyloxypropyltriethoxysilane, etc.; perfluoroalkyl (meth)acrylates such as perfluorobutylethyl (meth)acrylate, perfluorooctylethyl (meth)acrylate, etc.; polymerizable unsaturated monomers having a fluorinated alkyl group, such as fluoroolefin, etc.; polymerizable unsaturated monomers having a photopolymerizable functional group, such as a maleimide group, etc.; vinyl compounds such as N-vinyl-2-pyrrolidone, ethylene, butadiene, chloroprene, vinyl propionate, vinyl acetate, etc.; hydroxy-containing polymerizable unsaturated monomers such as monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate), ε-caprolactone modified products of the monoesterified products of (meth)acrylic acid with a dihydric alcohol having 2 to 8 carbon atoms, N-hydroxymethyl (meth)acrylamide, allyl alcohol, (meth)acrylates having hydroxy-terminated polyoxyethylene chains, etc.; carboxy-containing polymerizable unsaturated monomers such as (meth)acrylic acid, maleic acid, crotonic acid, β-carboxyethyl acrylate, etc.; polymerizable unsaturated monomers having at least two polymerizable unsaturated groups per molecule, such as allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, etc.; nitrogen-containing polymerizable unsaturated monomers such as (meth) acrylonitrile, (meth) acrylamide, N,N-dimethylaminoethyl (meth)acrylate, N,N-diethylaminoethyl (meth)acrylate, N,N-dimethylaminopropyl (meth)acrylamide, an adduct of glycidyl (meth)acrylate with amine compounds, etc.; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.; isocyanato-containing polymerizable unsaturated monomers such as 2-isocyanatoethyl (meth)acrylate, m-isopropenyl-α,α-dimethyl benzyl isocyanate, etc.; (meth)acrylates having alkoxy-terminated polyoxyethylene chains; carbonyl-containing polymerizable unsaturated monomers such as acrolein, diacetone acrylamide, diacetone methacrylamide, acetoacetoxyethyl methacrylate, formyl styrol, vinyl alkyl ketone having 4 to 7 carbon atoms (for example, vinyl methyl ketone, vinyl ethyl ketone, and vinyl butyl ketone), etc. These polymerizable unsaturated monomers may be used singly, or in a combination of two or more.

In terms of DOI and water resistance of the resulting coating film, it is preferable that the monomer component (I) at least partially include a hydroxy-containing polymerizable unsaturated monomer. Specifically, it is preferable that the polymerizable unsaturated monomer (b) different from the C4-C24 alkyl-containing polymerizable unsaturated monomer (a) at least partially include a hydroxy-containing polymerizable unsaturated monomer.

The hydroxy-containing polymerizable unsaturated monomer may be, for example, those exemplified above in conjunction with the polymerizable unsaturated monomer (b) that is different from the C4-C24 alkyl-containing polymerizable unsaturated monomer (a). These monomers may be used singly, or in a combination of two or more.

Preferable as the hydroxy-containing polymerizable unsaturated monomer are 2-hydroxyethyl (meth)acrylate, 2-hydroxypropyl (meth)acrylate, 3-hydroxypropyl (meth)acrylate, and 4-hydroxybutyl (meth)acrylate.

When contained in the monomer component (I), it is preferable that the hydroxy-containing polymerizable unsaturated monomer be used in 5 to 60 mass %, preferably 10 to 45 mass %, further preferably 15 to 30 mass %, based on the total mass of the monomer component (I), in terms of DOI and water resistance of the resulting coating film.

Further, when the monomer component (I) contains the hydroxy-containing polymerizable unsaturated monomer, it is preferable that the polymer obtained by polymerizing the monomer component (I) have a hydroxy value of 20 to 260 mg KOH/g, preferably 40 to 200 mg KOH/g, further preferably 60 to 130 mg KOH/g, in terms of DOI and water resistance of the resulting coating film.

Macromonomer (m-1)

The macromonomer (m-1) includes a polymer chain and a polymerizable unsaturated group. The polymer chain is a polymer chain having a number average molecular weight of 1,000 to 10,000 obtainable by polymerizing the monomer component (I) that contains the C4-C24 alkyl-containing polymerizable unsaturated monomer (a). In the present invention, the macromonomer is a high-molecular-weight monomer having a polymerizable unsaturated group, preferably at the polymer end. That is, the macromonomer (m-1) is structured to include a polymer chain backbone, and at least one, preferably one polymerizable unsaturated group, preferably at the end of the polymer chain.

As used herein, the polymerizable unsaturated group contained in the macromonomer (m-1) means an unsaturated group that can undergo radical polymerization. Examples of such polymerizable unsaturated groups include a vinyl group, a vinylidene group, an acryloyl group, and a methacryloyl group.

The macromonomer (m-1) preferably has a number average molecular weight of 1,000 to 10,100. In terms of DOI of the resulting coating film, a number average molecular weight of 1,000 to 5,000, more preferably 1,000 to 3,000 is preferable. The number average molecular weight of the macromonomer (m-1) can be adjusted by, for example, the amount of chain transfer agent, the amount of radical polymerization initiator, reaction temperature, and reaction time used for the polymerization of the monomer component (I).

The macromonomer (m-1) can be obtained by methods known per se. Specifically, for example, the following methods (1), (2), and (3) can be used.

Method (1):

The monomer component (I) is polymerized in the presence of a chain transfer agent that contains a first chemically reactive group such as a carboxy group, a hydroxy group, an amino group, etc., so as to introduce the first chemically reactive group at the polymer end. The polymer is then allowed to react with a polymerizable unsaturated monomer that has a second chemically reactive group that can react with the first chemically reactive group of the polymer, so as to obtain the macromonomer (m-1).

For example, mercaptoacetic acid, 2-mercaptopropionic acid, 3-mercaptopropionic acid, 2-mercaptoethanol, and 2-aminoethanethiol can be suitably used as the chain transfer agent that has the first chemically reactive group such as a carboxy group, a hydroxy group, an amino group, etc.

The polymerizable unsaturated monomer having the second chemically reactive group that reacts with the first chemically reactive group in the copolymer to introduce the polymerizable unsaturated group may preferably be, for example, an epoxy-containing polymerizable unsaturated monomer when the first chemically reactive group is a carboxy group, an isocyanato-containing polymerizable unsaturated monomer when the first chemically reactive group is a hydroxy group, or an epoxy-containing polymerizable unsaturated monomer when the first chemically reactive group is an amino group.

For example, glycidyl acrylate, glycidyl methacrylate, etc., can be suitably used as the epoxy-containing polymerizable unsaturated monomer. Further, for example, isocyanatoethyl acrylate, isocyanatoethyl methacrylate, m-isopropenyl-α,α-dimethyl benzyl isocyanate, etc., can be suitably used as the isocyanato-containing polymerizable unsaturated monomer.

Method (2):

The macromonomer (m-1) can be obtained by catalytic chain transfer polymerization (CCTP method) that uses a metal complex. The CCTP method is described in, for example, Japanese Unexamined Patent Publications No. 1994-23209, 1995-35411, 1997-501457, 1997-176256, and Macromolecules 1996, 29, 8083 to 8089. Specifically, the macromonomer (m-1) can be produced by the catalytic chain transfer polymerization of the monomer component (I) in the presence of a metal complex. The catalytic chain transfer polymerization can be performed using, for example, a solution polymerization method in an organic solvent, or an emulsion polymerization method in water. As required, a radical polymerization initiator may be used for the polymerization, in addition to the metal complex.

Examples of the metal complex include a cobalt complex, an iron complex, a nickel complex, a ruthenium complex, a rhodium complex, a palladium complex, a rhenium complex, an iridium complex, etc. The cobalt complex efficiently exhibits the catalytic chain transfer effect. The amount of metal complex used is not particularly limited, and is generally $1 \times 10^{-6}$ to 1 part by mass, preferably $1 \times 10^{-4}$ to 0.5 parts by mass, based on the total 100 parts by mass of the monomer component (I).

Examples of the radical polymerization initiator include: organic peroxides such as benzoyl peroxide, octanoyl peroxide, lauroyl peroxide, stearoyl peroxide, cumene hydroperoxide, tert-butyl peroxide, di-tert-amylperoxide, tert-butylperoxy-2-ethylhexanoate, tert-butylperoxy laurate, tert-butylperoxy isopropyl carbonate, tert-butylperoxy acetate, diisopropylbenzene hydroperoxide, etc.; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethyl azobis(2-methyl propionate), azobis[2-methyl-N-(2-hydroxyethyl)-propionamide], azobis{2-methyl-N-[2-(1-hydroxybutyl)]-propionamide}, etc.; and persulfates such as potassium persulfate, ammonium persulfate, sodium persulfate, etc. These polymerization initiators may be used singly, or in a combination of two or more. The content of the radical polymerization initiator is not particularly limited, and is generally 0.1 to 10 parts by mass, preferably 0.1 to 8 parts by mass, further preferably 0.1 to 6 parts by mass, based on the total 100 parts by mass of the monomer component (I).

Method (3):

The macromonomer (m-1) can be obtained by addition-fragmentation chain transfer polymerization that uses an addition-fragmentation chain transfer agent. Addition-fragmentation chain transfer polymerization is described in, for example, Japanese Unexamined Patent Publication No. 1995-2954. Specifically, the macromonomer (m-1) can be produced by the addition-fragmentation chain transfer polymerization of the monomer component (I) in the presence of an addition-fragmentation chain transfer agent. The addition-fragmentation chain transfer polymerization can be performed using, for example, a solution polymerization method in an organic solvent, or an emulsion polymerization method in water. As required, a radical polymerization initiator may be used for the polymerization, in addition to the addition-fragmentation chain transfer agent.

For example, 2,4-diphenyl-4-methyl-1-pentene ("α-methyl styrene dimer", also known as "MSD") can be suitably used as the addition-fragmentation chain transfer agent. The content of the addition-fragmentation chain transfer agent is not particularly limited, and is generally 1 to 20 parts by mass, preferably 2 to 15 parts by mass, further preferably 3 to 10 parts by mass, based on the total 100 parts by mass of the monomer component (I).

The radical polymerization initiator mentioned in method (2) above, for example, may be used as the radical polymerization initiator. The polymerization initiators may be used singly, or in a combination of two or more. The content of the radical polymerization initiator is not particularly limited, and is generally 1 to 20 parts by mass, preferably 2 to 15 parts by mass, further preferably 3 to 10 parts by mass, based on the total 100 parts by mass of the monomer component (I).

In these methods (1) to (3), although the polymerization temperature varies depending on the type of the radical polymerization initiator, the polymerization temperature is preferably in a range of from 60 to 200° C., more preferably from 80 to 180° C., further preferably from 90 to 170° C. Further, different temperatures may be used in the first half and the second half of polymerization, or polymerization may be performed with gradual changes in temperature.

Of the above methods (1) to (3), method (1) requires the step of polymerizing the monomer component (I) to obtain a polymer, and the step of reacting the polymer with a polymerizable unsaturated monomer to introduce a polymerizable unsaturated group into the polymer. Method (2) uses a metal complex, and thus catalytic chain transfer polymerization may occur during the production of the copolymer (graft polymer) described later, or color may be imparted to the resulting copolymer.

Thus, in terms of reducing the number of reaction steps and suppressing the coloring of the resulting copolymer, it is preferable to obtain the macromonomer (m-1) using method (3), which uses the addition-fragmentation chain transfer polymerization using an addition-fragmentation chain transfer agent. The macromonomer (m-1) can be used singly, or in a combination of two or more.

Polymerizable Unsaturated Monomer Containing a Hydrophilic Group (m-2)

In, the present invention, examples of polymerizable unsaturated monomer (m-2) containing a hydrophilic group include N-substituted (meth) acrylamide, polymerizable unsaturated monomer having a polyoxyalkylene chain, N-vinyl-2-pyrrolidone, 2-hydroxyethyl acrylate, carboxy-containing polymerizable unsaturated monomer, sulfonic acid group-containing polymerizable unsaturated monomer, and phosphoric acid group-containing polymerizable unsaturated monomer. These monomers can be used singly, or in a combination of two or more.

Among them, the polymerizable unsaturated monomer containing a hydrophilic group (m-2) may be, for example, at least one kind of polymerizable unsaturated monomer selected from the group consisting of N-substituted (meth) acrylamide, a polymerizable unsaturated monomer having a polyoxyalkylene chain, N-vinyl-2-pyrrolidone, 2-hydroxyethyl acrylate, acrylic acid, and methacrylic acid. These may be used singly, or in a combination of two or more.

In terms of the smoothness, DOI, luster, and water resistance of the resulting coating film, the contents of the macromonomer (m-1) and the polymerizable unsaturated monomer containing a hydrophilic group (m-2) in the monomer component (m) preferably fall within the ranges below, based on the total mass of the monomer component (m):

Macromonomer (m-1): 1 to 40 mass %, preferably 3 to 29 mass %, further preferably 5 to 15 mass %, Polymerizable unsaturated monomer containing a hydrophilic group (m-2): 5 to 99 mass %, preferably 10 to 97 mass %, further preferably 20 to 95 mass %.

Examples of the N-substituted (meth)acrylamide include N-methyl acrylamide, N-methyl methacrylamide, N-methylol acrylamide butyl ether, N-methylol methacrylamide butyl ether, N-ethyl acrylamide, N-ethyl methacrylamide, N-n-propyl acrylamide, N-n-propyl methacrylamide, N-isopropylacrylamide, N-isopropyl methacrylamide, N-cyclopropyl acrylamide, N-cyclopropyl methacrylamide, diacetone acrylamide, diacetone methacrylamide, N-hydroxymethyl acrylamide, N-hydroxymethyl methacrylamide, N-hydroxyethyl acrylamide, N-hydroxyethyl methacrylamide, N,N-dimethyl acrylamide, N,N-dimethyl methacrylamide, N,N-diethyl acrylamide, N,N-diethyl methacrylamide, N-methyl,N-ethyl acrylamide, N-methyl,N-ethyl methacrylamide, N,N-dimethylaminopropyl acrylamide, N,N-dimethylaminopropyl methacrylamide, N-methylol acrylamide methyl ether, N-methylol methacrylamide methyl ether, N-methylol acrylamide ethyl ether, N-methylol methacrylamide ethyl ether, N-methylol acrylamide propyl ether, N-methylol methacrylamide propyl ether, acryloyl morpholine, and methacryloyl morpholine. These may be used singly, or in a combination of two or more.

In terms of DOI of the resulting coating film, N-n-propyl acrylamide, N-n-propyl methacrylamide, N-isopropyl acrylamide, N-isopropyl methacrylamide, N-hydroxyethyl acrylamide, N-hydroxyethyl methacrylamide, N,N-dimethyl acrylamide, N,N-dimethyl methacrylamide, N,N-diethyl acrylamide, and N,N-diethyl methacrylamide are preferred, and N,N-dimethyl acrylamide and N,N-dimethyl methacrylamide are further preferred.

The polymerizable unsaturated monomer having a polyoxyalkylene chain is a monomer that includes a polyoxyalkylene chain and a polymerizable unsaturated group per molecule.

Examples of the polyoxyalkylene chain include a polyoxyethylene chain, a polyoxypropylene chain, a chain that includes a polyoxyethylene block and a polyoxypropylene block, and a chain that includes randomly linked polyoxyethylene and polyoxypropylene. The polyoxyalkylene chain preferably has a molecular weight of generally about 100 to 5,000, preferably about 200 to 4,000, further preferably about 300 to 3,000.

A representative example of the polymerizable unsaturated monomer having such a polyoxyalkylene chain is, for example, a polymerizable unsaturated monomer of General Formula (I) below.

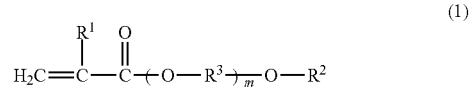

(1)

wherein $R^1$ represents a hydrogen atom or a methyl group; $R^2$ represents a hydrogen atom or a C1-C4 alkyl group, preferably a hydrogen atom, a methyl group, or an ethyl group, further preferably a hydrogen atom or a methyl group; $R^3$ represents a C2-C4 alkylene group, preferably a C2 or C3 alkylene group, further preferably a C2 alkylene group; and m is an integer of 3 to 150, preferably 5 to 80, further preferably 8 to 50. In General Formula (1), m oxyalkylene units (O—$R^3$) may be the same or different.

Specific examples of the polymerizable unsaturated monomer represented by General Formula (1) include tetraethylene glycol (meth)acrylate, methoxytetraethylene glycol (meth)acrylate, ethoxytetraethylene glycol (meth)acrylate, n-butoxytriethylene glycol (meth)acrylate, n-butoxytetraethylene glycol (meth)acrylate, tetrapropylene glycol (meth) acrylate, methoxytetrapropylene glycol (meth)acrylate, ethoxytetrapropylene glycol (meth)acrylate, n-butoxytetrapropylene glycol (meth)acrylate, polyethylene glycol (meth)

acrylate, polypropylene glycol (meth)acrylate, polyethylene (propylene) glycol (meth)acrylate, methoxypolyethylene glycol (meth)acrylate, ethoxypolyethylene glycol (meth) acrylate, methoxypolypropylene glycol (meth)acrylate, ethoxypolypropylene glycol (meth)acrylate, methoxypolyethylene(propylene) glycol (meth)acrylate, and ethoxypolyethylene(propylene) glycol (meth)acrylate. These may be used singly, or in a combination of two or more. As used herein, "polyethylene(propylene) glycol" means a copolymer of ethylene glycol and propylene glycol, including both a block copolymer and a random copolymer.

In terms of DOI of the resulting coating film, polyethylene glycol (meth)acrylate, polyethylene(propylene) glycol (meth)acrylate, methoxypolyethylene glycol (meth)acrylate, and methoxypolyethylene(propylene) glycol (meth)acrylate are preferable, and polyethylene glycol (meth)acrylate and methoxypolyethylene glycol (meth)acrylate are further preferable.

The polymerizable unsaturated monomer having the polyoxyalkylene chain preferably has a molecular weight of generally about 300 to 6,000, preferably about 400 to 5,000, further preferably about 450 to 3,500.

Examples of the carboxy-containing polymerizable unsaturated monomer include (meth)acrylic acid, maleic acid, crotonic acid, and β-carboxy ethyl acrylate. They can be used singly, or in a combination of two or more.

Examples of the sulfonic acid group-containing polymerizable unsaturated monomer include 2-acrylamide-2-methylpropanesulfonic acid, 2-sulfoethyl (meth)acrylate, allyl sulfonic acid, and 4-styrenesulfonic acid; and sodium salts and ammonium salts of these sulfonic acids. They can be used singly, or in a combination of two or more.

Examples of the phosphoric acid group-containing polymerizable unsaturated monomer include 2-acryloyl oxyethyl acid phosphate, 2-methacryloyloxy ethyl acid phosphate, 2-acryloyloxy propyl acid phosphate, and 2-methacryloyloxy propyl acid phosphate. They can be used singly, or in a combination of two or more.

In a preferred embodiment of the present invention, the polymerizable unsaturated monomer containing a hydrophilic group (m-2) may be, for example, at least one kind of hydrophilic group-containing nonionic polymerizable unsaturated monomer selected from the group consisting of N-substituted (meth)acrylamide, a polymerizable unsaturated monomer having a polyoxyalkylene chain, and N-vinyl-2-pyrrolidone. These may be used singly, or in a combination of two or more. In a preferred embodiment of the present invention, N-substituted (meth)acrylamide is preferable among these monomers, in terms of DOI of the resulting coating film.

In a preferred embodiment of the present invention, the macromonomer (m-1) and the nonionic polymerizable unsaturated monomer containing a hydrophilic group (m-2) are preferably contained in the proportions below, based on the total mass of the monomer component (m), in terms of the viscosity of the copolymer, and DOI of the coating film formed by using the copolymer-containing coating composition.

Macromonomer (m-1): 1 to 29 mass %, preferably 3 to 20 mass %, further preferably 5 to 15 mass %

The total mass of the nonionic polymerizable unsaturated monomer containing a hydrophilic group (m-2): 20 to 99 mass %, preferably 40 to 97 mass %, further preferably 55 to 95 mass %.

In another preferred embodiment of the present invention, the polymerizable unsaturated monomer containing a hydrophilic group (m-2) may be at least one kind of polymerizable unsaturated monomer selected from acrylic acid and methacrylic acid. These may be used singly, or in a combination of two or more. In another preferred embodiment of the present invention, acrylic acid is preferable among these monomers, in terms of DOI of the resulting coating film.

In another preferred embodiment of the present invention, the macromonomer (m-1) and the polymerizable unsaturated monomer containing a hydrophilic group (m-2) are preferably contained in the proportions below, based on the total mass of the monomer component (m), in terms of the viscosity of the copolymer, DOI of the coating film formed by using the copolymer-containing coating composition, the improvement of flip-flop property and water resistance, and the suppression of metallic mottling.

Macromonomer (m-1): 1 to 40 mass %, preferably 3 to 29 mass %, further preferably 5 to 15 mass %

The total mass of polymerizable unsaturated monomer containing a hydrophilic group (m-2): 5 to 75 mass %, preferably 10 to 60 mass %, further preferably 20 to 50 mass %.

Other Polymerizable Unsaturated Monomers (m-3)

Other polymerizable unsaturated monomers (m-3) are polymerizable unsaturated monomers other than the macromonomer (m-1) and the polymerizable unsaturated monomer containing a hydrophilic group (m-2). The other polymerizable unsaturated monomers (m-3) can be suitably selected according to the properties required of the copolymer.

Specific examples of the other polymerizable unsaturated monomers (m-3) are listed below. These may be used singly, or in a combination of two or more.

(i) Alkyl or cycloalkyl (meth)acrylates: methyl (meth)acrylate, ethyl (meth)acrylate, n-propyl (meth)acrylate, isopropyl (meth)acrylate, n-butyl (meth)acrylate, iso-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate, etc.

(ii) Polymerizable unsaturated monomers having an isobornyl group: isobornyl (meth)acrylate, etc.

(iii) Polymerizable unsaturated monomers having an adamantyl group: adamantyl (meth)acrylate, etc.

(iv) Polymerizable unsaturated monomer having a tricyclodecenyl group: tricyclodecenyl (meth)acrylate, etc.

(v) Aromatic ring-containing polymerizable unsaturated monomers: benzyl (meth)acrylate, styrene, α-methyl styrene, vinyl toluene, etc.

(vi) Polymerizable unsaturated monomers having an alkoxysilyl group: vinyltrimethoxysilane, vinyltriethoxysilane, vinyltris(2-methoxyethoxy)silane, γ-(meth)acryloyl oxypropyltrimethoxysilane, γ-(meth)acryloyl oxypropyltriethoxysilane, etc.

(vii) Polymerizable unsaturated monomers having a fluorinated alkyl group: perfluoroalkyl (meth)acrylates such as perfluorobutylethyl (meth)acrylate and perfluorooctylethyl (meth)acrylate; fluoroolefin; etc.

(viii) Polymerizable unsaturated monomer having a photopolymerizable functional group, such as a maleimide group, etc.

(ix) Vinyl compounds: ethylene, butadiene, chloroprene, vinyl propionate, vinyl acetate, etc.

(x) Hydroxy-containing polymerizable unsaturated monomers: monoesterified products of (meth)acrylic acid with a dihydric alcohol having 2 to 8 carbon atoms (e.g., 2-hydroxyethyl methacrylate, 2-hydroxypropyl (meth)acrylate, 3-hydroxypropyl (meth)acrylate, and 4-hydroxybutyl (meth)acrylate); ε-caprolactone modified products of the monoesterified products of (meth)acrylic acid with a dihydric alcohol having 2 to 8 carbon atoms; allyl alcohol, etc.

(xi) Nitrogen-containing polymerizable unsaturated monomers: (meth) acrylonitrile, (meth) acrylamide, methylene bis(meth)acrylamide, ethylene bis(meth)acrylamide, 2-(methacryloyloxy)ethyl trimethyl ammonium chloride, and adducts of glycidyl (meth)acrylate with amine compounds, etc.

(xii) Polymerizable unsaturated monomers including at least two polymerizable unsaturated groups per molecule: allyl(meth)acrylate, 1,6-hexanediol di(meth)acrylate, etc.

(xiii) Epoxy-containing polymerizable unsaturated monomers: glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xiv) Polymerizable unsaturated monomers including a ultraviolet-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, etc.

(xv) Light-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xvi) Polymerizable unsaturated monomers having a carbonyl group: acrolein, diacetone acrylamide, diacetone methacrylamide, acetoacetoxyethyl methacrylate, formylstyrol, vinyl alkyl ketone having 4 to 7 carbon atoms (for example, vinyl methyl ketone, vinyl ethyl ketone, and vinyl butyl ketone), etc.

(xvii) Polymerizable unsaturated monomers having an acid anhydride group: maleic anhydride, itaconic anhydride, citraconic anhydride, etc.

When the polymerizable unsaturated monomer (m-2) having a hydrophilic group does not contain 2-hydroxyethyl acrylate, it is preferable that the polymerizable unsaturated monomer (m-3) at least partially include the hydroxy-containing polymerizable unsaturated monomer (x), in terms of the water resistance of the resulting coating film. Preferable examples of the hydroxy-containing polymerizable unsaturated monomer (x) include 2-hydroxyethyl methacrylate, 2-hydroxypropyl (meth)acrylate, 3-hydroxypropyl (meth) acrylate, and 4-hydroxybutyl (meth)acrylate, of which 2-hydroxyethyl methacrylate is preferred.

When the polymerizable unsaturated monomer (m-3) contains the hydroxy-containing polymerizable unsaturated monomers (x), it is preferable that the content of the hydroxy-containing polymerizable unsaturated monomer (x) be 5 to 79 mass %, preferably 10 to 57 mass %, further preferably 15 to 40 mass %, based on the total mass of the monomer component (m).

The content of the polymerizable unsaturated monomer (m-3) can be suitably set so as to make the total weight of the (m-1) component and the (m-2) component in monomer component (m) 100 mass %.

A copolymer of the present invention is generally a graft polymer having a main chain and a side chain. The side chain portion is formed by the polymer chain in the macromonomer (m-1). The main chain portion is formed by the polymerizable unsaturated monomer containing a hydrophilic group (m-2), and the polymerizable unsaturated monomer (m-3).

Copolymer Production Process

A copolymer of the present invention can be produced by copolymerizing the monomer component (m) that includes the macromonomer (m-1), the polymerizable unsaturated monomer containing a hydrophilic group (m-2), and, optionally, the polymerizable unsaturated monomer (m-3); using methods known per se, such as, for example, a solution polymerization method in an organic solvent, and an emulsion polymerization method in water, etc., of which the solution polymerization method is preferable because of the relatively easy procedures it offers.

Examples of the polymerization initiator used for the copolymerization of the monomer component (m) include: organic peroxides such as benzoyl peroxide, octanoyl peroxide, lauroyl peroxide, stearoyl peroxide, cumene hydroperoxide, tert-butyl peroxide, di-tert-amylperoxide, tert-butylperoxy-2-ethylhexanoate, tert-butylperoxy laurate, tert-butylperoxy isopropylcarbonate, tert-butylperoxy acetate, diisopropylbenzene hydroperoxide, etc.; azo compounds such as azobisisobutyronitrile, azobis(2,4-dimethylvaleronitrile), azobis(2-methylpropionitrile), azobis(2-methyl butyronitrile), 4,4'-azobis(4-cyano butanoic acid), dimethyl azobis(2-methyl propionate), azobis[2-methyl-N-(2-hydroxyethyl)-propionamide], azobis{2-methyl-N-[2-(1-hydroxybutyl)]-propionamide}, etc.; and persulfates such as potassium persulfate, ammonium persulfate, sodium persulfate, etc. These polymerization initiators may be used singly, or in a combination of two or more. Redox initiators prepared by combining a polymerization initiator as mentioned above with a reducing agent such as sugar, sodium formaldehyde sulfoxylate, iron complex, etc., may also be used, as required.

The amount of polymerization initiator used may be generally 0.01 to 5 parts by mass, preferably 0.1 to 3 parts by mass, based on the total 100 parts by mass of the monomer component (m). The method of adding the polymerization initiator is not particularly limited, and can be suitably selected according to the type and amount of the polymerization initiator used. For example, the polymerization initiator may be incorporated into a monomer mixture or a reaction solvent beforehand, or may be added dropwise or all at once at the time of polymerization.

Water-soluble organic solvents that do not easily cause chain transfer into the solvent are preferably used as the solvent for the solution polymerization method. Examples of such solvents include ester-based solvents such as ethylene glycol monomethyl ether acetate, diethylene glycol monobutyl ether acetate; ketone-based solvents such as acetone or methyl ethyl ketone; alcoholic solvents such as methanol, ethanol, isopropanol, n-butanol, sec-butanol, or isobutanol; ether-based solvents such as 1,4-dioxane, tetrahydrofuran, ethylene glycol dimethyl ether, diethylene glycol dimethyl ether, propylene glycol dimethyl ether, or dipropylene glycol dimethyl ether; and glycol ether-based solvents such as ethylene glycol monomethyl ether, ethylene glycol monoethyl ether, or ethylene glycol monobutyl ether. These may be used singly, or in a combination of two or more. Ether-based solvents and glycol ether-based solvents are preferable.

It is preferable that the amount of the organic solvent used for the polymerization reaction be generally 500 parts by weight or less, preferably 50 to 400 parts by weight, further preferably 100 to 200 parts by weight, based on the total 100 parts by mass of the monomer component (m).

It is preferable that the copolymer of the present invention have a weight average molecular weight of 20,000 to 1,000,000, preferably 50,000 to 600,000, further preferably 100,000 to 400,000, in terms of the thickening property of the resulting copolymer, and smoothness, DOI, and luster of the coating film formed of the coating composition containing the copolymer.

In this specification, the number average molecular weight of the macromonomer (m-1), and the weight average molecular weight of the copolymer are converted values relative to the molecular weights of polystyrene, obtainable by converting the measured gel permeation chromatograph (GPC) retention time (retention volume) using the retention time (retention volume) of the standard polystyrene of a known molecular weight measured under the same conditions.

The number average molecular weight of the macromonomer (m-1) can be measured using an "HLC8120GPC" gel permeation chromatography apparatus (trade name; produced by Tosoh Corporation) together with the four columns "TSKgel G-4000 HXL", "TSKgel G-3000 HXL", "TSKgel G-2500 HXL" and "TSKgel G-2000 HXL" (trade names; produced by Tosoh Corporation), and a differential refractometer as a detector under the following conditions: mobile phase, tetrahydrofuran; measurement temperature, 40° C.; and flow rate, 1 mL/min.

The weight average molecular weight of the copolymer can be measured using an HLC-8120GPC gel permeation chromatography apparatus (trade name; produced by Tosoh Corporation) with a TSKgel GMHHR-L column (trade name; produced by Tosoh Corporation), and a differential refractometer as a detector under the following conditions: mobile phase, N,N-dimethylformamide (containing 10 mM lithium bromide and 10 mM phosphate); measurement temperature, 25° C.; and flow rate, 1 mL/min.

II. Aqueous Coating Composition of the Present Invention

A copolymer of the present invention has the characteristic of easily developing viscosity, and lowering its viscosity with an increase in rate of shear. This viscosity characteristic enables the copolymer to be suitably used as a viscosity-controlling agent for aqueous coating compositions. Further, the copolymer has the characteristic of developing viscosity, and lowering its viscosity with an increase in rate of shear even in an aqueous coating composition that contains a surfactant. Thus, an aqueous coating composition containing a copolymer of the present invention can form a coating film that has superior DOI. Further, with an aqueous coating composition of the present invention, a coating film having superior luster with a high flip-flop property and suppressed metallic mottling can be formed.

An aqueous coating composition of the present invention (hereinafter, also referred to as the "present coating composition") generally contains the copolymer and a film-forming resin (A).

Film-Forming Resin (A)

Water-soluble or water-dispersible film-forming resins known per se, and used as the binder component of aqueous coating compositions, can be used as the film-forming resin (A). Examples of film-forming resin (A) include acrylic resin, polyester resin, alkyd resin, silicon resin, fluororesin, epoxy resin, and polyurethane resin.

The film-forming resin (A) is preferably a water-dispersible film-forming resin, because water-dispersible film-forming resins enable formation of a coating film that has superior appearance with excellent DOI, high flip-flop property, and suppressed metallic mottling, and excellent water resistance.

Water-dispersible film-forming resins are generally obtained by dispersing a relatively hydrophobic film-forming resin in an aqueous medium, thus enabling formation of a coating film that has superior water resistance compared with highly hydrophilic water-soluble film-forming resins. Further, because of the hydrophobic side chain, a copolymer of the present invention can develop viscosity by forming a network structure with the relatively hydrophobic film-forming resin, thus enabling formation of a coating film that has superior appearance with excellent DOI, excellent flip-flop property, and suppressed metallic mottling.

In terms of the preservative stability of the resulting coating composition, the water-dispersible film-forming resin is preferably a film-forming resin that is rendered water-dispersible by a surfactant. A copolymer of the present invention has the characteristic of developing viscosity, and lowering its viscosity with an increase in rate of shear even in an aqueous coating composition that contains a surfactant. Thus, the aqueous coating composition that contains a copolymer of the present invention and the film-forming resin that is rendered water-dispersible by a surfactant can form a coating film that has excellent preservative stability; superior appearance with excellent DOI, high flip-flop property, and suppressed metallic mottling; and excellent water resistance.

For example, an acrylic resin produced by an emulsion polymerization method that uses a surfactant can be suitably used as the film-forming resin that is rendered water-dispersible by a surfactant.

In terms of DOI, flip-flop property, and metallic mottling of the resulting coating film, the film-forming resin (A) is preferably a resin that includes an ester bond. For example, a copolymer obtainable by polymerizing a monomer mixture that includes ester bond-containing polymerizable unsaturated monomers, acrylic resin, polyester resin, etc., can be suitably used as the ester bond-containing resin. Among them, acrylic resin is preferable. The aqueous coating composition that contains a copolymer of the present invention and the ester bond-containing film-forming resin can form a coating film that has superior appearance with excellent DOI, high flip-flop property, and suppressed metallic mottling. Presumably, this is because of the high viscosity developed by the formation of a network structure more strongly bonded together by the high affinity between the ester bond in the film-forming resin (A) and the ester bond in the C4-C24 alkyl-containing polymerizable unsaturated monomer (a) present in the side chain of a copolymer of the present invention.

The film-forming resin (A) preferably includes a crosslinking functional group such as a hydroxy group, a carboxy group, an epoxy group, etc.

It is preferable that an aqueous coating composition of the present invention further include a curing agent (B) to be described later. When an aqueous coating composition of the present invention includes the curing agent (B), a resin (base resin) that has a crosslinking functional group such as a hydroxy group, a carboxy group, an epoxy group, etc., and that can form a cured coating by reaction with the curing agent (B) is generally used as the film-forming resin (A).

Examples of the base resin include acrylic resin, polyester resin, alkyd resin, and polyurethane resin. The base resin is preferably a hydroxy-containing resin, more preferably a hydroxy-containing acrylic resin (A1) and/or a hydroxy-containing polyester resin (A2). In terms of improving DOI and luster of the resulting coating film, it is preferable that the hydroxy-containing acrylic resin (A1) and the hydroxy-containing polyester resin (A2) be used together. The content of the hydroxy-containing acrylic resin (A1) is preferably about 20 to 80 mass %, particularly about 30 to 70 mass %, and the content of the hydroxy-containing polyester resin (A2) is preferably about 80 to 20 mass %, particularly about 70 to 30 mass %, based on the total amount of these resins.

When an acid group such as a carboxy group etc. is contained, the film-forming resin (A) has an acid value of preferably about 5 to 150 mg KOH/g, more preferably about 10 to 100 mg KOH/g, further preferably about 15 to 80 mg KOH/g. When a hydroxy group is contained, the resin (A) has a hydroxy value of preferably about 1 to 200 mg KOH/g, more preferably about 2 to 180 mg KOH/g, further preferably about 5 to 170 mg KOH/g.

Hydroxy-Containing Acrylic Resin (A1)

The hydroxy-containing acrylic resin (A1) can be produced by copolymerizing, for example, the hydroxy-containing polymerizable unsaturated monomer and other polymerizable unsaturated monomers copolymerizable with the hydroxy-containing polymerizable unsaturated monomer, using methods known per se, such as, for example, a solution polymerization method in an organic solvent, an emulsion polymerization method in water, a miniemulsion polymerization method in water, etc. When the product is used as a film-forming resin for aqueous coating compositions, the emulsion polymerization method in water is preferable, because it requires fewer steps to produce the resin.

The hydroxy-containing polymerizable unsaturated monomer is a compound that includes one or more hydroxy groups and one or more polymerizable unsaturated bonds per molecule. Examples of the hydroxy-containing polymerizable unsaturated monomer include: monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate); ε-caprolactone modified products of the monoesterified products of (meth) acrylic acid with a dihydric alcohol having 2 to 8 carbon atoms; polyoxyalkylene glycol modified products of the monoesterified products of (meth)acrylic acid with a dihydric alcohol having 2 to 8 carbon atoms; N-hydroxymethyl (meth) acrylamide; allyl alcohol; and (meth)acrylates that include hydroxy-terminated polyoxyethylene chains. These may be used singly, or in a combination of two or more.

Preferably, the hydroxy-containing polymerizable unsaturated monomer is a hydroxy-containing polymerizable unsaturated monomer having an ester bond, in terms of improving properties of the resulting coating film such as DOI, luster, flip-flop property, etc., and suppressing metallic mottling. Examples of such hydroxy-containing polymerizable unsaturated monomers having an ester bond include: monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate); ε-caprolactone modified products of the monoesterified products of (meth)acrylic acid with a dihydric alcohol having 2 to 8 carbon atoms; and polyoxyalkylene glycol modified products of the monoesterified products of (meth)acrylic acid with a dihydric alcohol having 2 to 8 carbon atoms. Of these, monoesterified products of (meth)acrylic acid with a dihydric alcohol having 2 to 8 carbon atoms are preferable, and 2-hydroxyethyl (meth)acrylate, 2-hydroxypropyl (meth)acrylate, 3-hydroxypropyl (meth)acrylate, and 4-hydroxybutyl (meth) acrylate are further preferred.

The other polymerizable unsaturated monomers polymerizable with the hydroxy-containing polymerizable unsaturated monomer may be, for example, the polymerizable unsaturated monomers exemplified above as the (m-2) and (m-3) components in conjunction with the copolymer, including the polymerizable unsaturated monomers (i) to (ix) and (xi) to (xvii) other than the hydroxy-containing polymerizable unsaturated monomer. Such polymerizable unsaturated monomers may be used singly, or in a combination of two or more.

The hydroxy-containing acrylic resin (A1) preferably contains an amide group. The hydroxy-containing acrylic resin containing an amide group can be produced by using, for example, an amide-containing polymerizable unsaturated monomer, such as (meth) acrylamide, N,N-dimethylaminopropyl (meth) acrylamide, etc., as an example of the polymerizable unsaturated monomer polymerizable with the hydroxy-containing polymerizable unsaturated monomer.

The content of the hydroxy-containing polymerizable unsaturated monomer used to produce the hydroxy-containing acrylic resin (A1) is preferably about 1 to 50 mass %, more preferably about 2 to 40 mass %, further preferably about 3 to 30 mass %, based on the total amount of the monomer component.

In terms of properties such as the preservative stability of the coating composition and the water resistance of the resulting coating film, the hydroxy-containing acrylic resin (A1) has an acid value of preferably about 0.1 to 200 mg KOH/g, more preferably about 2 to 150 mg KOH/g, and further preferably about 5 to 100 mg KOH/g. Further, in terms of properties of the resulting coating film such as water resistance, the hydroxy-containing acrylic resin (A1) has a hydroxy value of preferably about 0.1 to 200 mg KOH/g, more preferably about 2 to 150 mg KOH/g, and further preferably about 5 to 100 mg KOH/g.

In a preferred embodiment of the present invention, the hydroxy-containing acrylic resin (A1) may be a water-dispersible hydroxy-containing acrylic resin (A1') having an acid value of 1 to 100 mg KOH/g and a hydroxy value of 1 to 100 mg KOH/g, obtainable by copolymerizing monomer components (b) that include (b-1) 5 to 70 mass % of a hydrophobic polymerizable unsaturated monomer, (b-2) 0.1 to 25 mass % of a hydroxy-containing polymerizable unsaturated monomer, (b-3) 0.1 to 20 mass % of a carboxy-containing polymerizable unsaturated monomer, and (b-4) 0 to 94.8 mass % of a polymerizable unsaturated monomer other than the polymerizable unsaturated monomers (b-1) to (b-3). By containing the above-mentioned water-dispersible hydroxyl containing acrylic resin (A1') in the coating composition as a hydroxy-containing acrylic resin (A1), it is possible to form a coating film superior in smoothness, DOI and water resistance; moreover, when the coating composition further contains a luster pigment, it is possible to form a coating film having an excellent luster, with reduced metallic mottling and superior flip-flop property.

Hydrophobic Polymerizable Unsaturated Monomer (b-1)

The hydrophobic polymerizable unsaturated monomer (b-1) is a polymerizable unsaturated monomer that has a linear, branched, or cyclic, saturated or unsaturated hydrocarbon group of 4 or more carbon atoms, preferably 6 to 18 carbon atoms, excluding monomers having a hydrophilic group, such as, for example, hydroxy-containing polymerizable unsaturated monomers, etc. Examples of such monomers include alkyl or cycloalkyl (meth)acrylates such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methyl cyclohexyl (meth)acrylate, tert-butyl cyclohexyl (meth)acrylate, cyclododecyl (meth)

acrylate, tricyclodecanyl (meth)acrylate, etc.; polymerizable unsaturated compounds having an isobornyl group, such as isobornyl (meth)acrylate, etc.; polymerizable unsaturated compounds having an adamantyl group, such as adamantyl (meth)acrylate, etc.; and aromatic ring-containing polymerizable unsaturated monomers such as benzyl (meth)acrylate, styrene, α-methyl styrene, vinyl toluene, etc. These monomers may be used singly, or in a combination of two or more.

In terms of improving the smoothness, DOI, luster, and waterproofing of the resulting coating film, the hydrophobic polymerizable unsaturated monomer (b-1) is preferably at least one kind of polymerizable unsaturated monomer selected from the group consisting of n-butyl (meth)acrylate, 2-ethylhexyl (meth)acrylate, and styrene.

Hydroxy-Containing Polymerizable Unsaturated Monomer (b-2)

The hydroxy-containing polymerizable unsaturated monomer (b-2) improves the stability of the resulting water-dispersible hydroxy-containing acrylic resin (A1') in an aqueous medium. Further, when using the compound reactive with a hydroxy group as the curing agent (B) described later, a coating film with superior water resistance can be formed in which the water-dispersible acrylic resin (A1') and the curing agent (B) are crosslinked. The hydroxy-containing polymerizable unsaturated monomer (b-2) may be those described above.

Carboxy-Containing Polymerizable Unsaturated Monomer (b-3)

The carboxy-containing polymerizable unsaturated monomer (b-3) can improve the stability of the resulting water-dispersible hydroxy-containing acrylic resin (A1') in an aqueous medium. When a compound reactive to a carboxy group is used as the curing agent (B) described later, a coating film with superior water resistance can be formed in which the water-dispersible hydroxy-containing acrylic resin (A1') and the curing agent (B) are crosslinked.

Examples of the carboxy-containing polymerizable unsaturated monomer (b-3) include (meth)acrylic acid, maleic acid, crotonic acid, and β-carboxyethyl acrylate. These monomers may be used singly, or in a combination of two or more.

In view of enhancing the stability of the resulting water-dispersible hydroxy-containing acrylic resin (A1') in an aqueous medium, the carboxy-containing polymerizable unsaturated monomer (b-3) is preferably acrylic acid and/or methacrylic acid.

Polymerizable Unsaturated Monomer (b-4) Other Than Polymerizable Unsaturated Monomers (b-1) to (b-3)

The monomer component (b) may include, as required, a polymerizable unsaturated monomer (b-4) other than the hydrophobic polymerizable unsaturated monomer (b-1), the hydroxy-containing polymerizable unsaturated monomer (b-2), and the carboxy-containing polymerizable unsaturated monomer (b-3), in addition to these polymerizable unsaturated monomers (b-1) to (b-3).

The polymerizable unsaturated monomer (b-4) can be suitably selected according to the properties required of the water-dispersible hydroxy-containing acrylic resin (A1'). Specific examples of the polymerizable unsaturated monomer (b-4) are listed below. These may be used singly, or in a combination of two or more.

Examples of the polymerizable unsaturated monomer (b-4) include: alkyl(meth)acrylates of 3 carbon atoms or less, such as methyl (meth)acrylate, ethyl (meth)acrylate, n-propyl (meth)acrylate, isopropyl (meth)acrylate, etc.; nitrogen-containing polymerizable unsaturated monomers such as (meth)acrylonitrile, (meth) acrylamide, methylene bis(meth)acrylamide, ethylene bis(meth)acrylamide, 2-(methacryloyloxy) ethyl trimethyl ammonium chloride, and an adduct of glycidyl (meth)acrylate with amine compounds, etc.; polymerizable unsaturated monomers that include at least two polymerizable unsaturated groups per molecule, such as allyl(meth)acrylate, 1,6-hexanediol di(meth)acrylate, etc.; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.; (meth)acrylates having alkoxy-terminated polyoxyethylene chains; and sulfonic acid group-containing polymerizable unsaturated monomers, such as 2-acrylamide-2-methylpropanesulfonic acid, 2-sulfoethyl (meth)acrylate, allyl sulfonic acid, 4-styrenesulfonic acid, etc., including sodium salts and ammonium salts of these sulfonic acids. These monomers may be used singly, or in a combination of two or more.

In terms of the smoothness, DOI, luster, and water resistance of the resulting coating film, it is preferable that the hydrophobic polymerizable unsaturated monomer (b-1), the hydroxy-containing polymerizable unsaturated monomer (b-2), the carboxy-containing polymerizable unsaturated monomer (b-3), and the polymerizable unsaturated monomer (b-4) other than the polymerizable unsaturated monomers (b-1) to (b-3) be contained in the monomer component (b) in the following proportions, based on the total mass of the monomer component (m).

Hydrophobic polymerizable unsaturated monomer (b-1):
5 to 70 mass %, preferably 10 to 65 mass %, further preferably 15 to 60 mass %

Hydroxy-containing polymerizable unsaturated monomer (b-2):
0.1 to 25 mass %, preferably 0.5 to 15 mass %, further preferably 1 to 10 mass %

Carboxy-containing polymerizable unsaturated monomer (b-3)
0.1 to 20 mass %, preferably 0.5 to 15 mass %, further preferably 1 to 10 mass %

Polymerizable unsaturated monomer (b-4) other than polymerizable unsaturated monomers (b-1) to (b-3):
0 to 94.8 mass %, preferably 10 to 89 mass %, further preferably 20 to 83 mass %

The water-dispersible hydroxy-containing acrylic resin (A1') can be produced by, for example, copolymerizing the monomer component (b) that includes the hydrophobic polymerizable unsaturated monomer (b-1), the hydroxy-containing polymerizable unsaturated monomer (b-2), the carboxy-containing polymerizable unsaturated monomer (b-3), and the polymerizable unsaturated monomer (b-4) other than the polymerizable unsaturated monomers (b-1) to (b-3), using methods known per se. Specifically, for example, the copolymer after emulsion polymerization, or after solution polymerization in an organic solvent may be dispersed in water using a surfactant. An emulsion polymerization method is preferable in terms of improving the stability of the resulting water-dispersible hydroxy-containing acrylic resin (A1') in an aqueous medium. The emulsion polymerization method is a method in which, generally, water-insoluble or poorly water-soluble polymerizable unsaturated monomers are polymerized by being dispersed in water using a surfactant.

The water-dispersible hydroxy-containing acrylic resin (A1') prepared from the raw materials (b-1) to (b-3) and, as required (b-4), preferably has an acid value of 1 to 100 mg KOH/g, and a hydroxy value of 1 to 100 mg KOH/g. The acid value is more preferably 2 to 50 mg KOH/g, further preferably 5 to 30 mg KOH/g, in terms of preservative stability of the coating composition, and improving the smoothness, DOI, luster and water resistance of the resulting coating film. The hydroxy value is more preferably 2 to 80 mg KOH/g, further preferably 5 to 60 mg KOH/g, in terms of improving the smoothness, DOI, luster, and water resistance of the resulting coating film.

Core-Shell-Type Water-Dispersible Acrylic Resin

The hydroxy-containing acrylic resin (A1) is preferably formed of a water-dispersible hydroxy-containing acrylic resin used alone or in combination with a water-soluble hydroxy-containing acrylic resin, in terms of improving DOI and luster of the resulting coating film. Particularly, a core-shell-type water-dispersible hydroxy-containing acrylic resin is suitable for the water-dispersible hydroxy-containing acrylic resin.

A suitable example of the core-shell-type water-dispersible hydroxy-containing acrylic resin, in terms of improving DOI and luster of the resulting coating film, is a core-shell-type water-dispersible hydroxy-containing acrylic resin (A1") comprising: a core that is a copolymer (I) consisting of about 0.1 to 30 mass % of a polymerizable unsaturated monomer having two or more polymerizable unsaturated groups per molecule and about 70 to 99.9 mass % of a polymerizable unsaturated monomer having one polymerizable unsaturated group per molecule; and a shell that is a copolymer (II) consisting of about 1 to 40 mass % of a hydroxy-containing polymerizable unsaturated monomer, about 5 to 50 mass % of a hydrophobic polymerizable unsaturated monomer, and about 10 to 94 mass % of other polymerizable unsaturated monomer(s). The ratio of copolymer (I) to copolymer (II) is preferably in the range of about 5/95 to 95/5, more preferably about 10/90 to 90/10, further preferably about 50/50 to 85/15, particularly preferably about 65/35 to 80/20, in terms of improving DOI and luster of the resulting coating film.

Examples of polymerizable unsaturated monomers having two or more polymerizable unsaturated groups per molecule, and that can be used as a monomer for the core copolymer (I) include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glyceryl di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, etc. Such monomers can be used singly, or in a combination of two or more.

The polymerizable unsaturated monomer having two or more polymerizable unsaturated groups per molecule functions to provide a crosslinked structure to the core copolymer (I). Although the amount of the polymerizable unsaturated monomer having two or more polymerizable unsaturated groups per molecule can be suitably selected according to the desired degree of crosslinking of the core copolymer (I), the amount of the polymerizable unsaturated monomer having two or more polymerizable unsaturated groups per molecule is preferably in a range of about 0.1 to 30 mass %, more preferably about 0.5 to 10 mass %, and even more preferably about 1 to 7 mass %, based on the total mass of the polymerizable unsaturated monomer having two or more polymerizable unsaturated groups per molecule and the polymerizable unsaturated monomer having one polymerizable unsaturated group per molecule.

To suppress metallic mottling of the resulting coating film, the polymerizable unsaturated monomer having two or more polymerizable unsaturated groups per molecule is preferably an amide-containing monomer, such as methylene bis(meth)acrylamide, ethylene bis(meth)acrylamide, etc. The amount of amide-containing monomer, when used, is preferably about 0.1 to 25 mass %, more preferably about 0.5 to 8 mass %, and even more preferably about 1 to 4 mass %, based on the total mass of the polymerizable unsaturated monomer having two or more polymerizable unsaturated groups per molecule and the unsaturated monomer having one polymerizable unsaturated group per molecule.

The polymerizable unsaturated monomer having one polymerizable unsaturated group per molecule, which is used as a monomer for the core copolymer (I), is a polymerizable unsaturated monomer that can be copolymerized with a polymerizable unsaturated monomer having two or more polymerizable unsaturated groups per molecule.

Examples of the polymerizable unsaturated monomer having one polymerizable unsaturated group per molecule include monomers (i) to (xi), and monomers (xiii) to (xvii), which are polymerizable unsaturated monomers other than the polymerizable unsaturated monomers having two or more polymerizable unsaturated groups per molecule, among the polymerizable unsaturated monomers listed as (m-2) component and (m-3) in the explanation of the copolymer. Such monomers can be used singly, or in a combination of two or more according to the required properties of the core-shell-type water-dispersible hydroxy-containing acrylic resin (A1").

The hydroxy-containing polymerizable unsaturated monomer used as a monomer for the shell copolymer (II) introduces a hydroxy group that can crosslink with a curing agent (B) into a water-dispersible acrylic resin, and thereby functions to enhance the water resistance of the coating film and enhance the stability of the water-dispersible acrylic resin in an aqueous medium. Examples of hydroxy-containing polymerizable unsaturated monomers include monoesterified products of (meth)acrylic acid with a dihydric alcohol containing 2 to 8 carbon atoms, such as 2-hydroxyethyl (meth)acrylate, 2-hydroxypropyl (meth)acrylate, 3-hydroxypropyl (meth)acrylate, 4-hydroxybutyl (meth)acrylate, etc.; ε-caprolactone-modified products of the monoesterified products of (meth)acrylic acid with a dihydric alcohol containing 2 to 8 carbon atoms; N-hydroxymethyl (meth)acrylamide; allyl alcohol; (meth)acrylate having a polyoxyethylene chain with a terminal hydroxy group; etc. Such monomers can be used singly, or in a combination of two or more. Examples of monomers preferably used as the hydroxy-containing polymerizable unsaturated monomer include 2-hydroxyethyl (meth)acrylate, 2-hydroxypropyl (meth)acrylate, 3-hydroxypropyl (meth)acrylate, 4-hydroxybutyl (meth)acrylate, etc.

To provide a core-shell-type water-dispersible hydroxy-containing polymerizable unsaturated acrylic resin with excellent stability in an aqueous medium and provide the coating film with excellent water resistance, the amount of hydroxy-containing polymerizable unsaturated monomer is preferably about 1 to 40 mass %, more preferably about 4 to 25 mass %, and even more preferably about 7 to 19 mass %, based on the total mass of the monomers constituting the shell copolymer (II).

The hydrophobic polymerizable unsaturated monomer used as a monomer for the shell copolymer (II) is a polymerizable unsaturated monomer containing a linear, branched or cyclic saturated or unsaturated hydrocarbon group containing 6 or more, more preferably 6 to 18 carbon atoms, excluding monomers containing a hydrophilic group, such as hydroxy-containing polymerizable unsaturated monomers. Examples of hydrophobic polymerizable unsaturated monomers include alkyl or cycloalkyl (meth)acrylates, such as n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate, etc.; isobornyl-containing polymerizable unsaturated compounds, such as isobornyl (meth)acrylate, etc.; adamantyl-containing polymerizable unsaturated compounds, such as adamantyl (meth)acrylate, etc.; and aromatic ring-containing polymerizable unsaturated monomers such as benzyl (meth)acrylate, styrene, α-methylstyrene, vinyltoluene, etc. Such monomers can be used singly, or in a combination of two or more.

To enhance DOI of the resulting coating film, the hydrophobic polymerizable unsaturated monomer is preferably a polymerizable unsaturated monomer having an alkyl group containing 6 to 18 carbon atoms and/or a polymerizable unsaturated monomer having an aromatic ring. Styrene is particularly preferable.

To provide a core-shell-type water-dispersible hydroxy-containing acrylic resin with excellent stability in an aqueous medium and provide the coating film with excellent water resistance, the amount of hydrophobic polymerizable unsaturated monomer is preferably about 5 to 50 mass %, more preferably about 7 to 40 mass %, and even more preferably about 9 to 30 mass %, based on the total mass of the monomers constituting the shell copolymer (II).

The other polymerizable unsaturated monomer(s) used as a monomer for the shell copolymer (II) are polymerizable unsaturated monomers other than hydroxy-containing polymerizable unsaturated monomers and hydrophobic polymerizable unsaturated monomers. Examples of such monomers include alkyl or cycloalkyl (meth)acrylates, such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, etc.; and carboxy-containing polymerizable unsaturated monomers, etc. Such monomers can be used singly, or in a combination of two or more. Specific examples of carboxy-containing polymerizable unsaturated monomers are the same as mentioned above as examples of a monomer for the core copolymer (I). Acrylic acid and/or methacrylic acid are particularly preferable as a carboxy-containing polymerizable unsaturated monomer. By using a carboxy-containing polymerizable unsaturated monomer as other polymerizable unsaturated monomer(s), the resulting core-shell-type water-dispersible hydroxy-containing acrylic resin (A1") becomes stable in an aqueous medium.

To provide a core-shell-type water-dispersible hydroxy-containing acrylic resin (A1") with excellent stability in an aqueous medium and provide the coating film with excellent water resistance, the amount of carboxy-containing polymerizable unsaturated monomer is preferably about 1 to 30 mass %, more preferably about 5 to 25 mass %, and even more preferably about 7 to 19 mass %, based on the total mass of the monomers constituting the shell copolymer (II).

To enhance the luster of the resulting coating film, it is preferable not to use polymerizable unsaturated monomers having two or more polymerizable unsaturated groups per molecule as the other polymerizable unsaturated monomers for constituting the shell copolymer (II), thus forming an uncrosslinked copolymer (II).

To enhance the appearance of the resulting coating film, the ratio of the copolymer (I) to the copolymer (II) in the core-shell-type water-dispersible hydroxy-containing acrylic resin (A1") is preferably in the range of about 5/95 to 95/5, more preferably 10/90 to 90/10, further preferably about 50/50 to 85/15, and particularly preferably about 65/35 to 80/20, on a solids basis.

To provide the coating film with excellent water resistance, etc., the core-shell-type water-dispersible hydroxy-containing acrylic resin (A1") preferably has a hydroxy value of about 1 to 70 mg KOH/g, more preferably about 2 to 50 mg KOH/g, and even more preferably about 5 to 30 mg KOH/g.

To provide the coating composition with excellent storage stability and provide the coating film with excellent water resistance etc., the core-shell-type water-dispersible hydroxy-containing acrylic resin (A1") preferably has an acid value of about 5 to about 90 mg KOH/g, more preferably about 8 to about 50 mg KOH/g, and even more preferably about 10 to about 35 mg KOH/g.

The core-shell-type water-dispersible hydroxy-containing acrylic resin (A1") can be prepared by a process comprising: subjecting to emulsion polymerization a monomer mixture of about 0.1 to 30 mass % of a polymerizable unsaturated monomer having two or more polymerizable unsaturated groups per molecule, and about 70 to 99.9 mass % of a polymerizable unsaturated monomer having one polymerizable unsaturated group per molecule to form an emulsion of a core copolymer (I); adding to this emulsion a monomer mixture of about 1 to 40 mass % of a hydroxy-containing polymerizable unsaturated monomer, about 5 to 50 mass % of a hydrophobic polymerizable unsaturated monomer, and about 10 to 94 mass % of other polymerizable unsaturated monomer(s), and further performing emulsion polymerization to form a shell copolymer (II).

The emulsion polymerization for preparing an emulsion of the core copolymer (I) can be carried out according to known methods. For example, the emulsion can be prepared by subjecting the monomer mixture to emulsion polymerization using a polymerization initiator in the presence of a surfactant.

For the above surfactant, anionic surfactants and nonionic surfactants are suitable. Examples of anionic surfactants include sodium salts and ammonium salts of alkylsulfonic acids, alkylbenzenesulfonic acids, alkylphosphoric acids, etc. Examples of nonionic surfactants include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Other examples of usable surfactants include polyoxyalkylene-containing anionic surfactants that have an anionic group, a polyoxyalkylene group, such as a polyoxyethylene group, polyoxypropylene group, per molecule; and reactive anionic surfactants that have an anionic group and a radically polymerizable unsaturated group per molecule. Among these, reactive anionic surfactants are preferable.

Examples of reactive anionic surfactants include sodium salts of sulfonic acid compounds having a radically polymerizable unsaturated group, such as allyl, methallyl, (meth)acryloyl, propenyl, butenyl or the like; ammonium salts of such sulfonic acid compounds, etc. Among these, ammonium salts of sulfonic acid compounds having a radically polymerizable unsaturated group are preferable in view of the excellent water resistance of the resulting coating film. Examples of commercially available ammonium salts of such sulfonic acid compounds include "LATEMUL S-180A" (tradename of Kao Corporation).

Among the ammonium salts of sulfonic acid compounds having a radically polymerizable unsaturated group, ammonium salts of sulfonic acid compounds having a radically polymerizable unsaturated group and a polyoxyalkylene group are particularly preferable. Commercially available ammonium salts of sulfonic acid compounds having a radically polymerizable unsaturated group and a polyoxyalkylene group include "Aqualon KH-10" (tradename, Dai-Ichi Kogyo Seiyaku Co., Ltd.), "LATEMUL PD-104" (tradename, Kao Corporation), "Adekaria Soap SR-1025" (tradename of ADEKA Co., Ltd.) etc.

The amount of surfactant is preferably about 0.1 to 15 mass %, more preferably about 0.5 to 10 mass %, and even more preferably about 1 to 5 mass %, based on the total mass of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, di-tert-amyl peroxide, tert-butylperoxy-2-ethylhexanoate, tert-butyl peroxylaurate, tert-butyl peroxyisopropylcarbonate, tert-butyl peroxyacetate, diisopropylbenzene hydroperoxide, etc.; azo compounds such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methyl propionate), azobis[2-methyl-N-(2-hydroxyethyl)-propionamide], azobis[2-methyl-N-[2-(1-hydroxy butyl)]-propionamide], etc.; persulfates such as potassium persulfate, ammonium persulfate, sodium persulfate, etc.; etc. Such polymerization initiators can be used singly, or in a combination of two or more. Redox initiators prepared by combining a polymerization initiator as mentioned above with a reducing agent such as sugar, sodium formaldehyde sulfoxylate, iron complex, etc. may also be used.

The amount of polymerization initiator is generally preferably about 0.1 to 5 mass %, and more preferably about 0.2 to 3 mass %, based on the total mass of all of the monomers used. The method of adding the polymerization initiator is not particularly limited, and can be suitably selected according to the kind and amount of polymerization initiator used. For example, the polymerization initiator may be incorporated into a monomer mixture or an aqueous medium beforehand, or may be added dropwise or all at once at the time of polymerization.

The core-shell-type water-dispersible hydroxy-containing acrylic resin (A1") can be obtained by adding to the above-obtained emulsion of the core copolymer (I) a monomer mixture of a hydroxy-containing polymerizable unsaturated monomer, a hydrophobic polymerizable unsaturated monomer, and other polymerizable unsaturated monomer(s), and further performing polymerization to form a shell copolymer (II).

The monomer mixture for forming the shell copolymer (II) may optionally contain other components such as polymerization initiators as mentioned above, chain transfer agents, reducing agents, and surfactants, etc. The monomer mixture is preferably added dropwise as a monomer emulsion obtained by dispersing the monomer mixture into an aqueous medium, although it may be added dropwise as is. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating to a suitable temperature while stirring.

The core-shell-type water-dispersible hydroxy-containing acrylic resin (A1") thus obtained has a multiple-layer structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, a hydrophobic polymerizable unsaturated monomer, and other polymerizable unsaturated monomer(s).

The core-shell-type water-dispersible hydroxy-containing acrylic resin (A1") thus obtained usually has a mean particle size of about 10 to 1,000 nm, and particularly about 20 to 500 nm. In this specification, the mean particle size of the core-shell-type water-dispersible hydroxy-containing acrylic resin (A1") refers to a value obtained by measurement at 20° C. using a submicron particle size distribution analyzer after dilution with deionized water according to a usual method. For example, a "COULTER N4" (tradename, Beckman Coulter, Inc.) can be used as the submicron particle size distribution analyzer.

To improve the mechanical stability of the particles of the core-shell-type water-dispersible hydroxy-containing acrylic resin (A1"), acid groups such as carboxy groups of the water-dispersible acrylic resin are preferably neutralized with a neutralizing agent. The neutralizing agent is not particularly limited, as long as it can neutralize acid groups. Examples of such neutralizing agents include sodium hydroxide, potassium hydroxide, trimethylamine, 2-(dimethylamino)ethanol, 2-amino-2-methyl-1-propanol, triethylamine, aqueous ammonia, etc. Such a neutralizing agent is preferably used in an amount such that the pH of the aqueous dispersion of the water-dispersible acrylic resin after neutralization is about 6.5 to about 9.0.

Further, it is also preferable that the water-dispersible hydroxy-containing acrylic resin (A1') have a core-shell structure with a crosslinked core in terms of improving stability of the resulting water-dispersible hydroxy-containing acrylic resin (A1') in an aqueous medium.

More preferably, to enhance the smoothness, DOI, luster and water resistance of the resulting coating film, the water-dispersible hydroxy-containing acrylic resin (A1') is preferably a core-shell-type water-dispersible hydroxy-containing acrylic resin (A1'-1), which has a core-shell structure having, as the core, copolymer (I) containing, as monomer components, 0.1 to 30 mass % of a polymerizable unsaturated monomer having two or more polymerizable unsaturated groups per molecule and a 70 to 99.9 mass % of a polymerizable unsaturated monomer having one polymerizable unsaturated group per molecule, based on the total mass of the monomer components constituting the core. The core-shell-type water-dispersible hydroxy-containing acrylic resin (A1'-1) contains 5 to 70 mass % of a hydrophobic polymerizable unsaturated monomer (b-1), 0.1 to 25 mass % of hydroxy-containing polymerizable unsaturated monomer (b-2), 0.1 to 20 mass % of carboxy-containing polymerizable unsaturated monomer (b-3), and 0 to 94.8 mass % of polymerizable unsaturated monomer (b-4) other than the polymerizable unsaturated monomers (b-1) to (b-3), based on the total mass of the monomer components constituting the core and the shell.

Examples of the polymerizable unsaturated monomers having two or more polymerizable unsaturated groups per molecule used as a monomer for the core copolymer (I) of the core-shell-type water-dispersible hydroxy-containing acrylic resin (A1'-1) are the same as those listed above. Such monomers can be used singly, or in a combination of two or more.

Further, the amount of the polymerizable unsaturated monomer having two or more polymerizable unsaturated groups per molecule is the same as that specified above.

The polymerizable unsaturated monomer having one polymerizable unsaturated group per molecule, which is used as a monomer for the core copolymer (I) of the core-shell-type water-dispersible hydroxy-containing acrylic resin (A1'-1), is a polymerizable unsaturated monomer that can be copolymerized with a polymerizable unsaturated monomer having two or more polymerizable unsaturated groups per molecule.

Specific examples of the polymerizable unsaturated monomer having one polymerizable unsaturated group per molecule include alkyl or cycloalkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (tradename, Osaka Organic Chemical Industry, Ltd.), cyclohexyl (meth)acrylate, methylcyclohexyl (meth)acrylate, tert-butylcyclohexyl (meth)acrylate, cyclododecyl (meth)acrylate, and tricyclodecanyl (meth)acrylate; isobornyl-containing polymerizable unsaturated monomers such as isobornyl (meth)acrylate; adamantyl-containing polymerizable unsaturated monomers such as adamantyl (meth)acrylate; tricyclodecenyl-containing polymerizable unsaturated monomers such as tricyclodecenyl (meth)acrylate; aromatic ring-containing polymerizable unsaturated monomers such as benzyl (meth)acrylate, styrene, α-methylstyrene and vinyltoluene; alkoxysilyl-containing polymerizable unsaturated monomers such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; fluorinated alkyl-containing polymerizable unsaturated monomers such as fluoroolefins; polymerizable unsaturated monomers having photopolymerizable functional groups such as a maleimide group; vinyl compounds such as N-vinylpyrrolidone, ethylene, butadiene, chloroprene, vinyl propionate and vinyl acetate; hydroxy-containing polymerizable unsaturated monomers such as monoesterified products of (meth)acrylic acid with a dihydric alcohol containing 2 to 8 carbon atoms such as 2-hydroxyethyl (meth)acrylate, 2-hydroxypropyl (meth)acrylate, 3-hydroxypropyl (meth)acrylate and 4-hydroxybutyl (meth)acrylate, ε-caprolactone-modified products of the monoesterified products, N-hydroxymethyl (meth)acrylamide, allyl alcohol, and (meth)acrylates having hydroxy-terminated polyoxyethylene chains; carboxy-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide and adducts of glycidyl (meth)acrylate with amine compounds; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; and (meth)acrylates having alkoxy-terminated polyoxyethylene chains. These monomers can be used singly, or in a combination of two or more, depending on the performance required for the core-shell type water-dispersible hydroxyl-containing acrylic resin (A1'-1).

For the polymerizable unsaturated monomer having one polymerizable unsaturated group per molecule, it is preferable to use, at least partially, polymerizable unsaturated monomer having a C1 or C2 alkyl group.

Examples of the polymerizable unsaturated monomer having a C1 or C2 alkyl group include methyl acrylate, methyl methacrylate, ethyl acrylate and ethyl methacrylate. These monomers can be used singly, or in a combination of two or more.

When the polymerizable unsaturated monomer having one polymerizable unsaturated group per molecule includes the polymerizable unsaturated monomer having a C1 or C2 alkyl group, the amount of the above-mentioned polymerizable unsaturated monomer having a C1 or C2 alkyl group is preferably about 20 to 99.9 mass %, more preferably about 30 to 99.5 mass %, and even more preferably about 40 to 99 mass %, based on the total mass of the polymerizable unsaturated monomer having one polymerizable unsaturated group per molecule and the polymerizable unsaturated monomer having two or more polymerizable unsaturated groups per molecule, in terms of improving the smoothness, DOI and luster of the resulting coating film.

The core-shell type water-dispersible hydroxyl-containing acrylic resin (A1'-1) usually has a mean particle size of about 10 to 1,000 nm, and particularly about 20 to 500 nm.

In this specification, the mean particle size of the core-shell-type water-dispersible hydroxyl-containing acrylic resin (A1'-1) refers to a value obtained by measurement at 20° C. using a dynamic light-scattering particle size distribution analyzer after dilution with deionized water according to a usual method. For example, an "N5 Submicron Particle Size Analyzer" (tradename of Beckman Coulter, Inc.) can be used as the dynamic light-scattering particle size distribution analyzer.

To improve the mechanical stability of the particles of the core-shell type water-dispersible hydroxyl-containing acrylic resin (A1'-1), acidic groups such as carboxyl groups of the water-dispersible acrylic resin are preferably neutralized with a neutralizing agent. Any neutralizing agent that can neutralize acidic groups can be used. Examples of the neutralizing agent include sodium hydroxide, potassium hydroxide, trimethylamine, 2-(dimethylamino)ethanol, 2-amino-2-methyl-1-propanol, triethylamine, aqueous ammonia, etc. The neutralizing agent is preferably used in an amount such that the pH of an aqueous dispersion of the neutralized water-dispersible acrylic resin is about 6.5 to about 9.0.

More preferably, to enhance smoothness, DOI, luster and water resistance of the resulting coating film, the core-shell-type water-dispersible hydroxy-containing acrylic resin (A1'-1) is preferably a core-shell-type water-dispersible hydroxy-containing acrylic resin (A1'-2), which has a core-shell structure having, as the core, copolymer (I) containing, as monomer components, 0.1 to 30 mass % of a polymerizable unsaturated monomer having two or more polymerizable unsaturated groups per molecule and a 70 to 99.9 mass % of a polymerizable unsaturated monomer having one polymerizable unsaturated group per molecule; and, as the shell, copolymer (II) containing, as monomer components, 5 to 80 mass % of a hydrophobic polymerizable unsaturated monomer (b-1), 0.1 to 50 mass % of hydroxy-containing polymerizable unsaturated monomer (b-2), 0.1 to 50 mass % of carboxy-containing polymerizable unsaturated monomer (b-3), and 0 to 94.8 mass % of polymerizable unsaturated monomer (b-4) other than the polymerizable unsaturated monomers (b-1) to (b-3). The ratio of copolymer (I) to copolymer (II) in solids content by mass is in a range of from copolymer (I)/copolymer (II)=5/95 to 95/5. To enhance the smoothness, DOI, luster and water resistance of the resulting coating film, the ratio of copolymer (I) to copolymer (II) in solids content by mass is preferably about 50/50 to 85/15, more preferably about 65/35 to 80/20.

Although the amount of the polymerizable unsaturated monomer having two or more polymerizable unsaturated groups per molecule in the core-shell-type water-dispersible hydroxy-containing acrylic resin (A1'-2) can be suitably selected according to the desired degree of crosslinking of the core copolymer (I), the amount is preferably about 0.1 to 30 mass %, more preferably about 0.5 to 10 mass %, and even more preferably about 1 to 7 mass %, based on the total mass of the polymerizable unsaturated monomer having two or more polymerizable unsaturated groups per molecule and the unsaturated monomer having one polymerizable unsaturated group per molecule.

In the core-shell-type water-dispersible hydroxyl-containing acrylic resin (A1'-2), the amounts of hydrophobic polymerizable unsaturated monomer (b-1), hydroxy-containing polymerizable unsaturated monomer (b-2), carboxy-containing polymerizable unsaturated monomer (b-3) and polymerizable unsaturated monomer (b-4) other than the polymerizable unsaturated monomers (b-1) to (b-3) in the shell preferably fall within the following ranges in terms of ensuring stability in an aqueous medium, and in terms of improving the smoothness, DOI, luster and water resistance of the resulting coating film. The following ranges are based on the total mass of the monomers constituting the shell.

Hydrophobic polymerizable unsaturated monomer (b-1): 5 to 80 mass %, preferably 7 to 70 mass %, more preferably 8 to 65 mass %;

Hydroxy-containing polymerizable unsaturated monomer (b-2): 0.1 to 50 mass %, preferably 4 to 25 mass %, more preferably 7 to 19 mass %;

Carboxy-containing polymerizable unsaturated monomer (b-3): 0.1 to 50 mass %, preferably 5 to 25 mass %, more preferably 7 to 19 mass %;

Polymerizable unsaturated monomer (b-4) other than polymerizable unsaturated monomers (b-1) to (b-3): 0 to 94.8 mass %, preferably 10 to 84 mass %, more preferably 15 to 78 mass %.

To enhance the smoothness, DOI and luster of the resulting coating film, it is preferable not to use the polymerizable unsaturated monomers having two or more polymerizable unsaturated groups per molecule as the other polymerizable unsaturated monomer(s) for the shell copolymer (II), thus forming an uncrosslinked copolymer (II).

The core-shell-type water-dispersible hydroxy-containing acrylic resin (A1'-2) can be prepared by a process comprising: subjecting to emulsion polymerization a monomer mixture of about 0.1 to about 30 mass % of a polymerizable unsaturated monomer having two or more polymerizable unsaturated groups per molecule, and about 70 to about 99.9 mass % of a polymerizable unsaturated monomer having one polymerizable unsaturated group per molecule to form an emulsion of a core copolymer (I); adding to this emulsion a monomer mixture of 5 to 80 mass % of a hydrophobic polymerizable unsaturated monomer (b-1), 0.1 to 50 mass % of a hydroxy-containing polymerizable unsaturated monomer (b-2), 0.1 to 50 mass % of a carboxy-containing polymerizable unsaturated monomer (b-3), and about 0 to 94 mass % of polymerizable unsaturated monomer(s) (b-4) other than polymerizable unsaturated monomers (b-1) to (b-3), and further performing emulsion polymerization to form a shell copolymer (II).

The emulsion polymerization for preparing an emulsion of the core copolymer (I) can be carried out according to known methods. For example, the emulsion can be prepared by subjecting the monomer mixture to emulsion polymerization in the presence of a surfactant using a polymerization initiator.

The surfactant and the polymerization initiator may be selected from the above-mentioned examples. The amounts of the surfactant and the polymerization initiator can also be determined according to the above-mentioned range.

The core-shell-type water-dispersible hydroxy-containing acrylic resin (A1'-2) can be obtained by adding to the above-obtained emulsion of the core copolymer (I) a monomer mixture of a hydrophobic polymerizable unsaturated monomer (b-1), a hydroxy-containing polymerizable unsaturated monomer (b-2), a carboxy-containing polymerizable unsaturated monomer (b-3) and a polymerizable unsaturated monomer(s) (b-4) other than polymerizable unsaturated monomers (b-1) to (b-3), and further performing polymerization to form a shell copolymer (II).

The monomer mixture for forming the shell copolymer (II) may optionally contain other components such as polymerization initiators as mentioned above, chain transfer agents, reducing agents, and surfactants, etc. The monomer mixture is preferably added dropwise as a monomer emulsion obtained by dispersing the monomer mixture into an aqueous medium, although it may be added dropwise as is. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating to a suitable temperature while stirring.

The core-shell-type water-dispersible hydroxy-containing acrylic resin (A1'-2) thus obtained has a multiple-layer structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydrophobic polymerizable unsaturated monomer (b-1), a hydroxy-containing polymerizable unsaturated monomer (b-2), a carboxy-containing polymerizable unsaturated monomer (b-3) and a polymerizable unsaturated monomer(s) (b-4) other than polymerizable unsaturated monomers (b-1) to (b-3).

Hydroxy-Containing Polyester Resin (A2)

In the aqueous coating composition of the present invention, use of a hydroxy-containing polyester resin (A2) as the film-forming resin (A) improves the performance of the resulting coating film in terms of smoothness, DOI, water resistance and the like.

The hydroxy-containing polyester resin (A2) can usually be produced by an esterification reaction or transesterification reaction of an acid component with an alcohol component.

The acid component may be a compound that is conventionally used as an acid component for producing a polyester resin. Examples of such acid components include aliphatic polybasic acids, alicyclic polybasic acids, aromatic polybasic acids, etc.

Generally, aliphatic polybasic acids include aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, butane tetracarboxylic acid, and like aliphatic polycarboxylic acids; anhydrides of such aliphatic polycarboxylic acids; esters of such aliphatic polycarboxylic acids with about C1-C4 lower alkyls; etc. Such aliphatic polybasic acids can be used singly, or in a combination of two or more.

In terms of the smoothness, DOI etc. of the resulting coating film, it is particularly preferable to use adipic acid and/or adipic anhydride as an aliphatic polybasic acid.

Generally, alicyclic polybasic acids include compounds having at least one alicyclic structure and at least two carboxy groups per molecule; acid anhydrides of such compounds; and esters of such compounds. The alicyclic structure is typically a 4-6 membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; esters of such alicyclic polycarboxylic acids with about C1-C4 lower alkyls; etc. Such alicyclic polybasic acids can be used singly, or in a combination of two or more.

In terms of the smoothness, DOI etc. of the resulting coating film, preferable alicyclic polybasic acids include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, it is particularly preferable to use 1,2-cyclohexanedicarboxylic acid and/or 1,2-cyclohexanedicarboxylic anhydride.

Generally, aromatic polybasic acids include aromatic compounds having at least two carboxy groups per molecule; anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; esters of such aromatic polycarboxylic acids with about C1 to about C4 lower alkyls; etc. Such aromatic polybasic acids can be used singly, or in a combination of two or more.

Preferable aromatic polybasic acids include phthalic acid, phthalic anhydride, isophthalic acid, trimellitic acid, and trimellitic anhydride.

Acid components other than aliphatic polybasic acids, alicyclic polybasic acids, and aromatic polybasic acids can also be used. Such other acid components are not limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linolic acid, linolenic acid, benzoic acid, p-tert-butyl benzoic acid, cyclohexanoic acid, 10-phenyloctadecanoic acid, and like monocarboxylic acids; and lactic acid, 3-hydroxybutanoic acid, 3-hydroxy-4-ethoxybenzoic acid, and like hydroxycarboxylic acids. Such acid components can be used singly, or in a combination of two or more.

Polyhydric alcohols having at least two hydroxy groups per molecule can be preferably used as the above-mentioned alcohol component. Examples of such polyhydric alcohols include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F, dimethylol propionic acid, and like dihydric alcohols; polylactone diols obtained by adding lactone compounds, such as ε-caprolactone, to such dihydric alcohols; bis(hydroxyethyl) terephthalate and like ester diol compounds; alkylene oxide adducts of bisphenol A, polyethylene glycols, polypropylene glycols, polybutylene glycols, and like polyether diol compounds; glycerol, trimethylolethane, trimethylolpropane, diglycerol, triglycerol, 1,2,6-hexanetriol, pentaerythritol, dipentaerythritol, tris(2-hydroxyethyl)isocyanuric acid, sorbitol, mannitol, and like trihydric or higher polyhydric alcohols; polylactone polyol compounds obtained by adding lactone compounds, such as ε-caprolactone, to such trihydric or higher polyhydric alcohols; and fatty acid esters of glycerol, etc.

Alcohol components other than polyhydric alcohols can also be used. Such other alcohol components are not limited, and include, for example, methanol, ethanol, propyl alcohol, butyl alcohol, stearyl alcohol, 2-phenoxyethanol, and like monohydric alcohols; alcohol compounds obtained by reacting, with acids, propylene oxide, butylene oxide, "Cardura E10" (tradename of HEXION Specialty Chemicals; glycidyl ester of a synthetic highly branched saturated fatty acid), and like monoepoxy compounds; etc.

The production method for the hydroxy-containing polyester resin (A2) is not limited, and may be performed by any usual method. For example, the hydroxy-containing polyester resin can be produced by heating the acid component and alcohol component in a nitrogen stream at about 150 to about 250° C. for about 5 to 10 hours to thereby carry out an esterification reaction or transesterification reaction of the acid component with the alcohol component.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy-and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, known catalysts are usable, including, for example, dibutyltin oxide, antimony trioxide, zinc acetate, manganese acetate, cobalt acetate, calcium acetate, lead acetate, tetrabutyl titanate, tetraisopropyl titanate, etc.

The hydroxy-containing polyester resin (A2) can be modified with a fatty acid, monoepoxy compound, polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, flaxseed oil fatty acid, tung oil fatty acid, rapeseed oil fatty acid, castor oil fatty acid, dehydrated castor oil fatty acid, safflower oil fatty acid, etc. Preferable examples of the monoepoxy compound include "Cardura E10" (tradename of HEXION Specialty Chemicals; glycidyl ester of a synthetic highly branched saturated fatty acid).

Examples of the polyisocyanate compound include lysine diisocyanate, hexamethylene diisocyanate, trimethylhexane diisocyanate, and like aliphatic diisocyanate compounds; hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), 1,3-(isocyanatomethyl)cyclohexane, and like alicyclic diisocyanate compounds; tolylene diisocyanate, xylylene diisocyanate, diphenylmethane diisocyanate, and like aromatic diisocyanate compounds; organic polyisocyanates, such as lysine triisocyanate and like tri-or higher polyisocyanates; adducts of such organic polyisocyanates with polyhydric alcohols, low-molecular-weight polyester resins, water, and/or the like; cyclopolymers (e.g., isocyanurate), biuret adducts, etc., of such organic polyisocyanates; etc. Such polyisocyanate compounds can be used singly, or in a combination of two or more.

In the hydroxy-containing polyester resin (A2), to obtain a coating film with excellent smoothness, DOI and excellent water resistance, the proportion of alicyclic polybasic acid in the acid components used as starting materials is, based on the total amount of the acid components, preferably about 20 to 100 mol %, more preferably about 25 to 95 mol %, and even more preferably about 30 to 90 mol %. In particular, it is preferable to use, as an alicyclic polybasic acid, 1,2-cyclohexanedicarboxylic acid and/or 1,2-cyclohexanedicarboxylic anhydride, in terms of providing a coating film with excellent smoothness, DOI etc. of the resulting coating film.

The hydroxy-containing polyester resin (A2) preferably has a hydroxy value of about 1 to 200 mg KOH/g, more preferably about 2 to 180 mg KOH/g, and even more preferably about 5 to 170 mg KOH/g. When the hydroxy-containing polyester resin (A2) also has a carboxy group, the acid value of the resin is preferably about 5 to 150 mg KOH/g, more preferably about 10 to 100 mg KOH/g, and even more preferably about 15 to 80 mg KOH/g. The hydroxy-containing polyester resin (A2) preferably has a number average molecular weight of about 500 to about 50,000, more preferably about 1,000 to about 30,000, and even more preferably about 1,200 to about 10,000.

The above hydroxy-containing polyester resin (A2) can be neutralized using a basic compound. Examples of basic compounds include hydroxides of alkali metals or alkaline earth metals such as sodium hydroxide, potassium hydroxide, lithium hydroxide, calcium hydroxide, and barium hydroxide; ammonia; primary monoamines such as ethylamine, propylamine, butylamine, benzylamine, monoethanolamine, 2,2-dimethyl-3-amino-1-propanol, 2-aminopropanol, 2-amino-2-methyl-1-propanol, and 3-aminopropanol; secondary monoamines such as diethylamine, diethanolamine, di-n-propanolamine, di-iso-propanolamine, N-methylethanolamine, and N-ethylethanolamine; tertiary monoamines such as dimethylethanolamine, trimethylamine, triethylamine, triisopropylamine, methyldiethanolamine, and 2-(dimethylamino)ethanol; polyamines such as diethylenetriamine, hydroxyethylaminoethylamine, ethylaminoethylamine, and methylaminopropylamine; etc. Such basic compounds can be used singly, or in a combination of two or more. It is preferable to use a water-soluble basic compound.

The amount of the hydroxy-containing polyester resin (A2) in the aqueous coating composition of the present invention is generally 2 to 70 mass %, preferably 10 to 50 mass %, more preferably 15 to 40 mass %, based on 100 mass % of the resin solids content of the coating composition.

Examples of polyurethane resins include a polyurethane resin obtained by reacting an aliphatic and/or alicyclic diisocyanate, at least one diol selected from the group consisting of polyetherdiol, polyesterdiol and polycarbonatediol, a low molecular weight polyhydroxyl compound and a dimethylol alkanoic acid to form a urethane prepolymer; neutralizing the resulting urethane prepolymer with a tertiary amine; dispersing the neutralized urethane prepolymer to be emulsified; mixing the resulting emulsion with an aqueous medium containing a chain extension agent, a crosslinking agent and/or a quenching agent as required; and continuing the reaction until the isocyanate group is substantially removed. This method generally produces a self-emulsified polyurethane resin having a mean particle diameter of about 0.001 to 3 µm.

The amount of the polyurethane resin in the aqueous coating composition of the present invention is generally 2 to 70 mass %, preferably 5 to 50 mass %, more preferably 8 to 30 mass %, based on 100 mass % of the resin solids content of the coating composition.

Curing Agent (B)

The curing agent (B) is a compound that reacts with crosslinkable functional groups, such as hydroxy groups, carboxy groups, epoxy groups, etc., in the aqueous film-forming resin (A), to thereby cure the aqueous coating composition of the present invention. Examples of the curing agent (B) include amino resins, polyisocyanate compounds, blocked polyisocyanate compounds, epoxy-containing compounds, carboxy-containing compounds, carbodiimide group-containing compounds, etc. Among these, amino resins, polyisocyanate compounds and blocked polyisocyanate compounds, which react with hydroxy groups, and carbodiimide group-containing compounds, which react with carboxy groups, are preferable. Amino resins and blocked polyisocyanate compounds are more preferable. Amino resins are particularly preferable. Such compounds can be used singly, or in a combination of two or more as the curing agent (B).

Usable amino resins include partially or fully methylolated amino resins obtained by the reactions of amino components with aldehyde components. Examples of the amino components include melamine, urea, benzoguanamine, acetoguanamine, steroguanamine, spiroguanamine, dicyandiamide, etc. Examples of aldehyde components include formaldehyde, paraformaldehyde, acetaldehyde, benzaldehyde, etc.

Methylolated amino resins in which some or all of the methylol groups have been etherified with suitable alcohols are also usable. Alcohols that can be used for the etherification include, for example, methyl alcohol, ethyl alcohol, n-propyl alcohol, isopropyl alcohol, n-butyl alcohol, isobutyl alcohol, 2-ethylbutanol, 2-ethylhexanol, etc.

Preferable amino resins include melamine resins. Particularly preferable amino resins include methyl-etherified melamine resins obtained by etherifying some or all of the methylol groups of partially or fully methylolated melamine resins with methyl alcohol; butyl-etherified melamine resins obtained by etherifying some or all of the methylol groups of partially or fully methylolated melamine resins with butyl alcohol; and methyl-butyl-etherified melamine resins obtained by etherifying some or all of the methylol groups of partially or fully methylolated melamine resins with methyl alcohol and butyl alcohol. Among these, methyl-butyl-etherified melamine resins are particularly preferable.

These melamine resins preferably have a weight average molecular weight of about 400 to about 6,000, more preferably about 800 to about 5,000, even more preferably about 1,000 to about 4,000, and most preferably about 1,200 to about 3,000.

In the present specification, the "number average molecular weight" and the "weight average molecular weight" of the film-forming resin (A) and the curing agent (B) are determined by measuring the retention time (retention volume) using Gel Permeation Chromatography (GPC), and converting the value into a polystyrene molecular amount based on the retention time (retention volume) of the standard polystyrene, which has a given molecular amount, measured under the same condition. More specifically, the "number average molecular weight" and the "weight average molecular weight" can be measured using an "HLC-8120GPC" (manufactured by Tosoh Corporation) as a Gel Permeation Chromatography device at 40° C. and a flow rate of 1 ml/min using four separation columns, i.e., "TSKgel G-4000 HXL", "TSKgel G-3000 HXL", "TSKgel G-2500 HXL" and "TSKgel G-2000 HXL" (manufactured by Tosoh Corporation), tetrahydrofuran as an eluant, and a differential refractometer detector.

Commercially available melamine resins can be used as the melamine resin. Examples include commercially available products such as "Cymel 202", "Cymel 203", "Cymel 238", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", "Cymel 1130" (products of Nihon Cytec Industries Inc.), "U-VAN 120", "U-VAN 20HS", "U-VAN 20SE60", "U-VAN 2021", "U-VAN 2028", "U-VAN 28-60" (products of Mitsui Chemicals, Inc.), etc.

In the aqueous coating composition of the present invention, it is preferable to use a hydroxy-containing acrylic resin (A1), preferably a water-dispersible hydroxyl-containing acrylic resin (A1') and/or a core-shell-type water-dispersible hydroxy-containing acrylic resin (A1"), as the film-forming resin (A); and to use a melamine resin with a weight average molecular weight of about 1,000 to about 4,000, and more preferably about 1,200 to about 3,000, as the curing agent (B), to obtain a coating film with excellent flip-flop property and excellent water resistance.

When a melamine resin is used as the curing agent (B), paratoluene sulfonic acid, dodecylbenzenesulfonic acid, dinonylnaphthalene sulfonic acid, or like sulfonic acid; monobutyl phosphate, dibutyl phosphate, mono-2-ethylhexyl phosphate, di-2-ethylhexyl phosphate or the like alkyl phosphoric esters, or a salt of these acids with an amine compound, can be used as a catalyst.

The blocked polyisocyanate compounds are compounds obtained by blocking, with blocking agents, isocyanate groups of polyisocyanate compounds having at least two isocyanate groups per molecule. Examples of such blocking agents include phenol, cresol, xylenol, nitrophenol, ethylphenol, hydroxydiphenyl, butylphenol, isopropylphenol, nonylphenol, octylphenol, methyl hydroxybenzoate and like phenol-based blocking agents; ε-caprolactam, δ-valerolactam, γ-butyrolactam, β-propiolactam and like lactam-based blocking agents; methanol, ethanol, propyl alcohol, butyl alcohol, amyl alcohol, lauryl alcohol and like aliphatic alcohol-based blocking agents; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and like ether-based blocking agents; benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, 2-hydroxyethyl methacrylate and like alcohol-based blocking agents; formamide oxime, acetamide oxime, acetoxime, methyl ethyl ketoxime, diacetyl monoxime, benzophenone oxime, cyclohexane oxime and like oxime-based blocking agents; dimethyl malonate, diethyl malonate, ethyl acetoacetate, methyl acetoacetate, acetylacetone and like active methylene group-containing compound-based blocking agents; butyl mercaptan, tert-butyl mercaptan, hexyl mercaptan, tert-dodecyl mercaptan, 2-mercaptobenzothiazole, thiophenol, methylthiophenol, ethylthiophenol and like mercaptan-based blocking agents; acetanilide, acetanisidide, acetotoluide, acrylamide, methacrylamide, acetamide, stearamide, benzamide and like acid amide-based blocking agents; succinimide, phthalimide, maleimide and like imide-based blocking agents; diphenylamine, phenylnaphthylamine, xylidine, N-phenylxylidine, carbazole, aniline, naphthylamine, butylamine, dibutylamine, butylphenylamine and like amine-based blocking agents; imidazole, 2-ethylimidazole and like imidazole-based blocking agents; urea, thiourea, ethylene urea, ethylenethiourea, diphenylurea and like urea-based blocking agents; phenyl N-phenylcarbamate and like carbamate-based blocking agents; ethyleneimine, propyleneimine, and like imine-based blocking agents; sodium bisulfite, potassium bisulfite, and like sulfite salt-based blocking agents; and azole compounds etc. Examples of azole compounds include pyrazole and pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, and the like; imidazole and imidazole derivatives such as imidazole, benzimidazole, 2-methylimidazole, 2-ethylimidazole, 2-phenylimidazole, and the like; imidazoline derivatives such as 2-methylimidazoline, 2-phenylimidazoline, etc.

Examples of polyisocyanate compounds having at least two isocyanate groups per molecule include hexamethylene diisocyanate, trimethylhexamethylene diisocyanate, dimer acid diisocyanate, lysine diisocyanate, and like aliphatic diisocyanate compounds; hydrogenated xylylene diisocyanate, cyclohexylene diisocyanate, isophorone diisocyanate, and like alicyclic diisocyanate compounds; tolylene diisocyanate, phenylene diisocyanate, 4,4'-diphenylmethane diisocyanate, xylylene diisocyanate, tetramethylxylylene diisocyanate, naphthalene diisocyanate, and like aromatic diisocyanate compounds; trivalent or higher organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly referred to as triamino-nonane triisocyanate); dimers and trimers of such polyisocyanate compounds; prepolymers obtained by urethanization reactions of such polyisocyanate compounds with polyhydric alcohols, low-molecular-weight polyester resins, or water, under conditions such that isocyanate groups are present in excess, etc.

Examples of carbodiimide group-containing compounds include, for example, those obtained by the decarbonation reactions between isocyanate groups of the above-mentioned polyisocyanate compounds. It is preferable to use, as the carbodiimide group-containing compound, a polycarbodiimide compound containing at least two carbodiimide groups per molecule.

The above-mentioned carbodiimide compounds are preferably water-soluble or water-dispersible polycarbodiimide compounds, in terms of the smoothness, DOI etc. of the resulting coating films. There is no particular limitation to the water-soluble or water-dispersible polycarbodiimide compounds, so long as the polycarbodiimide compounds are stably dissolved or dispersed in an aqueous medium.

Examples of the water-soluble polycarbodiimide compounds include "Carbodilite SV-02", "Carbodilite V-02", "Carbodilite V-02-L2", "Carbodilite V-04" (manufactured by Nisshinbo Industries, Inc., trade names), and the like. Examples of the water-dispersible polycarbodiimide compounds include "Carbodilite E-01", "Carbodilite E-02" (manufactured by Nisshinbo Industries, Inc., trade names), and the like.

Such carbodiimide compounds can be used singly, or in a combination of two or more.

It is preferable that the proportions of the aqueous film-forming resin (A) and curing agent (B) in the aqueous metallic coating composition of the present invention be, based on the total amount of these components, about 30 to 95 mass %, preferably about 50 to 90 mass %, and more preferably about 60 to 80 mass % for the former; and about 5 to 70 mass %, preferably about 10 to 50 mass %, and more preferably about 20 to 40 mass % for the latter, to improve the smoothness, DOI and water resistance of the resulting coating film.

The amount of the curing agent (B) in the coating composition of the present invention is generally 5 to 60 parts by mass, preferably 10 to 50 parts by mass, more preferably 20 to 40 parts by mass, based on 100 parts by mass of the solids content of the resin component constituting the coating composition.

When the aqueous coating composition of the present invention comprises a hydroxy-containing acrylic resin (A1), the proportion of the hydroxy-containing acrylic resin (A1) is, based on the total amount of the aqueous film-forming resin (A) and the curing agent (B), preferably about 2 to 70 mass %, more preferably about 5 to 55 mass %, and even more preferably about 10 to 40 mass %.

When the aqueous coating composition of the present invention comprises the hydroxy-containing polyester resin (A2), the proportion of the hydroxy-containing polyester resin (A2) is, based on the total amount of the aqueous film-forming resin (A) and the curing agent (B), preferably about 2 to 70 mass %, more preferably about 5 to 55 mass %, and even more preferably about 10 to 40 mass %.

Preparation of Aqueous Coating Composition

The aqueous coating composition of the present invention can be prepared by, for example, mixing the film-forming resin (A) and the copolymer(s), together with, if necessary, the curing agent (B) etc. in an aqueous medium using a known method; and dissolving or dispersing the components in the medium.

Examples of usable aqueous media include water and organic-solvent-mixed solutions obtained by dissolving hydrophilic organic solvents in water. Examples of usable hydrophilic organic solvents include methyl alcohol, ethyl alcohol, isopropyl alcohol, propylene glycol monopropyl ether, ethylene glycol monobutyl ether, propylene glycol mono methyl ether, propylene glycol monobutyl ether, dipropylene glycol monomethyl ether, dipropylene glycol monobutyl ether, tripropylene glycol monomethyl ether, 3-methyl-3-methoxybutanol etc. Such media can be used singly, or in a combination of two or more. The proportion of the water and the organic solvent in the water and organic-solvent-mixed solution is not particularly limited. However, the preferable amount of organic solvent is 1 to 50 mass %, more preferably 5 to 35 mass %

The "aqueous coating composition" refers to a composition contrasted with the organic solvent coating composition, and generally represents a coating composition obtainable by dissolving and/or dispersing the film-forming resin, a pigment etc. in water or an aqueous medium that mainly contains water. When the coating composition of the present invention is an aqueous coating composition, the water content of the coating composition is preferably in a range of from 10 to 90 mass %, more preferably 20 to 80 mass %, further preferably 30 to 70 mass %.

The proportion between the film-forming resin (A) and the copolymer(s) is determined according to storage stability of the aqueous coating composition, appearance, coating performance (water resistance etc.) and the like of the resulting coating film. The proportion of the copolymer(s) is preferably not less than 0.05 parts by mass, more preferably not less than 0.1 parts by mass, further preferably not less than 0.2 parts by mass, and not more than 30 parts by mass, more preferably not more than 20 parts by mass, further preferably not more than 10 parts by mass, most preferably not more than 5 parts by mass, based on 100 parts by mass of the film-forming resin (A).

Further, in terms of storage stability of the aqueous coating composition, appearance, coating performance (water resistance etc.) and the like of the resulting coating film, the proportion of the copolymer(s) in the aqueous coating composition of the present invention is preferably in a range of from 0.01 to 15 parts by mass, more preferably 0.05 to 10 parts by mass, further preferably 0.1 to 5 parts by mass, based on 100 parts by mass of the aqueous coating composition.

Furthermore, when using, as the film-forming resin (A), the water-dispersible hydroxy-containing acrylic resin (A1') having an acid value of 1 to 100 mg KOH/g and a hydroxy value of to 100 mg KOH/g obtainable through copolymerization of components (b-1) to (b-3) and also component (b-4) as necessary, the aqueous coating composition of the present invention contains the copolymer(s) and the water-dispersible hydroxy-containing acrylic resin (A1') at the following ratio based on 100 parts by mass of the resin solids content of the aqueous coating composition.

Copolymer: 0.05 to 20 parts by mass, preferably 0.1 to 10 parts by mass, more preferably 0.2 to 5 parts by mass;

Water-dispersible hydroxy-containing acrylic resin (A1'): 2 to 70 parts by mass, preferably 5 to 55 parts by mass, more preferably 10 to 40 parts by mass.

Here, "the resin solids content of the aqueous coating composition" generally refers to the total content of the resin solids content of the copolymer(s) and the water-dispersible hydroxy-containing acrylic resin (A1'), and the resin solids content of other resin(s) and the curing agent (B) added to the aqueous coating composition of the present invention as required.

The reason why the aqueous coating composition of the present invention containing a copolymer has the high viscosity and why the viscosity decreases with an increase in rate of shear, in particular, the reason why the viscosity is expressed and the viscosity decreased with an increase in rate of shear even in the aqueous coating composition containing a surfactant is assumed to be as follows. Since the polymer present in the side chain of the copolymer of the present invention contains a C4-C24 alkyl-derived group, the hydrophobic interaction forms a network structure. This is conducive to the high viscosity. Furthermore, the number average molecular weight of the polymer falls within a range of 1,000 to 10,000, which indicates a relatively large volume of the polymer; therefore, the network structure is not easily susceptible to the surfactant.

It is further assumed that because the polymerizable unsaturated monomer (a) having a C4-24 alkyl group contains the ester bond in the molecule, the polymer is not excessively hydrophobic despite the relatively large molecular weight, thereby suppressing aggregation of the side chain and forming the network structure due to hydrophobic interaction. It is further assumed that when the aqueous coating composition contains, as the film-forming resin (A), a resin having a ester bond, the viscosity is further developed by the formation of a network structure more strongly bonded together by the high affinity between the ester bond in the film-forming resin (A) and the ester bond in the C4-C24 alkyl-containing polymerizable unsaturated monomer (a) present in the side chain of a copolymer of the present invention.

If necessary, the aqueous coating composition of the present invention may contain additives for coating compositions, such as luster pigments, coloring pigments, extender pigments, hydrophobic organic solvents, curing catalysts, UV absorbers, light stabilizers, pigment dispersants, antifoaming agents, plasticizers, surface control agents, antisettling agents, etc.

Examples of the luster pigments include aluminium (including evaporated aluminium), copper, zinc, brass, nickel, aluminium oxide, mica, aluminium oxide coated with titanium oxide or iron oxide, mica coated with titanium oxide or iron oxide, etc. Such luster pigments can be used singly, or in a combination of two or more. These pigments preferably have a scale-like shape. Among these pigments, aluminium, mica, aluminium oxide coated with titanium oxide and iron oxide, and mica coated with titanium oxide or iron oxide are preferable, and aluminium is even more preferable.

Preferably used scaly luster pigments have a length in the longitudinal direction of about 1 to 100 μm, preferably about 5 to 40 μm, and a thickness of about 0.001 to 5 μm, preferably about 0.01 to 2 μm.

When the aqueous coating composition of the present invention contains the above-mentioned luster pigment, it is possible to form an advantageous coating film having excellent luster with a high flip-flop property and reduced metallic mottling.

When the aqueous coating composition of the present invention contains the luster pigment, the content of the luster pigment is generally preferably about 1 to 100 parts by mass, more preferably about 2 to 50 parts by mass, further preferably about 3 to 30 parts by mass, based on 100 parts by mass of the solids content of the film-forming resin (A).

The aqueous coating composition of the present invention may further contain a phosphoric acid group-containing resin as a resin component, in addition to the above-mentioned film-forming resin (A). In particular, when the aqueous coating composition of the present invention contains the above-mentioned luster pigment, especially an aluminium pigment, it is preferable that the aqueous coating composition of the present invention contain the phosphoric acid group-containing resin, in view of the smoothness, DOI, reduction in metallic mottling, and water resistance of the resulting coating film.

The above-mentioned phosphoric acid group-containing resin can be produced, for example, by copolymerizing the phosphoric acid group-containing polymerizable unsaturated monomer and the other polymerizable unsaturated monomer by solution polymerization or other known methods. Examples of the above-mentioned phosphoric acid group-containing polymerizable unsaturated monomer include acid phosphoxyethyl (meth)acrylate, acid phosphoxypropyl (meth)acrylate, reaction products of glycidyl (meth)acrylate and alkyl phosphoric acid, etc. These can be used singly, or in a combination of two or more.

In the above-mentioned phosphoric acid group-containing resin, the mass ratio of the above-mentioned phosphoric acid group-containing polymerizable unsaturated monomer to the other polymerizable unsaturated monomer in their copolymerization is preferably about 1/99 to 40/60, more preferably about 5/95 to 35/65, and even more preferably about 10/90 to 30/70.

When the aqueous coating composition of the present invention contains the above-mentioned phosphoric acid group-containing resin, the amount of the phosphoric acid group-containing resin is preferably about 0.5 to 15 parts by mass, more preferably about 0.75 to 10 parts by mass, and even more preferably about 1 to 5 parts by mass, based on 100 parts by mass of the film-forming resin (A).

Examples of the coloring pigments include titanium oxide; Chinese white; carbon black; molybdenum red; Prussian blue; cobalt blue; azo pigments; phthalocyanine pigments; quinacridone pigments; isoindoline pigments; threne pigments; perylene pigments; dioxadine pigments; diketopyrrolopyrrole pigments, etc. These pigments can be used singly, or in a combination of two or more.

When the aqueous coating composition of the present invention contains the above-mentioned coloring pigment, the amount of the coloring pigment as a solids content is preferably about 1 to 200 parts by mass, more preferably about 2 to 50 parts by mass, and even more preferably about 3 to 30 parts by mass, based on 100 parts by mass of the film-forming resin (A).

Examples of the extender pigments include talc, clay, kaolin, baryta, barium sulfate, barium carbonate, calcium carbonate, silica, alumina white, etc.

When the aqueous coating composition of the present invention contains the above-mentioned extender pigment, the amount of the extender pigment as a solids content is preferably about 1 to 200 parts by mass, more preferably about 2 to 50 parts by mass, and even more preferably about 3 to 30 parts by mass, based on 100 parts by mass of the film-forming resin (A).

The hydrophobic solvent is preferably an organic solvent having a solubility such that its soluble mass at 20° C. in 100 g of water is 10 g or less, preferably 5 g or less, and more preferably 1 g or less. Examples of such organic solvents include rubber solvents, mineral spirits, toluene, xylene, solvent naphtha, and like hydrocarbon solvents; 1-hexanol, 1-octanol, 2-octanol, 2-ethylhexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, propylene glycol monophenyl ether, and like alcohol solvents; n-butyl acetate, isobutyl acetate, isoamyl acetate, methylamyl acetate, ethylene glycol monobutyl ether acetate, and like ester solvents; and methyl isobutyl ketone, cyclohexanone, ethyl n-amyl ketone, diisobutyl ketone, and like ketone solvents. These organic solvents can be used singly, or in a combination of two or more.

To ensure excellent luster of the resulting coating film, it is preferable to use an alcoholic hydrophobic organic solvent as the hydrophobic organic solvent. Among the above alcoholic hydrophobic organic solvents, it is preferable to use at least one member selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether. 2-ethyl-1-hexanol and/or ethylene glycol mono-2-ethylhexyl ether are particularly preferable.

When the aqueous coating composition of the present invention contains the above-mentioned hydrophobic organic solvent, the amount of the hydrophobic organic solvent is preferably about 10 to 100 parts by mass, more preferably about 15 to 80 parts by mass, and even more preferably about 20 to 60 parts by mass, based on 100 parts by mass of the solids content of the aqueous coating composition.

The solids content of the aqueous coating composition of the present invention is generally about 5 to 70 mass %, preferably about 15 to 45 mass %, and more preferably about 20 to 35 mass %.

To ensure excellent smoothness, DOI and luster of the resulting coating film, the viscosity $V_1$ of the aqueous coating composition of the present invention at 1,000 $sec^{-1}$ and at 20° C. is preferably not more than 0.1 Pa·sec, more preferably in a range of 0.01 to 0.1 Pa·sec when the rate of shear is changed from 0.0001 $sec^{-1}$ to 10,000 $sec^{-1}$.

To ensure excellent smoothness, DOI and luster of the resulting coating film, the viscosity $V_2$ of the aqueous coating composition of the present invention at 0.1 $sec^{-1}$ and at 20° C. is preferably in a range of 30 to 100 Pa·sec, preferably 35 to 70 Pa·sec when the rate of shear is changed from 0.0001 $sec^{-1}$ to 10,000 $sec^{-1}$.

The viscosities $V_1$ and $V_2$ can be measured using a viscoelastometer, such as a "HAAKE RheoStress RS150" (product of HAAKE).

The reason for the excellent smoothness, DOI and water resistance of the coating film formed by the aqueous coating composition of the present invention containing the water-dispersible hydroxyl-containing acrylic resin (A1') or the core-shell-type water-dispersible hydroxy-containing acrylic resin (A1"), and the reason for the high flip-flop property, suppressed metallic mottling, and excellent luster when the aqueous coating composition further contains a luster pigment are assumed to be as follows. The hydrophobic interaction between the hydrophobic group derived from the hydrophobic polymerizable unsaturated monomer present in the water-dispersible hydroxyl-containing acrylic resin (A1') or the core-shell-type water-dispersible hydroxy-containing acrylic resin (A1") and the hydrophobic group derived from the C4-24 alkyl group present in the side chain of the copolymer of the present invention forms a network structure. This develops a characteristic such that the resulting aqueous coating composition has high viscosity, and the viscosity decreases with an increase in rate of shear. Such a viscosity characteristic is conducive to formation of a coating film having excellent smoothness, DOI and luster. Further, because the polymer in the side chain of the copolymer of the present invention has a number average molecular weight ranging from 1,000 to 10,000, which indicates a relatively large volume of the polymer, the network structure is not easily susceptible to the surfactant generally used to disperse the water-dispersible hydroxyl-containing acrylic resin (A1') or the core-shell-type water-dispersible hydroxy-containing acrylic resin (A1") in water. In this way, it is possible to maintain the optimum viscosity characteristic. It is further assumed that because the polymerizable unsaturated monomer (a) having a C4-24 alkyl group contains the ester bond in the molecule, the polymer is not excessively hydrophobic despite the relatively large molecular weight, thereby suppressing aggregation of the side chain and forming the network structure by hydrophobic interaction. It is further assumed that the viscosity is further developed by the formation of a network structure more strongly bonded together by the high affinity between the ester bond derived from the monomer component present in the water-dispersible hydroxyl-containing acrylic resin (A1') or the core-shell-type water-dispersible hydroxy-containing acrylic resin (A1") and the ester bond in the C4-C24 alkyl-containing polymerizable unsaturated monomer (a) present in the side chain of a copolymer of the present invention. It is still further assumed that the hydrophobic group derived from the hydrophobic polymerizable unsaturated monomer in the water-dispersible hydroxyl-containing acrylic resin (A1') or the core-shell-type water-dispersible hydroxy-containing acrylic resin (A1") increases the water resistance of the resulting coating film.

III. Method of Forming Coating Films of the Present Invention

The aqueous coating composition of the present invention can be applied on various substrates to be coated, thereby forming coating films having an excellent appearance.

Substrates to be Coated

The substrates to which the aqueous coating composition of the present invention is applied are not particularly limited. Examples of the substrates include exterior body panels of vehicles such as cars, trucks, motorbikes, buses, etc.; automobile parts; and exterior panels of home electric appliances such as mobile phones, audio equipment, etc. Among these, vehicle body exterior panels and automobile parts are preferable.

Materials of these substrates are not particularly limited. Examples thereof include iron, aluminum, brass, copper, tin, stainless steel, galvanized steel, zinc alloy (Zn—Al, Zn—Ni, Zn—Fe, etc.) steel sheet, and like metal materials; resins such as polyethylene resin, polypropylene resin, acrylonitrile butadiene styrene (ABS) resin, polyamide resin, acrylic resin, vinylidene chloride resin, polycarbonate resin, polyurethane resin, epoxy resin etc., various FRPs, and like plastic materials; glass, cement, concrete, etc. and like inorganic materials; wood; paper, cloth, and like fiber materials; etc. Among these, metal materials and plastic materials are preferable.

The substrate to be coated may be a metal material as described above or a vehicle body formed from such metal material, whose metal surface has been subjected to a surface treatment such as phosphate treatment, chromate treatment, composite oxide treatment, etc. The substrate may also be such metal material, vehicle body, or the like as described above on which a coating film is further formed.

Examples of the substrates on which a coating film is formed include one in which a surface treatment is performed on the base material, if necessary, and an undercoating film is formed thereon; one in which an intermediate coating film is formed on the undercoating film; and the like. The above-described undercoating film is preferably a coating film formed by using electrodeposition coating materials, preferably cationic electrodeposition coating materials.

Coating Method

After forming a wet coating film (uncured coating film) by applying the aqueous coating composition of the present invention to a substrate, the wet coating film is cured, thereby forming a desired coating film.

The coating method of the aqueous coating composition of the present invention is not particularly limited. Examples thereof include air spray coating, airless spray coating, rotary atomization coating, curtain coating, etc. A wet coating film can be formed by these coating methods. Among these, air spray coating or rotary atomization coating is preferable in terms of improved smoothness, DOI, and flip-flop property of the resulting coating film as well as suppressed metallic mottling thereof. Further, if necessary, static electricity may be used during coating.

The aqueous coating composition of the present invention is usually applied to a cured film thickness of about 1 to 50 µm, preferably about 3 to 50 µm, more preferably about 5 to 35 µm, further preferably about 8 to 25 µm.

A wet coating film can be cured by heating a substrate after the aqueous coating composition of the present invention is applied to the substrate. Heating can be carried out by known heating means. For example, drying furnaces such as a hot air furnace, an electrical furnace, an infrared induction heating furnace, and the like may be used. The heating temperature is preferably about 80° C. to 180° C., more preferably about 100° C. to 170° C., and further preferably about 120° C. to 160° C. The heating time is not particularly limited, and is usually preferably about 10 to 60 minutes, further preferably about 20 to 40 minutes.

In order to prevent coating film defects such as popping and the like, after application of the aqueous coating composition of the present invention, it is preferable to perform preheating, air blowing, etc. under heating conditions in which the coating film does not substantially cure prior to the above-described heat curing. The preheating temperature is preferably about 40° C. to 100° C., more preferably about 50° C. to 90° C., further preferably about 60° C. to 80° C. The preheating time is preferably about 30 seconds to 15 minutes, more preferably about 1 to 10 minutes, further preferably about 2 to 5 minutes. Further, the above-described air blowing can usually be performed by blowing air of room temperature or air heated to a temperature of about 25° C. to 80° C. to the coated surface of the substrate for about 30 seconds to 15 minutes.

When forming a multilayer coating film comprising a base coating film and a clear coating film on a substrate such as a vehicle body and the like by a two-coat one-bake method, the aqueous coating composition of the present invention can be suitably used as a composition for forming the base coating film. A method of forming a coating film in this case can be carried out according to the below-described method I.

Method I

A method of forming a multilayer coating film, comprising the steps of:

(1) applying the aqueous coating composition of the present invention to a substrate to be coated to form a base coating film;
(2) applying a clear coating composition on the uncured base coating film to form a clear coating film; and
(3) heating the uncured base coating film and uncured clear coating film to simultaneously cure both coating films.

The substrate in method I is preferably a vehicle body on which an undercoating film is formed; a vehicle body on which an undercoating film and an intermediate coating film are formed; or the like. The above-described undercoating film is preferably a coating film formed by using electrodeposition coating materials, and is further preferably a coating film formed by using cationic electrodeposition coating materials.

In the present invention, the cured coating film refers to a film in a dry-hard condition according to JIS K 5600-1-1 (2004), i.e., a condition in which imprints due to fingerprints are not formed on the coated surface and no movement is detected on the coating film when the center of the coated surface is strongly pinched with a thumb and an index finger, and in which scrapes are unobservable on the coated surface when the center of the coated surface is rubbed rapidly and repeatedly with a fingertip. On the other hand, the uncured coating film refers to a film that has not yet reached a dry-hard condition, including a film in a set-to-touch condition and a film in a dry-to-touch condition according to JIS K 5600-1-1.

When the aqueous coating composition of the present invention is applied by the two-coat one-bake method of method I, the coating film thickness (the cured film thickness) is preferably about 3 to 40 μm, more preferably about 5 to 30 μm, further preferably about 8 to 25 μm, further particularly preferably about 10 to 18 μm. Further, the coating film thickness (the cured film thickness) of the above-described clear coating composition is preferably about 10 to 80 μm, more preferably about 15 to 60 μm, further preferably about 20 to 45 μm.

Further, in method I, in order to prevent coating film defects such as popping and the like, after application of the above-described aqueous coating composition, it is preferable to perform preheating, air blowing, etc. as described above under heating conditions in which the coating film does not substantially cure. Additionally, after application of the clear coating composition, it is possible, if necessary, to have an interval of about 1 to 60 minutes at room temperature, or to perform preheating at about 40° C. to 80° C. for about 1 to 60 minutes.

The aqueous coating composition and clear coating composition can be cured by using the above-described known heating means. The heating temperature is preferably about 80° C. to 180° C., more preferably about 100° C. to 170° C., and further preferably about 120° C. to 160° C. Further, the heating time is preferably about 10 to 60 minutes, more preferably about 20 to 40 minutes. Both coating films, i.e., the base coat and the clear coat, can be simultaneously cured by such heating.

Further, when forming a multilayer coating film comprising a first colored coating film, a second colored coating film, and a clear coating film on a substrate to be coated such as a vehicle body or the like by a 3-coat 1-bake method, the aqueous coating composition of the present invention can be suitably used for forming the second colored coating film. A method of forming a coating film in this case may be carried out in accordance with the below-described method II.

Method II

A method of forming a multilayer coating film, comprising the steps of:

(1) applying a first coloring coating composition to a substrate to be coated to form a first colored coating film;
(2) applying the aqueous coating composition of the present invention on the uncured first colored coating film to form a second colored coating film;
(3) applying a clear coating composition on the uncured second colored coating film to form a clear coating film; and
(4) simultaneously heat-curing the uncured first colored coating film, uncured second colored coating film, and uncured clear coating film.

In method II, the method of forming a coating film in method I is carried out on the uncured first colored coating film. Preferred substrates in method II include a vehicle body and the like having an undercoating film formed thereon. The above-described undercoating film is preferably formed by using electrodeposition coating materials, and further preferably formed by using cationic electrodeposition coating materials.

In method II, the coating film thickness (the cured film thickness) of the first coloring coating composition is usually preferably about 3 to 50 μm, more preferably about 5 to 30 μm, and further preferably about 10 to 25 μm. Further, the coating film thickness (the cured film thickness) of the aqueous coating composition of the present invention is preferably about 1 to 30 μm, more preferably 3 to 25 μm, further preferably about 5 to 20 μm. Additionally, the coating film thickness (the coating film thickness) of the clear coating composition is usually preferably about 10 to 80 μm, more preferably about 15 to 60 μm, further preferably about 20 to 45 μm.

Specific examples of method II include the following methods II-1, II-2, and the like.

Method II-1

A method of forming a multilayer coating film, comprising the steps of:
(1) treating the surface of a steel plate if necessary, and applying an electrodeposition coating material thereon, followed by heat-curing, to form a cured electrodeposition coating film;
(2) applying a first coloring coating composition on the cured electrodeposition coating film obtained in step (1) in an intermediate coating booth to form an intermediate coating film;
(3) applying the aqueous coating composition of the present invention on the uncured intermediate coating film obtained in step (2) in a base coating booth to form a base coat;
(4) applying a clear coating material on the coated surface of the base coat obtained in step (3) in a clear coating booth to form a clear coating film; and
(5) heating the intermediate coating film, base coat, and clear coat formed in steps (2) to (4), thereby simultaneously curing these three coating films.

Note that the above-described booths are facilities to maintain the coating environment conditions such as temperature, humidity, etc. within a certain range in order to ensure uniform coating quality. Usually, different booths are used according to the types of coating materials to be applied. Additionally, in order to prevent sagging, unevenness, and the like of the coating material applied to a substrate, there are cases where the same coating material is applied to the substrate two separate times in the same booth. In this case, first-time coating is referred to as a first-stage coating, and second-time coating is referred to as a second-stage coating.

In method II-1, the coating film thickness (the cured film thickness) of the first coloring coating composition is usually preferably about 5 to 50 μm, more preferably about 10 to 30 μm, further preferably about 15 to 25 μm. Further, the coating film thickness (the cured film thickness) of the aqueous coating composition of the present invention is preferably about 3 to 30 μm, more preferably about 5 to 25 μm, further preferably about 8 to 20 μm, further particularly preferably about 9 to 16 μm. Additionally, the coating film thickness (the cured film thickness) of the clear coating composition is usually preferably about 10 to 80 μm, more preferably about 15 to 60 μm, further preferably about 20 to 45 μm.

Further, when the aqueous first coloring coating composition is used as the first coloring coating composition in method II-1, after application of the aqueous first coloring coating composition, it is preferable to perform preheating, air blowing, etc. as described above under heating conditions in which the coating film does not substantially cure in order to prevent coating film defects such as popping and the like.

Method II-2

A method of forming a multilayer coating film, comprising the steps of:
(1) treating the surface of a steel plate if necessary, and applying an electrodeposition coating material thereon, followed by heat-curing, to form a coating film;
(2) applying a first base coating material on the cured electrodeposition coating film obtained in step (1) at a first stage in a base coating booth to form a first base coating film;
(3) applying the aqueous coating composition of the present invention on the first base coating film obtained in step (2) at a second stage in a base coating booth to form a second base coating film;
(4) applying a clear coating material on the second base coating film obtained in step (3) in a clear coating booth to form a clear coating film; and
(5) heating the first base coating film, second base coating film, and clear coating film formed in steps (2) to (4), thereby simultaneously curing these three coating films.

In method II-2, the coating film thickness (the cured film thickness) of the first coloring coating composition is usually preferably 3 to 40 μm, more preferably about 5 to 25 μm, further preferably about 10 to 20 μm. Further, the coating film thickness (the cured film thickness) of the aqueous coating composition of the present invention is preferably about 1 to 25 μm, more preferably about 3 to 20 μm, further preferably about 5 to 15 μm. Additionally, the coating film thickness (the cured film thickness) of the clear coating composition is usually preferably 10 to 80 μm, more preferably about 15 to 60 μm, further preferably about 20 to 45 μm.

In the coating method of method II-2, the intermediate coating booth is unnecessary. Accordingly, method II-2 is advantageous in that the energy for controlling temperature and humidity in the intermediate coating booth can be reduced.

Further, in the coating method of method II-2, the first coloring coating composition and the aqueous coating composition of the present invention are applied in the base coating booth. Accordingly, a heating appliance is usually not installed between application of the first coloring coating composition and application of the aqueous coating composition of the present invention; and generally, the above-described preheating is not performed on the first base coating film that is formed by application of the first coloring coating composition. Consequently, method II-2 is advantageous in that it can reduce the energy for preheating. Accordingly, in view of energy-saving, it is preferable that the coating method in method II-2 does not include a heating step between application of the first coloring coating composition and application of the aqueous coating composition of the present invention.

Further, in method II, after application of the aqueous coating composition of the present invention, it is preferable to perform preheating, air blowing, etc. as described above under heating conditions in which the coating film does not substantially cure in order to prevent coating film defects such as popping and the like. Additionally, after application of the clear coating composition, it is possible, if necessary, to have an interval of about 1 to 60 minutes at room temperature, or to perform preheating at about 40° C. to 80° C. for about 1 to 60 minutes.

The three-layered coating films, i.e., the above-described uncured first colored coating film, uncured second colored coating film, and uncured clear coating film, can be heat-cured by the above-described known heating means. The heating temperature is preferably about 80 to 180° C., more preferably about 100 to 170° C., further preferably about 120 to 160° C. Further, the heating time is preferably about 10 to 60 minutes, more preferably about 20 to 40 minutes. The three-layered coating films, i.e., the first colored coating film, second colored coating film, and clear coating film, can be simultaneously cured by such heating.

Any thermosetting clear coating composition known as a composition for coating vehicle bodies and the like can be used as the clear coating composition used in methods I and II. Examples thereof include organic solvent-type thermosetting coating compositions, aqueous thermosetting coating compositions, powder thermosetting coating compositions, and the like, which comprise a crosslinking agent and a crosslinkable functional group-containing base resin.

Examples of crosslinkable functional groups contained in the base resin include carboxy, hydroxy, epoxy, silanol, and the like. Types of base resins include, for example, acrylic resins, polyester resins, alkyd resins, urethane resins, epoxy resins, fluorine resins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

Preferable combinations of the base resin/crosslinking agent in the clear coating composition include carboxy-containing resin/epoxy-containing resin, hydroxy-containing resin/polyisocyanate compound, hydroxy-containing resin/blocked polyisocyanate compound, hydroxy-containing resin/melamine resin, and the like.

Additionally, the clear coating composition may be a one-component coating material, or a multiple-component coating material such as a two-component urethane resin coating material, etc.

Further, if necessary, coloring pigments, luster pigments, dyes, etc. may be added to the clear coating composition, without impairing the transparency thereof. Still further, extender pigments, UV absorbers, light stabilizers, antifoaming agents, thickening agents, anticorrosives, surface control agents, etc. may also be suitably included.

As the first coloring coating compositions used in method II, for example, a known thermosetting intermediate coating composition can be used in method II-1, and a known thermosetting base coating composition can be used in method II-2. Specifically, for example, a thermosetting coating composition containing a crosslinkable functional group-containing base resin, crosslinking agent, coloring pigment, and extender pigment may be suitably used.

Examples of crosslinkable functional groups present in the base resins include carboxy, hydroxy, epoxy, and the like. Types of base resins include, for example, acrylic resins, polyester resins, alkyd resins, urethane resins, etc. Examples of crosslinking agents include melamine resins, polyisocyanate compounds, blocked polyisocyanate compounds, etc. Any of organic solvent-type coating compositions, aqueous coating compositions, and powder coating compositions may be used as the first coloring coating composition. Among these, an aqueous coating composition is preferably used.

In methods I and II, the first coloring coating composition and the clear coating composition can be applied by any known method. Examples of such methods include air spray coating, airless spray coating, rotary atomization coating, and the like.

EXAMPLES

Hereinbelow, the present invention is described in further detail with reference to Production Examples, Examples, and Comparative Examples. However, the present invention is not limited thereto. In each example, "part(s)" and "%" are based on mass unless otherwise specified. Additionally, the film thickness of a coating film is on a cured basis.

Production of Macromonomer (m-1)

Production Example 1

16 parts of ethylene glycol monobutyl ether and 3.5 parts of 2,4-diphenyl-4-methyl-1-pentene (herereinbelow, sometimes abbreviated as "MSD") were placed into a reaction vessel equipped with a thermometer, a thermostat, a stirring device, a reflux condenser, a nitrogen gas introducing pipe, and a dropping funnel. The mixture was heated to 160° C. under stirring while nitrogen gas was blown into the vapor space of the vessel. When the temperature reached 160° C., a mixture comprising 30 parts of n-butyl methacrylate, 40 parts of 2-ethylhexyl methacrylate, 30 parts of 2-hydroxyethyl methacrylate, and 7 parts of di-tert-amyl peroxide was added dropwise thereinto over 3 hours; and the resulting mixture was stirred at the same temperature for 2 hours. Subsequently, the resulting mixture was cooled to 30° C., and diluted with ethylene glycol monobutyl ether, thus obtaining a macromonomer solution (m-1-1) having a solids content of 65%. The hydroxy value of the obtained macromonomer was 125 mg KOH/g, and the number average molecular weight thereof was 2,300. In addition, according to an analysis by proton NMR, 97% or more of ethylene unsaturated groups derived from MSD were located at the ends of a polymer chain, and 2% thereof disappeared. Note that the above-described analysis by proton NMR was carried out in the following manner. Using heavy chloroform as a solvent, the following peaks before and after the polymerization reaction were measured: peaks based on protons of unsaturated groups in MSD (4.8 ppm, 5.1 ppm); peaks based on protons of ethylene unsaturated groups at the ends of a macromonomer chain (5.0 ppm, 5.2 ppm); and a peak of aromatic protons derived from MSD (7.2 ppm). The aromatic protons (7.2 ppm) derived from the above-described MSD was assumed to stay the same before and after the polymerization reaction. Using this value as a reference, each unsaturated group (unreacted, macromonomer chain end, disappeared) was quantified.

Production Examples 2 to 17

Synthesis was carried out in the same manner as in Production Example 1, except that the composition shown in Table 1 was used, thereby obtaining macromonomer solutions (m-1-1) to (m-1-17) having a solids content of 65%.

Table 1 shows the composition of raw materials (parts), proportion of a polymerizable unsaturated monomer (a) having a C4-C24 alkyl group in a monomer component (I), hydroxy value (mg KOH/g), and number average molecular weight of the macromonomer solutions (m-1-1) to (m-1-17).

TABLE 1

| Production Example | | | 1 | 2 | 3 | 4 | 5 | 6 | 7 | 8 | 9 |
|---|---|---|---|---|---|---|---|---|---|---|---|
| Macromonomer Solution | | | m-1-1 | m-1-2 | m-1-3 | m-1-4 | m-1-5 | m-1-6 | m-1-7 | m-1-8 | m-1-9 |
| Ethylene glycol monobutyl ether | | | 16 | 16 | 16 | 16 | 16 | 16 | 16 | 16 | 16 |
| 2,4-diphenyl-4-methyl-1-pentene | | | 3.5 | 3.5 | 3.5 | 3.5 | 3.5 | 3.5 | 7 | 1.6 | 1.2 |
| Monomer Component (I) | Polymerizable unsaturated monomer (a) having a C 4-24 alkyl group | n-butyl methacrylate | 30 | | | | | | | | |
| | | 2-ethylhexyl methacrylate | 40 | 80 | 75 | | 20 | 10 | 50 | 75 | 75 |
| | | Acryester SL (*1) | | | | 40 | | | | | |
| | | Stearyl methacrylate | | | | | | | 25 | | |
| | Hydroxy-containing | 2-hydroxyethyl | 30 | 20 | 25 | 40 | 40 | 40 | 25 | 25 | 25 |

TABLE 1-continued

| | | | | | | | | | | | |
|---|---|---|---|---|---|---|---|---|---|---|---|
| polymerizable unsaturated monomer | methacrylate | | | | | | | | | | |
| | Methyl methacrylate | | | | 20 | 40 | 50 | | | |
| Di-tert-amyl peroxide | | 7 | 7 | 7 | | | | 7 | 7 | 7 |
| Azobisisobutyronitrile | | | | | 7 | 7 | 7 | | | |
| Reaction Temperature [° C.] | | 160 | 160 | 160 | 120 | 120 | 120 | 160 | 160 | 160 |
| Content of polymerizable unsaturated monomer (a) in Monomer Component (I) [Mass %] | | 70 | 80 | 75 | 40 | 20 | 10 | 75 | 75 | 75 |
| Hydroxy Value [mgKOH/g] | | 125 | 83 | 104 | 167 | 167 | 167 | 101 | 106 | 107 |
| Number average molecular weight | | 2,300 | 2,200 | 2,200 | 2,100 | 2,400 | 2,400 | 1,200 | 4,000 | 7,000 |

| Production Example | | | 10 | 11 | 12 | 13 | 14 | 15 | 16 | 17 |
|---|---|---|---|---|---|---|---|---|---|---|
| Macromonomer Solution | | | m-1-10 | m-1-11 | m-1-12 | m-1-13 | m-1-14 | m-1-15 | m-1-16 | m-1-17 |
| Ethylene glycol monobutyl ether | | | 16 | 16 | 16 | 16 | 16 | 16 | 16 | 16 |
| 2,4-diphenyl-4-methyl-1-pentene | | | 1.0 | 3.5 | 3.5 | 3.5 | 3.5 | 3.5 | 8 | 0.7 |
| Monomer component (I) | Polymerizable unsaturated monomer (a) having a C 4-24 alkyl group | n-butyl methacrylate | | 50 | 43 | | 13 | | | |
| | | 2-ethylhexyl methacrylate | 75 | 50 | 50 | 45 | 75 | | 75 | 75 |
| | Hydroxy-containing polymerizable unsaturated monomer | 2-hydroxyethyl methacrylate | 25 | | 7 | 20 | 12 | | 25 | 25 |
| | | 2-hydroxypropyl methacrylate | | | | 35 | | | | |
| | | Methyl methacrylate | | | | | | 100 | | |
| Di-tert-amyl peroxide | | | 7 | 7 | 7 | 7 | 7 | | 7 | 7 |
| Azobisisobutyronitrile | | | | | | | | 7 | | |
| Reaction Temperature [° C.] | | | 160 | 160 | 160 | 160 | 160 | 120 | 160 | 160 |
| Content of polymerizable unsaturated monomer (a) in Monomer Component (I) | | | 75 | 100 | 93 | 45 | 88 | 0 | 75 | 75 |
| Hydroxy Value [mgKOH/g] | | | 107 | 0 | 29 | 215 | 50 | 0 | 100 | 107 |
| Number average molecular weight | | | 9,000 | 2,300 | 2,300 | 2,300 | 2,300 | 2,300 | 800 | 11,000 |

(Note 1)
"Acryester SL": product name, manufactured by Mitsubishi Rayon Co., Ltd., a mixture of dodecyl methacrylate and tridecyl methacrylate.

Production Example 18

40 parts of ethylene glycol monobutyl ether was placed into a reaction vessel equipped with a thermometer, a thermostat, a stirring device, a reflux condenser, a nitrogen gas introducing pipe, and a dropping funnel. The mixture was heated to 130° C. under stirring while nitrogen gas was blown into the vapor space of the vessel. When the temperature reached 130° C., a mixture comprising 30 parts of n-butyl methacrylate, 40 parts of 2-ethylhexyl methacrylate, 30 parts of 2-hydroxyethyl methacrylate, 5 parts of 3-mercaptopropionic acid, and 4 parts of 2,2'-azobis(2-methylbutyronitrile) was added dropwise thereinto over 4 hours; the resulting mixture was stirred at the same temperature for 1 hour; and further, a mixture comprising 0.5 parts of 2,2'-azobis(2-methylbutyronitrile) and 3 parts of ethylene glycol monobutyl ether was added dropwise thereinto over 1 hour. Subsequently, the resulting mixture was cooled to 30° C., thereby obtaining an acrylic resin solution having a solids content of 70%. 6.7 parts of glycidyl methacrylate, 0.02 parts of 4-tert-butylpyrocatechol, and 0.1 parts of N,N-dimethylaminoethanol were added to the obtained acrylic resin solution; and air was blown into the liquid, followed by heating to 110° C. under stirring. When the temperature reached 110° C., the resulting mixture was stirred at the same temperature for 6 hours. Subsequently, the resulting mixture was cooled to 30° C., and diluted with ethylene glycol monobutyl ether, thus obtaining a macromonomer solution (m-1-18) having a solids content of 65%. The hydroxy value of the obtained macromonomer was 147 mg KOH/g, and the number average molecular weight thereof was 2,400.

Production Example 19

40 parts of diethylene glycol monoethyl ether acetate was placed into a reaction vessel equipped with a thermometer, a thermostat, a stirring device, a reflux condenser, a nitrogen gas introducing pipe, and a dropping funnel. The mixture was heated to 130° C. under stirring while nitrogen gas was blown into the vapor space of the vessel. When the temperature reached 130° C., a mixture comprising 50 parts of n-butyl methacrylate, 50 parts of 2-ethylhexyl methacrylate, 4 parts of 2-mercaptoethanol, and 4 parts of 2,2'-azobis(2-methylbutyronitrile) was added dropwise thereinto over 4 hours; the resulting mixture was stirred at the same temperature for 1 hour; and further, a mixture comprising 0.5 parts of 2,2'-azobis(2-methylbutyronitrile) and 3 parts of diethylene glycol monoethyl ether acetate was added dropwise thereinto over 1 hour. Subsequently, the resulting mixture was cooled to 30° C., thereby obtaining an acrylic resin solution having a solids content of 70%. 7.6 parts of 2-isocyanatoethyl methacrylate (product name: "Karenz MOI", manufactured by Showa Denko K.K.) and 0.02 parts of 4-tert-butylpyrocatechol were added to the obtained acrylic resin solution; and air was blown into the liquid, followed by heating to 90° C. under stirring. When the temperature reached 90° C., the mixture was stirred at the same temperature for 5 hours. Subsequently, the resulting mixture was cooled to 30° C., and diluted with diethylene glycol monoethyl ether acetate, thus obtaining a macromonomer solution (m-1-19) having a solids content of 65%. The hydroxy value of the obtained macromonomer was 0 mg KOH/g, and the number average molecular weight thereof was 2,300.

Production Example 20

24 parts of ethylene glycol monobutyl ether and 4 parts of 2,4-diphenyl-4-methyl-1-pentene were placed into a reaction vessel equipped with a thermometer, a thermostat, a stirring device, a reflux condenser, a nitrogen gas introducing pipe, and a dropping funnel. The mixture was heated to 150° C. under stirring while nitrogen gas was blown into the vapor space of the vessel. When the temperature reached 150° C., a mixture comprising 15 parts of n-butyl methacrylate, 20 parts of 2-ethylhexyl methacrylate, 15 parts of 2-hydroxyethyl methacrylate, and 3 parts of di-tert-amyl peroxide was added dropwise thereinto over 3 hours, and the resulting mixture was stirred at the same temperature for 1 hour and 30 minutes. Subsequently, the resulting mixture was cooled to 115° C., and diluted with 4.5 parts of ethylene glycol monobutyl ether. Next, a mixture comprising 15 parts of n-butyl methacrylate, 20 parts of 2-ethylhexyl methacrylate, 15 parts of 2-hydroxyethyl methacrylate, and 0.6 parts of azobisisobutyronitrile was added dropwise thereinto over 2 hours, and the resulting mixture was stirred at the same temperature for 30 minutes. Further, a mixture comprising 0.25 parts of azobisisobutyronitrile and 5 parts of ethylene glycol monobutyl ether was added dropwise thereinto over 1 hour, and the resulting mixture was stirred at the same temperature for 30 minutes. Subsequently, the resulting mixture was cooled to 30° C., and diluted with 22 parts of ethylene glycol monobutyl ether, thus obtaining a macromonomer solution (m-1-20) having a solids content of 65%. The hydroxy value of the obtained macromonomer was 125 mg KOH/g, and the number average molecular weight thereof was 2,300.

Production Example 21

24 parts of ethylene glycol monobutyl ether and 3.5 parts of 2,4-diphenyl-4-methyl-1-pentene were placed into a reaction vessel equipped with a thermometer, a thermostat, a stirring device, a reflux condenser, a nitrogen gas introducing pipe, and a dropping funnel, and heated to 160° C. under stirring while nitrogen gas was blown into the vapor space of the vessel. When the temperature reached 160° C., a mixture comprising 40 parts of 2-ethylhexyl methacrylate, 10 parts of 2-hydroxyethyl methacrylate, and 2.6 parts of di-tert-amyl peroxide was added dropwise thereinto over 3 hours, and the resulting mixture was stirred at the same temperature for 1 hour and 30 minutes. Subsequently, the resulting mixture was cooled to 120° C., and diluted with 4.5 parts of ethylene glycol monobutyl ether. Next, a mixture comprising 40 parts of 2-ethylhexyl methacrylate, 10 parts of 2-hydroxyethyl methacrylate, and 0.6 parts of azobisisobutyronitrile was added dropwise thereinto over 2 hours, and the resulting mixture was stirred at the same temperature for 30 minutes. Next, a mixture comprising 0.25 parts of azobisisobutyronitrile and 5 parts of ethylene glycol monobutyl ether was added dropwise thereinto over 1 hour, and the resulting mixture was stirred at the same temperature for 30 minutes. Subsequently, the resulting mixture was cooled to 30° C., and diluted with 22 parts of ethylene glycol monobutyl ether, thus obtaining a macromonomer solution (m-1-21) having a solids content of 65%. The hydroxy value of the obtained macromonomer was 83 mg KOH/g, and the number average molecular weight thereof was 2,200.

Production of Copolymer

Example 1

15.4 parts (solids content: 10 parts) of the macromonomer solution (m-1-1) obtained in Production Example 1, parts of ethylene glycol monobutyl ether, and 30 parts of diethylene glycol monoethyl ether acetate were placed into a reaction vessel equipped with a thermometer, a thermostat, a stirring device, a reflux condenser, a nitrogen gas introducing pipe, and two dropping funnels; and heated to 85° C. while nitrogen gas was blown into the liquid. Subsequently, the following mixtures were simultaneously added dropwise over 4 hours to the reaction vessel maintained at the same temperature: a mixture comprising 31.5 parts of N,N-dimethyl acrylamide, 31.5 parts of N-isopropylacrylamide, 27 parts of 2-hydroxyethyl acrylate, 10 parts of ethylene glycol monobutyl ether, and 40 parts of diethylene glycol monoethyl ether acetate; and a mixture comprising 0.15 parts of "Perbutyl O" (product name, manufactured by NOF Corporation, polymerization initiator, tert-butylperoxy-2-ethylhexanoate), and 20 parts of ethylene glycol monobutyl ether. After completion of the dropwise addition, the mixture was stirred at the same temperature for 2 hours for aging. Subsequently, a mixture comprising 0.3 parts of 2,2'-azobis(2,4-dimethylvaleronitrile) and 15 parts of ethylene glycol monobutyl ether was added dropwise over 1 hour to the reaction vessel maintained at the same temperature. After completion of the dropwise addition, the mixture was stirred at the same temperature for 1 hour for aging. Subsequently, the resulting mixture was cooled to 30° C. while adding ethylene glycol monobutyl ether thereto, thereby obtaining a copolymer solution having a solids content of 35%. The weight average molecular weight of the obtained copolymer was $31 \times 10^4$. 215 parts of deionized water was added to the obtained copolymer solution, thereby obtaining a diluted fluid of copolymer (RC-1) having a solids content of 20%.

Examples 2 to 25 and Comparative Examples 1 to 5

Synthesis was carried out in the same manner as in Example 1, except that the composition shown in Table 2 was used, thereby obtaining diluted fluids of copolymer (RC-2) to (RC-30) having a solids content of 20%.

Table 2 below shows the composition of raw materials (parts) and weight average molecular weight of the diluted fluids of copolymer (RC-1) to (RC-30).

TABLE 2

| | | | | Examples | | | | | | | | | |
|---|---|---|---|---|---|---|---|---|---|---|---|---|---|
| | | | | 1 | 2 | 3 | 4 | 5 | 6 | 7 | 8 | 9 | 10 |
| Diluted Fluid of Copolymer | | | | RC-1 | RC-2 | RC-3 | RC-4 | RC-5 | RC-6 | RC-7 | RC-8 | RC-9 | RC-10 |
| Monomer Component (m) | Macromonomer (m-1) solution | | Type | m-1-1 | m-1-2 | m-1-3 | m-1-4 | m-1-5 | m-1-6 | m-1-7 | m-1-8 | m-1-9 | m-1-10 |
| | | | Quantity | 15.4 | 15.4 | 15.4 | 15.4 | 7.7 | 15.4 | 15.4 | 15.4 | 15.4 | 15.4 |
| | Polymerizable unsaturated monomer having a hydrophilic group (m-2) | N-substituted (meth) acrylamide | N,N-dimethyl-acrylamide | 31.5 | 31.5 | 31.5 | 31.5 | 33 | 31.5 | 18 | 27 | 45 | 63 |
| | | | N-isopropyl-acrylamide | 31.5 | 31.5 | 31.5 | 31.5 | 33 | 31.5 | 45 | 36 | 18 | |
| | | 2-hydroxyethyl acrylate | | 27 | 27 | 27 | 27 | 29 | 27 | 27 | 27 | 27 | 27 |

TABLE 2-continued

| | | | | | | | | | | | | |
|---|---|---|---|---|---|---|---|---|---|---|---|---|
| Perbutyl-O | | | 0.15 | 0.15 | 0.15 | 0.15 | 0.15 | 0.15 | 0.15 | 0.15 | 0.15 | 0.15 |
| Content of macromonomer (m-1) [Mass %] | | | 10 | 10 | 10 | 10 | 5 | 10 | 10 | 10 | 10 | 10 |
| Content of polymerizable unsaturated monomer having a hydrophilic group (m-2) [Mass %] | | | 90 | 90 | 90 | 90 | 95 | 90 | 90 | 90 | 90 | 90 |
| Content of other polymerizable unsaturated monomers (m-3) [Mass %] | | | 0 | 0 | 0 | 0 | 0 | 0 | 0 | 0 | 0 | 0 |
| Weight average molecular weight [×10$^4$] | | | 31 | 31 | 31 | 31 | 31 | 31 | 25 | 32 | 34 | 36 |

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| Diluted Fluid of Copolymer | | | RC-11 | RC-12 | RC-13 | RC-14 | RC-15 | RC-16 | RC-17 | RC-18 | RC-19 | RC-20 |
| Monomer Component (m) | Macromonomer (m-1) solution | Type | m-1-11 | m-1-12 | m-1-13 | m-1-3 | m-1-3 | m-1-2 | m-1-2 | m-1-2 | m-1-2 | m-1-14 |
| | | Quantity | 15.4 | 15.4 | 15.4 | 15.4 | 15.4 | 15.4 | 15.4 | 15.4 | 15.4 | 27.7 |
| | Polymerizable unsaturated monomer having a hydrophilic group (m-2) | N-substituted (meth) acrylamide | N,N-dimethylacrylamide | 31.5 | 27 | 27 | | | 36 | 63 | 31.5 | 58.5 | 28.7 |
| | | | N-isopropylacrylamide | 31.5 | 27 | 27 | | | 31.5 | | | | 28.7 |
| | | Polymerizable unsaturated monomer having a polyoxyalkylene chain | NK-ester AM-90G (*2) | | | | 63 | | | | | | |
| | | | N-vinyl-2-pyrrolidone | | | | | 63 | | | | | |
| | | | 2-hydroxyethyl acrylate | 27 | 36 | 36 | 27 | 27 | 18 | | 27 | 27 | 24.6 |
| | | | Acrylic acid | | | | | | 4.5 | 27 | 31.5 | | |
| | Other polymerizable unsaturated monomers (m-3) | | Methyl methacrylate | | | | | | | | | | 2.7 |
| | | | Isobutyl methacrylate | | | | | | | | | | 1.8 |
| Perbutyl-O | | | 0.15 | 0.15 | 0.15 | 0.15 | 0.15 | 0.15 | 0.15 | 0.15 | 0.15 | 0.15 |
| Content of macromonomer (m-1) [Mass %] | | | 10 | 10 | 10 | 10 | 10 | 10 | 10 | 10 | 10 | 18 |
| Content of polymerizable unsaturated monomer having a hydrophilic group (m-2) [Mass %] | | | 90 | 90 | 90 | 90 | 90 | 86 | 63 | 59 | 86 | 82 |
| Content of other polymerizable unsaturated monomers (m-3) [Mass %] | | | 0 | 0 | 0 | 0 | 0 | 0 | 0 | 0 | 4.5 | 0 |
| Weight average molecular weight [×10$^4$] | | | 31 | 31 | 31 | 31 | 31 | 31 | 31 | 31 | 31 | 23 |

| | | | Example | | | | | Comparative Example | | | |
|---|---|---|---|---|---|---|---|---|---|---|---|
| | | | 21 | 22 | 23 | 24 | 25 | 1 | 2 | 3 | 4 |
| Diluted Fluid of Copolymer | | | RC-21 | RC-22 | RC-23 | RC-24 | RC-25 | RC-26 | RC-27 | RC-28 | RC-29 |
| Monomer Component (m) | Macromonomer (m-1) solution | Type | m-1-3 | m-1-3 | m-1-3 | m-1-3 | m-1-3 | m-1-15 | | m-1-16 | m-1-17 |
| | | Quantity | 38.5 | 15.4 | 15.4 | 15.4 | 15.4 | 15.4 | | 15.4 | 15.4 |
| | Polymerizable unsaturated monomer having a hydrophilic group (m-2) | N-substituted (meth) acrylamide | N,N-dimethylacrylamide | 26 | 31.5 | 31.5 | 31.5 | 31.5 | 31.5 | 35 | 31.5 | 31.5 |
| | | | N-isopropylacrylamide | 26 | 31.5 | 31.5 | 31.5 | 31.5 | 31.5 | 35 | 31.5 | 31.5 |
| | | 2-hydroxyethyl acrylate | | 23 | 27 | 27 | 27 | 27 | 27 | 30 | 27 | 27 |
| Perbutyl-O | | | 0.15 | 2.00 | 0.50 | 0.12 | 0.10 | 0.15 | 0.15 | 0.15 | 0.15 |
| Content of macromonomer (m-1) [Mass %] | | | 25 | 10 | 10 | 10 | 10 | 10 | 0 | 10 | 10 |
| Content of polymerizable unsaturated monomer having a hydrophilic group (m-2) [Mass %] | | | 75 | 90 | 90 | 90 | 90 | 90 | 100 | 90 | 90 |
| Content of other polymerizable unsaturated monomers (m-3) [Mass %] | | | 0 | 0 | 0 | 0 | 0 | 0 | 0 | 0 | 0 |
| Weight average molecular weight [×10$^4$] | | | 20 | 8 | 12 | 38 | 42 | 31 | 31 | 28 | 37 |

| | | | | Comparative Example 5 |
|---|---|---|---|---|
| Diluted Fluid of Copolymer | | | | RC-30 |
| Monomer Component (m) | Macromonomer (m-1) solution | | Type | |
| | | | Quantity | |
| | Polymerizable unsaturated monomer having a hydrophilic group (m-2) | PLEX 6954-0 (*3) | | 50 |
| | | Methacrylic acid | | 20 |
| | Other polymerizable unsaturated monomers (m-3) | Methyl methacrylate | | 30 |
| | | Ethyl acrylate | | 10 |
| Perbutyl-O | | | | 0.15 |
| Content of macromonomer (m-1) [Mass %] | | | | 0 |

TABLE 2-continued

| | |
|---|---|
| Content of polymerizable unsaturated monomer having a hydrophlic group (m-2) [Mass %] | 70 |
| Content of other polymerizable unsaturated monomers (m-3) [Mass %] | 40 |
| Weight average molecular weight [×10$^4$] | 31 |

(Note 2)
"NK-ester AM-90G": product name, manufactured by Shin-Nakamura Chemical Co., Ltd.; a polymerizable unsaturated monomer having a polyoxyalkylene chain; in the General Formula (1), R$^1$ is a hydrogen atom, R$^2$ is methyl, R$^3$ is ethylene, and m is 9; and the molecular weight is 454.
(Note 3)
"PLEX 6954-0": product name, manufactured by Degussa; a mixture comprising 20% of deionized water, 20% of methacrylic acid, and 60% of polymerizable unsaturated monomer having an alkyl group and a polyoxyalkylene chain (in the General Formula (1), R$^1$ is methyl, R$^2$ is C16-18 alkyl, R$^3$ is ethylene, and m is 25; and the molecular weight is about 1,422).

Production of Hydroxy-Containing Acrylic Resin (A1)

Production Example 22

128 parts of deionized water and 3 parts of "Adekaria Soap SR-1025" (product name, manufactured by ADEKA, emulsifier, active ingredient 25%) were placed into a reaction vessel equipped with a thermometer, a thermostat, a stirring device, a reflux condenser, a nitrogen gas introducing pipe, and a dropping funnel. The mixture was stirred and mixed in nitrogen flow, and heated to 80° C.

Subsequently, 1% of the entire amount of monomer emulsion for the core portion, which is described below, and 5.3 parts of a 6% ammonium persulfate aqueous solution were introduced into the reaction vessel, and maintained therein at 80° C. for 15 minutes. Thereafter, the remaining monomer emulsion for the core portion was added dropwise over 3 hours to the reaction vessel maintained at the same temperature. After completion of the dropwise addition, the mixture was aged for 1 hour. Subsequently, the below-described monomer emulsion for the shell portion was added dropwise to the reaction vessel over 1 hour, followed by aging for 1 hour. Thereafter, the mixture was cooled to 30° C. while gradually adding 40 parts of a 5% 2-(dimethylamino)ethanol aqueous solution thereto, and filtered through a 100-mesh nylon cloth, thereby obtaining a water-dispersible hydroxy-containing acrylic resin water dispersion (A1-1) having a mean particle diameter of 95 nm and a solids content of 30%. The obtained water-dispersible hydroxy-containing acrylic resin had an acid value of 33 mg KOH/g, and a hydroxy value of 25 mg KOH/g.

A monomer emulsion for the core portion: 40 parts of deionized water, 2.8 parts of "Adekaria Soap SR-1025", 2.1 parts of methylene bisacrylamide, 2.8 parts of styrene, 16.1 parts of methyl methacrylate, 28 parts of ethyl acrylate, and 21 parts of n-butyl acrylate were mixed and stirred, thereby obtaining a monomer emulsion for the core portion.

A monomer emulsion for the shell portion: 17 parts of deionized water, 1.2 parts of "Adekaria Soap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, thereby obtaining a monomer emulsion for the shell portion.

Production Examples 23 to 26

Synthesis was carried out in the same manner as in Production Example 22, except that the composition shown in Table 3 was used, thereby obtaining water-dispersible hydroxy-containing acrylic resin water dispersions (A1-2) to (A1-5).

Table 3 shows the composition of raw materials (parts), solids content (%), acid value (mg KOH/g), and hydroxy value (mg KOH/g) of the water-dispersible hydroxy-containing acrylic resin water dispersions (A1-1) to (A1-5).

In Table 3, methylene bisacrylamide and allyl methacrylate in the monomer emulsion for the core portion are polymerizable unsaturated monomers having two polymerizable unsaturated groups in one molecule. Further, styrene and 2-ethylhexyl acrylate in the monomer emulsion for the shell portion are hydrophobic polymerizable unsaturated monomers.

TABLE 3

| Production Example | | 22 | 23 | 24 | 25 | 26 |
|---|---|---|---|---|---|---|
| Water dispersion of water-dispersible hydroxy-containing acrylic resin | | A1-1 | A1-2 | A1-3 | A1-4 | A1-5 |
| Deionized water | | 128 | 128 | 128 | 128 | 128 |
| SR-1025 | | 3 | 3 | 3 | 3 | 3 |
| 6% ammonium persulfate aqueous solution | | 5.3 | 5.3 | 5.3 | 5.3 | 5.3 |
| Monomer emulsion for core | Deionized water | 40 | 40 | 40 | 40 | 40 |
| | SR-1025 | 2.8 | 2.8 | 2.8 | 2.8 | 2.8 |
| | Methylenebis acrylamide | 2.1 | 2.1 | | | 2.1 |
| | Allyl methacrylate | | | 2.1 | | |
| | Acrylamide | | | | 2.1 | |
| | Styrene | 2.8 | 2.8 | 2.8 | 2.8 | 2.8 |
| | Methyl methacrylate | 16.1 | 16.1 | 16.1 | 16.1 | 16.1 |
| | Ethyl acrylate | 28 | 28 | 28 | 28 | 28 |
| | n-butyl acrylate | 21 | 21 | 21 | 21 | 21 |
| Monomer emulsion for shell | Deionized water | 17 | 17 | 17 | 17 | 17 |
| | SR-1025 | 1.2 | 1.2 | 1.2 | 1.2 | 1.2 |
| | Ammonium persulfate | 0.03 | 0.03 | 0.03 | 0.03 | 0.03 |
| | Styrene | 3 | | 3 | | |
| | 2-ethylhexyl acrylate | | 3 | | 3 | |
| | 2-hydroxyethyl acrylate | 5.1 | 5.1 | 5.1 | 5.1 | 5.1 |
| | Methacrylic acid | 5.1 | 5.1 | 5.1 | 5.1 | 5.1 |
| | Methyl methacrylate | 6 | 6 | 6 | 6 | 9 |

TABLE 3-continued

| Production Example | 22 | 23 | 24 | 25 | 26 |
|---|---|---|---|---|---|
| Ethyl acrylate | 1.8 | 1.8 | 1.8 | 1.8 | 1.8 |
| n-butyl acrylate | 9 | 9 | 9 | 9 | 9 |
| 5% 2-(dimethylamino) ethanol aqueous solution | 40 | 40 | 40 | 40 | 40 |
| Solids content (%) | 30 | 30 | 30 | 30 | 30 |
| Acid value (mgKOH/g) | 33 | 33 | 33 | 33 | 33 |
| Hydroxy value (mgKOH/g) | 25 | 25 | 25 | 25 | 25 |

Further, in Table 3, among the water-dispersible hydroxy-containing acrylic resin water dispersions (A1-1) to (A1-5), (A1-1) to (A1-3) correspond to a core-shell-type water-dispersible hydroxy-containing acrylic resin (A1″).

Production Example 27

35 parts of propylene glycol monopropyl ether was placed into a reaction vessel equipped with a thermometer, a thermostat, a stirring device, a reflux condenser, a nitrogen gas introducing pipe, and a dropping funnel, and heated to 85° C. Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2′-azobis(2,4-dimethylvaleronitrile) was added dropwise thereto over 4 hours. After completion of the dropwise addition, the mixture was aged for 1 hour. Subsequently, a mixture of 10 parts of propylene glycol monopropyl ether and 1 part of 2,2′-azobis(2,4-dimethylvaleronitrile) was further added dropwise thereto over 1 hour. After completion of the dropwise addition, the mixture was aged for 1 hour. 7.4 parts of diethanolamine was further added thereto, thereby obtaining a hydroxy-containing acrylic resin solution (A1-6) having a solids content of 55%. The obtained hydroxy-containing acrylic resin had an acid value of 47 mg KOH/g, and a hydroxy value of 72 mg KOH/g.

Production of Hydroxy-Containing Polyester Resin (A2)

Production Example 28

109 parts of trimethylolpropane, 141 parts of 1,6-hexanediol, 126 parts of 1,2-cyclohexanedicarboxylic acid anhydride, and 120 parts of adipic acid were placed into a reaction vessel equipped with a thermometer, a thermostat, a stirring device, a reflux condenser, a nitrogen gas introducing pipe, and a water separator. The mixture was heated to a range of 160° C. to 230° C. over 3 hours, followed by a condensation reaction at 230° C. for 4 hours. Subsequently, to introduce a carboxy group to the obtained condensation reaction product, 38.3 parts of trimellitic anhydride was added to the product, followed by a reaction at 170° C. for 30 minutes. Thereafter, the product was diluted with 2-ethyl-1-hexanol (mass that dissolves in 100 g of water at 20° C.: 0.1 g), thereby obtaining a hydroxy-containing polyester resin solution (A2-1) having a solids content of 70%. The obtained hydroxy-containing polyester resin had an acid value of 46 mg KOH/g, a hydroxy value of 150 mg KOH/g, and a number average molecular weight of 1,400. In the composition of raw materials, the total content of alicyclic polybasic acid in the acid component was 46 mol % based on the total amount of the acid component.

Production Example 29

113 parts of trimethylolpropane, 131 parts of neopentyl glycol, 80 parts of 1,2-cyclohexanedicarboxylic acid anhydride, 93 parts of isophthalic acid, and 91 parts of adipic acid were placed into a reaction vessel equipped with a thermometer, a thermostat, a stirring device, a reflux condenser, a nitrogen gas introducing pipe, and a water separator. The mixture was heated to a range of 160° C. to 230° C. over 3 hours, followed by a condensation reaction at 230° C. for 4 hours. Subsequently, to introduce a carboxy group to the obtained condensation reaction product, 33.5 parts of trimellitic anhydride was further added to the product, followed by a reaction at 170° C. for 30 minutes. Thereafter, the product was diluted with 2-ethyl-1-hexanol, thereby obtaining a hydroxy-containing polyester resin solution (A2-2) having a solids content of 70%. The obtained hydroxy-containing polyester resin had an acid value of 40 mg KOH/g, a hydroxy value of 161 mg KOH/g, and a number average molecular weight of 1,300. In the composition of raw materials, the total content of alicyclic polybasic acid in the acid component was 28 mol % based on the total amount of the acid component.

Production Example 30

A hydroxy-containing polyester resin solution (A2-3) was obtained in the same manner as in Production Example 28, except that ethylene glycol mono-n-butyl ether (the mass that dissolves in 100 g of water at 20° C.: infinite) was used as a dilution solvent in place of 2-ethyl-1-hexanol.

Production of Aluminium Pigment Dispersion

Production Example 31

In a stirring and mixing container, 19 parts (solids content: 14 parts) of "GX-180A" (product name, manufactured by Asahi Kasei Metals, Ltd., aluminium pigment paste, aluminum content: 74%), 35 parts of 2-ethyl-1-hexanol, 8 parts (solids content: 4 parts) of the phosphoric acid group-containing resin solution described below, and 0.2 parts of 2-(dimethylamino)ethanol were uniformly mixed, thereby obtaining an aluminium pigment dispersion (P-1).

Phosphoric acid group-containing resin solution: a mixture solvent of 27.5 parts of methoxypropanol and 27.5 parts of isobutanol was placed into a reaction vessel equipped with a thermometer, a thermostat, a stirring device, a reflux condenser, a nitrogen gas introducing pipe, and a dropping funnel, and the mixture solvent was heated to 110° C. Subsequently, 121.5 parts of a mixture comprising 25 parts of styrene, 27.5 parts of n-butyl methacrylate, 20 parts of "Isostearyl Acrylate" (product name, manufactured by Osaka Organic Chemical Industry, Ltd., branched higher alkyl acrylate), 7.5 parts of 4-hydroxybutyl acrylate, 15 parts of the phosphoric acid group-containing polymerizable monomer described below, 12.5 parts of 2-methacryloyloxy ethyl acid phosphate, 10 parts of isobutanol, and 4 parts of t-butyl peroxyoctanoate was added to the mixture solvent over 4 hours. Further, a mixture comprising 0.5 parts of t-butyl peroxyoctanoate and 20 parts of isopropanol was added dropwise thereinto for 1 hour, followed by stirring for 1 hour for aging, thereby obtaining a phosphoric acid group-containing resin solution having a solids content concentration of 50%. The phosphoric acid group-containing resin had an acid value of 83 mg KOH/g, a hydroxy value of 29 mg KOH/g, and a weight average molecular weight of 10,000.

Phosphoric acid group-containing polymerizable monomer: 57.5 parts of monobutyl phosphate and 41 parts of isobutanol were placed into a reaction vessel equipped with a thermometer, a thermostat, a stirring device, a reflux condenser, a nitrogen gas introducing pipe, and a dropping funnel. After the mixture was heated to 90° C., 42.5 parts of glycidyl methacrylate was added dropwise thereinto over 2 hours, and further stirred for 1 hour for aging. Subsequently, 59 parts of isopropanol was added thereto, thereby obtaining a phosphoric acid group-containing polymerizable monomer solution having a solids content concentration of 50%. The obtained monomer had an acid value of 285 mg KOH/g.

Production Example 32

An aluminium pigment dispersion (P-2) was obtained in the same manner as in Production Example 31, except that 35 parts of ethylene glycol mono-n-butyl ether was used in place of 35 parts of 2-ethyl-1-hexanol.
Production of Aqueous Coating Composition Example 26

Added to a stirring and mixing container were: 100 parts (solids content: 30 parts) of the water-dispersible hydroxy-containing acrylic resin water dispersion (A1-1) obtained in Production Example 22; 18 parts (solids content: 10 parts) of the hydroxy-containing acrylic resin solution (A1-6) obtained in Production Example 27; 43 parts (solids content: 30 parts) of the hydroxy-containing polyester resin solution (A2-1) obtained in Production Example 28; 62 parts of the aluminium pigment dispersion (P-1) obtained in Production Example 31; and 50 parts (solids content: 30 parts) of the melamine resin (B-1) (methyl-butyl mixed etherified melamine resin; the solids content is 60%, the weight average molecular weight is 2,000); and the mixture was uniformly mixed. Further, 5 parts (solids content: 1 part) of the diluted fluid of copolymer (RC-1) obtained in Example 1, 2-(dimethylamino)ethanol, and deionized water were added to the mixture, thereby obtaining an aqueous coating composition (X-1) having a pH of 8.0 and a solids content of 25%.

Further, as for the obtained aqueous coating composition (X-1), a viscosity $V_1$ at a rate of shear of 1,000 $sec^{-1}$ and a viscosity $V_2$ at a rate of shear of 0.1 $sec^{-1}$, when the rate of shear was varied from 0.0001 $sec^{-1}$ to 10,000 $sec^{-1}$, were measured using a "HAAKE RheoStress RS150" (product name, manufactured by HAAKE) viscoelasticity meter at a measurement temperature of 20° C.

Examples 27 to 57 and Comparative Examples 6 to 12

Aqueous coating compositions (X-2) to (X-39) having a pH of 8.0 and a solids content of 25% were obtained in the same manner as in Example 26, except that the formulation composition shown in Table 4 was used.

TABLE 4

| | | | Example | | | | | | | | | |
|---|---|---|---|---|---|---|---|---|---|---|---|---|
| | | | 26 | 27 | 28 | 29 | 30 | 31 | 32 | 33 | 34 | 35 |
| Aqueous coating composition | | | X-1 | X-2 | X-3 | X-4 | X-5 | X-6 | X-7 | X-8 | X-9 | X-10 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 | 100 |
| | | Hydroxy-containing acrylic resin solution (A1-6) | 18 | 18 | 18 | 18 | 18 | 18 | 18 | 18 | 18 | 18 |
| | Hydroxy-containing polyester resin (A2) | Hydroxy-containing polyester resin solution (A2-1) | 43 | 43 | 43 | 43 | 43 | 43 | 43 | 43 | 43 | 43 |
| Curing agent (B) | | Melamine resin (B-1) | 50 | 50 | 50 | 50 | 50 | 50 | 50 | 50 | 50 | 50 |
| Aluminium pigment dispersion | | Type | P-1 | P-1 | P-1 | P-1 | P-1 | P-1 | P-1 | P-1 | P-1 | P-1 |
| | | Quantity | 62 | 62 | 62 | 62 | 62 | 62 | 62 | 62 | 62 | 62 |
| Diluted fluid of copolymer | | Type | RC-1 | RC-2 | RC-3 | RC-4 | RC-5 | RC-6 | RC-7 | RC-8 | RC-9 | RC-10 |
| | | Quantity | 5 | 5 | 5 | 5 | 5 | 5 | 5 | 5 | 5 | 5 |
| Viscosity $V_1$ at a rate of shear of 1000 $sec^{-1}$ [Pa-sec] | | | 0.05 | 0.05 | 0.05 | 0.04 | 0.04 | 0.04 | 0.04 | 0.056 | 0.061 | 0.065 |
| Viscosity $V_2$ at a rate of shear of 0.1 $sec^{-1}$ [Pa-sec] | | | 40 | 50 | 45 | 38 | 35 | 32 | 36 | 55 | 59 | 65 |
| $V_2/V_1$ | | | 800 | 1000 | 900 | 950 | 875 | 800 | 900 | 982 | 967 | 1000 |

| | | | Example | | | | | | | | | |
|---|---|---|---|---|---|---|---|---|---|---|---|---|
| | | | 36 | 37 | 38 | 39 | 40 | 41 | 42 | 43 | 44 | 45 |
| Aqueous coating composition | | | X-11 | X-12 | X-13 | X-14 | X-15 | X-16 | X-17 | X-18 | X-19 | X-20 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 | 100 |
| | | Hydroxy-containing acrylic resin solution (A1-6) | 18 | 18 | 18 | 18 | 18 | 18 | 18 | 18 | 18 | 18 |

TABLE 4-continued

| | | | | | | | | | | | | |
|---|---|---|---|---|---|---|---|---|---|---|---|---|
| Hydroxy-containing polyester resin (A2) | Hydroxy-containing polyester resin solution (A2-1) | | 43 | 43 | 43 | 43 | 43 | 43 | 43 | 43 | 43 | 43 |
| Curing agent (B) | Melamine resin (B-1) | | 50 | 50 | 50 | 50 | 50 | 50 | | 50 | 50 | 50 |
| | Melamine resin (B-2) (*4) | | | | | | | | 38 | | | |
| Aluminium pigment dispersion | Type | | P-1 | P-1 | P-1 | P-1 | P-1 | P-1 | P-1 | P-1 | P-1 | P-1 |
| | Quantity | | 62 | 62 | 62 | 62 | 62 | 62 | 62 | 62 | 62 | 62 |
| Diluted fluid of copolymer | Type | | RC-11 | RC-12 | RC-13 | RC-14 | RC-15 | RC-16 | RC-17 | RC-18 | RC-19 | RC-20 |
| | Quantity | | 5 | 5 | 5 | 5 | 5 | 5 | 5 | 5 | 5 | 5 |
| Viscosity $V_1$ at a rate of shear of 1000 sec$^{-1}$ [Pa-sec] | | | 0.07 | 0.07 | 0.07 | 0.05 | 0.05 | 0.07 | 0.07 | 0.05 | 0.05 | 0.06 |
| Viscosity $V_2$ at a rate of shear of 0.1 sec$^{-1}$ [Pa-sec] | | | 50 | 50 | 50 | 45 | 42 | 50 | 50 | 50 | 50 | 50 |
| $V_2/V_1$ | | | 714 | 714 | 714 | 900 | 840 | 714 | 714 | 1000 | 1000 | 833 |

| | | | Example | | | | | | | | | |
|---|---|---|---|---|---|---|---|---|---|---|---|---|
| | | | 46 | 47 | 48 | 49 | 50 | 51 | 52 | 53 | 54 | 55 |
| Aqueous coating composition | | | X-21 | X-22 | X-23 | X-24 | X-25 | X-26 | X-27 | X-28 | X-29 | X-30 |
| Film-forming resin (A) | Hydroxy-containing acrylic resin (A1) | Water dispersion of water-dispersible hydroxy-containing acrylic resin (A1-1) | 100 | 100 | 100 | 100 | 100 | | | | | |
| | | Water dispersion of water-dispersible hydroxy-containing acrylic resin (A1-2) | | | | | | 100 | | | | |
| | | Water dispersion of water-dispersible hydroxy-containing acrylic resin (A1-3) | | | | | | | 117 | | | |
| | | Water dispersion of water-dispersible hydroxy-containing acrylic resin (A1-4) | | | | | | | | 100 | | |
| | | Water dispersion of water-dispersible hydroxy-containing acrylic resin (A1-5) | | | | | | | | | 100 | |
| | | Hydroxy-containing acrylic resin solution (A1-6) | 18 | 18 | 18 | 18 | 18 | 18 | | 18 | 18 | 73 |
| | Hydroxy-containing polyester resin (A2) | Hydroxy-containing polyester resin solution (A2-1) | 43 | 43 | 43 | 43 | 43 | 43 | 43 | 43 | 43 | 43 |
| Curing agent (B) | Melamine resin (B-1) | | 50 | 50 | 50 | 50 | 50 | 50 | 50 | 50 | 50 | 50 |
| | Bayhydur VPLS2310 (*5) | | | | | | | | 13 | | | |
| Aluminium pigment dispersion | Type | | P-1 | P-1 | P-1 | P-1 | P-1 | P-1 | P-1 | P-1 | P-1 | P-1 |
| | Quantity | | 62 | 62 | 62 | 62 | 62 | 62 | 62 | 62 | 62 | 62 |
| Diluted fluid of copolymer | Type | | RC-21 | RC-22 | RC-23 | RC-24 | RC-25 | RC-3 | RC-3 | RC-3 | RC-3 | RC-3 |
| | Quantity | | 5 | 5 | 5 | 5 | 5 | 5 | 5 | 5 | 5 | 5 |
| Viscosity $V_1$ at a rate of shear of 1000 sec$^{-1}$ [Pa-sec] | | | 0.08 | 0.04 | 0.043 | 0.06 | 0.07 | 0.05 | 0.05 | 0.04 | 0.04 | 0.04 |
| Viscosity $V_2$ at a rate of shear of 0.1 sec$^{-1}$ [Pa-sec] | | | 50 | 31 | 32 | 66 | 67 | 44 | 46 | 44 | 41 | 31 |
| $V_2/V_1$ | | | 625 | 775 | 744 | 1100 | 957 | 880 | 920 | 1100 | 1025 | 775 |

| | | | Example | | Comparative Example | | | | | | |
|---|---|---|---|---|---|---|---|---|---|---|---|
| | | | 56 | 57 | 6 | 7 | 8 | 9 | 10 | 11 | 12 |
| Aqueous coating composition | | | X-31 | X-32 | X-33 | X-34 | X-35 | X-36 | X-37 | X-38 | X-39 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 |
| | | Hydroxy-containing acrylic resin solution (A1-6) | 18 | 18 | 18 | 18 | 18 | 18 | 18 | 18 | 18 |
| | Hydroxy-containing polyester resin (A2) | Hydroxy-containing polyester resin solution (A2-1) | | | 43 | 43 | 43 | 43 | 43 | 43 | 43 |
| | | Hydroxy-containing polyester resin solution (A2-2) | 43 | | | | | | | | |
| | | Hydroxy-containing polyester resin solution (A2-3) | | 43 | | | | | | | |

TABLE 4-continued

| Curing agent (B) | Melamine resin (B-1) | 50 | 50 | 50 | 50 | 50 | 50 | 50 | 50 | 50 |
|---|---|---|---|---|---|---|---|---|---|---|
| Aluminium pigment | Type | P-1 | P-2 | P-1 | P-1 | P-1 | P-1 | P-1 | P-1 | P-1 |
| dispersion | Quantity | 62 | 62 | 62 | 62 | 62 | 62 | 62 | 62 | 62 |
| Diluted fluid of copolymer | Type | RC-2 | RC-2 | RC-26 | RC-27 | RC-28 | RC-29 | RC-30 | | |
| | Quantity | 5 | 5 | 5 | 5 | 5 | 5 | 5 | | |
| Viscosity-controlling agent | ACRYSOL RM-825 (*6) | | | | | | | | 4 | |
| Viscosity $V_1$ at a rate of shear of 1000 sec−1 [Pa-sec] | | 0.04 | 0.04 | 0.02 | 0.01 | 0.03 | 0.05 | 0.03 | 0.04 | 0.02 |
| Viscosity $V_2$ at a rate of shear of 0.1 sec−1 [Pa-sec] | | 41 | 33 | 5 | 3 | 15 | 20 | 15 | 5 | 1 |
| $V_2/V_1$ | | 1025 | 825 | 250 | 300 | 500 | 400 | 500 | 125 | 50 |

(Note 4)
Melamine resin (B-2): methyl etherified melamine resin; the solids content is 80%; the weight average molecular weight is 800.
(Note 5)
"Bayhydur VP LS-2310": product name, manufactured by Sumitomo Bayer Urethane Co. Ltd., blocked polyisocyanate compound; the solids content is 38%.
(Note 6)
"ACRYSOL RM-825": product name, manufactured by Rohm arid Haas Company, urethane-associated thickener; the solids content is 25%.

Preparation of Substrates to be Coated

Production Example 33

A thermosetting epoxy resin cationic electrodeposition coating composition (product name "Electron GT-10", manufactured by Kansai Paint Co., Ltd.) was applied by electrodeposition to a zinc phosphate-treated cold-rolled steel plate (30 cm×45 cm) to a film thickness of 20 μm, and cured by heating at 170° C. for 30 minutes. Subsequently, an intermediate coating composition (product name "TP-65-2", manufactured by Kansai Paint Co., Ltd., a polyester resin/amino resin organic solvent-type coating composition) was applied to this electrodeposition coating film to a film thickness of 35 μm, and cured by heating at 140° C. for 30 minutes. Thereby, a substrate comprising a steel plate, and an electrodeposition coating film and an intermediate coating film formed on the steel plate was prepared.

Method of Forming Coating Films

Example 58

A multilayer coating film comprising a base coat and a clear coat on a substrate was formed by using the aqueous coating composition (X-1) obtained in Example 22 as a coating material for forming a base coat in the two-coat one-bake method in method I of forming coating films.

Specifically, the aqueous coating composition (X-1) was applied to the substrate obtained in Production Example 33 to a film thickness of 15 μm using a rotary atomization-type bell-shaped coating device, then allowed to stand for 2 minutes, and preheated at 80° C. for 3 minutes. Subsequently, an acrylic resin organic solvent-based top clear coating composition (product name "Magicron KINO-1210", manufactured by Kansai Paint Co., Ltd.) was applied to the uncured coated surface to a film thickness of 40 μm, then allowed to stand for 7 minutes, and heated at 140° C. for 30 minutes to simultaneously cure both coating films. Thereby, a test panel consisting of a substrate and a multilayer coating film comprising a base coat and a clear coat formed on the substrate was obtained.

Examples 59 to 89 and Comparative Examples 13 to 19

Test panels of Examples 59 to 89 and Comparative Examples 13 to 19 were obtained in the same manner as in Example 58, except that the aqueous base coating compositions shown in Table 5 were used in place of the aqueous coating composition (X-1).

Evaluation Test 1

Each test panel obtained in Examples 58 to 89 and Comparative Examples 13 to 19 was tested for DOI, flip-flop property, metallic mottling, and water resistance. The test methods are as follows:

DOI: DOI was evaluated for each test panel based on the Short Wave (SW) values measured by "Wave Scan" (product name, manufactured by BYK Gardner). The smaller the Short Wave (SW) value, the higher DOI on the coated surface.

Flip-flop property: Each test panel was observed visually from various angles, and the flip-flop property was rated according to the following criteria.

A: Variation of the brightness depending on the angle of viewing is significantly high (extremely excellent flip-flop property).
B: Variation of the brightness depending on the angle of viewing is high (excellent flip-flop property).
C: Variation of the brightness depending on the angle of viewing is slightly low (slightly poor flip-flop property).
D: Variation of the brightness depending on the angle of viewing is low (poor flip-flop property).

Metallic mottling: Each test panel was visually observed, and the degree of occurrence of metallic mottling was evaluated according to the following criteria:

A: Substantially no metallic mottling was observed, and the coating film has an extremely excellent appearance.
B: A small amount of metallic mottling was observed, but the coated film has an excellent appearance.
C: Metallic mottling was observed, and the coating film has a slightly poor appearance.
D: A considerable amount of metallic mottling was observed, and the coating film has a poor appearance.

Water resistance: Each test panel was immersed in 40° C. warm water for 240 hours, then removed and dried at 20° C. for 12 hours. Subsequently, cross-cuts reaching the substrate were made in the multilayer coating film on the test panel using a cutter knife to form a grid of 100 squares (2 mm×2 mm). Afterwards, an adhesive cellophane tape was applied to the surface of the grid portion, and abruptly peeled off at 20° C. The condition of the remaining coating film squares was then checked. The water resistance was evaluated according to the following criteria:

A: 100 squares remained, and no edge chipping occurred.
B: 100 squares remained, but edge chipping occurred.
C: 90 to 99 squares remained.
D: The number of remaining squares was 89 or less.

Comprehensive Evaluation

For coating vehicles and the like in the field to which the present invention pertains, all of DOI, flip-flop property, metallic mottling, and water resistance are expected to be excellent. Accordingly, the comprehensive evaluation was conducted according to the following criteria:

A: DOI ((SW) value) is 12 or lower, and all of the flip-flop property, metallic mottling, and water resistance are A.
B: DOI ((SW) value) is 12 or lower, and each of the flip-flop property, metallic mottling, and water resistance is either A or B, with at least one of them being B.
C: DOI ((SW) value) is 12 or lower, and each of the flip-flop property, metallic mottling, and water resistance is A B or C, with at least one of them being C.
D: DOI ((SW) value) is 13 or higher, or at least one of the flip-flop property, metallic mottling, and water resistance is D.

Table 5 shows the test results of the coating film performance.

TABLE 5

|  |  | Aqueous coating composition | DOI | Luster Flip-flop property | Metallic mottling | Water resistance | Comprehensive evaluation |
|---|---|---|---|---|---|---|---|
| Example | 58 | X-1 | 9 | A | A | A | A |
|  | 59 | X-2 | 7 | A | A | A | A |
|  | 60 | X-3 | 8 | A | A | A | A |
|  | 61 | X-4 | 9 | A | A | A | A |
|  | 62 | X-5 | 9 | A | A | A | A |
|  | 63 | X-6 | 10 | A | A | A | A |
|  | 64 | X-7 | 9 | A | A | A | A |
|  | 65 | X-8 | 9 | A | A | A | A |
|  | 66 | X-9 | 9 | A | A | A | A |
|  | 67 | X-10 | 9 | A | A | A | A |
|  | 68 | X-11 | 9 | B | A | B | B |
|  | 69 | X-12 | 9 | B | A | A | B |
|  | 70 | X-13 | 9 | B | A | A | B |
|  | 71 | X-14 | 9 | A | A | A | A |
|  | 72 | X-15 | 9 | A | A | A | A |
|  | 73 | X-16 | 9 | B | A | A | B |
|  | 74 | X-17 | 9 | B | A | B | B |
|  | 75 | X-18 | 7 | A | A | A | A |
|  | 76 | X-19 | 7 | A | A | A | A |
|  | 77 | X-20 | 9 | A | A | A | A |
|  | 78 | X-21 | 10 | B | A | A | B |
|  | 79 | X-22 | 10 | B | B | A | B |
|  | 80 | X-23 | 9 | A | A | A | A |
|  | 81 | X-24 | 8 | A | B | A | B |
|  | 82 | X-25 | 8 | B | B | A | B |
|  | 83 | X-26 | 9 | A | B | A | B |
|  | 84 | X-27 | 9 | A | B | A | B |
|  | 85 | X-28 | 10 | B | B | B | B |
|  | 86 | X-29 | 10 | B | B | B | B |
|  | 87 | X-30 | 10 | B | B | B | B |
|  | 88 | X-31 | 10 | A | A | B | B |
|  | 89 | X-32 | 9 | B | B | A | B |
| Comparative Example | 13 | X-33 | 24 | C | C | A | D |
|  | 14 | X-34 | 26 | C | C | A | D |
|  | 15 | X-35 | 15 | C | C | A | D |
|  | 16 | X-36 | 17 | C | C | A | D |
|  | 17 | X-37 | 16 | C | C | A. | D |
|  | 18 | X-38 | 25 | C | C | A | D |
|  | 19 | X-39 | 30 | C | C | A | D |

Production of Copolymer

Examples 90 to 120 and Comparative Examples 20 to 24

Synthesis was carried out in the same manner as in Example 1, except that the composition shown in Table 6 was used, thereby obtaining diluted fluids of copolymer (RC-31) to (RC-66) having a solids content of 20%.

Table 6 below shows the composition of raw materials (parts) and weight average molecular weight of the diluted fluids of copolymer (RC-31) to (RC-66).

TABLE 6

|  | Example | | | | | | | | | |
|---|---|---|---|---|---|---|---|---|---|---|
|  | 90 | 91 | 92 | 93 | 94 | 95 | 96 | 97 | 98 | 99 |
| Diluted Fluid of Copolymer | RC-31 | RC-32 | RC-33 | RC-34 | RC-35 | RC-36 | RC-37 | RC-38 | RC-39 | RC-40 |

TABLE 6-continued

| Monomer Component (m) | Macromonomer (m-1) solution | Type | m-1-1 | m-1-2 | m-1-3 | m-1-4 | m-1-5 | m-1-6 | m-1-7 | m-1-8 | m-1-9 | m-1-10 |
|---|---|---|---|---|---|---|---|---|---|---|---|---|
| | | Quantity | 15.4 | 15.4 | 15.4 | 15.4 | 7.7 | 15.4 | 15.4 | 15.4 | 15.4 | 15.4 |
| | Polymerizable unsaturated monomer having a hydrophilic group (m-2) | Acrylic acid | 27 | 27 | 27 | 27 | 28.5 | 27 | 22.5 | 30 | 32 | 36 |
| | Other polymerizable unsaturated monomers (m-3) | Ethyl acrylate | 63 | 63 | 63 | 63 | 66.5 | 63 | 67.5 | 60 | 58 | 54 |
| Perbutyl-O | | | 0.15 | 0.15 | 0.15 | 0.15 | 0.15 | 0.15 | 0.15 | 0.15 | 0.15 | 0.15 |
| Content of macromonomer (m-1) [Mass %] | | | 10 | 10 | 10 | 10 | 5 | 10 | 10 | 10 | 10 | 10 |
| Content of polymerizable unsaturated monomer having a hydrophilic group (m-2) [Mass %] | | | 27 | 27 | 27 | 27 | 29 | 27 | 22.5 | 30 | 32 | 36 |
| Content of other polymerizable unsaturated monomers (m-3) [Mass %] | | | 63 | 63 | 63 | 63 | 67 | 63 | 67.5 | 60 | 58 | 54 |
| Weight average molecular weight [×10$^4$] | | | 30 | 30 | 30 | 30 | 30 | 30 | 25 | 32 | 34 | 36 |

| | | | Example | | | | | | | | | |
|---|---|---|---|---|---|---|---|---|---|---|---|---|
| | | | 100 | 101 | 102 | 103 | 104 | 105 | 106 | 107 | 108 | 109 |
| Diluted Fluid of Copolymer | | | RC-41 | RC-42 | RC-43 | RC-44 | RC-45 | RC-46 | RC-47 | RC-48 | RC-49 | RC-50 |
| Monomer Component (m) | Macromonomer (m-1) solution | Type | m-1-11 | m-1-12 | m-1-13 | m-1-3 | m-1-3 | m-1-3 | m-1-3 | m-1-3 | m-1-2 | m-1-2 |
| | | Quantity | 15.4 | 15.4 | 15.4 | 15.4 | 15.4 | 15.4 | 15.4 | 15.4 | 15.4 | 15.4 |
| | Polymerizable unsaturated monomer having a hydrophilic group (m-2) | Acrylic acid | 27 | 36 | 36 | | 7 | 13.5 | 54 | 63 | 22.5 | 36 |
| | | Methacrylic acid | | | | 27 | | | | | | |
| | | 2-hydroxyethyl acrylate | | | | | | | | | 7 | 13.5 |
| | | Dimethylacrylamide | | | | | | 8 | | | | 13.5 |
| | | N-isopropylacrylamide | | | | | | 8 | | | | |
| | | N-vinyl-2-pyrrolidone | | | | | | | | | 4.5 | |
| | | NK-ester AM-90G (*2) | | | | | | 13.5 | | | | |
| | Other polymerizable unsaturated monomers (m-3) | Methyl methacrylate | | | | | | 18 | | | | 27 |
| | | Ethyl acrylate | 63 | 54 | 54 | 63 | 67 | 45 | 36 | 27 | 56 | |
| Perbutyl-O | | | 0.15 | 0.15 | 0.15 | 0.15 | 0.15 | 0.15 | 0.15 | 0.15 | 0.15 | 0.15 |
| Content of macromonomer (m-1) [Mass %] | | | 10 | 10 | 10 | 10 | 10 | 10 | 10 | 10 | 10 | 10 |
| Content of polymerizable unsaturated monomer having a hydrophilic group (m-2) [Mass %] | | | 27 | 36 | 36 | 27 | 23 | 13.5 | 54 | 63 | 34 | 63 |
| Content of other polymerizable unsaturated monomers (m-3) [Mass %] | | | 63 | 54 | 54 | 63 | 67 | 63.0 | 36 | 27 | 56 | 27 |
| Weight average molecular weight [×10$^4$] | | | 30 | 30 | 30 | 25 | 30 | 25 | 30 | 30 | 30 | 25 |

| | | | Example | | | | | | | | | |
|---|---|---|---|---|---|---|---|---|---|---|---|---|
| | | | 110 | 111 | 112 | 113 | 114 | 115 | 116 | 117 | 118 | 119 |
| Diluted Fluid of Copolymer | | | RC-51 | RC-52 | RC-53 | RC-54 | RC-55 | RC-56 | RC-57 | RC-58 | RC-59 | RC-60 |
| Monomer Component (m) | Macromonomer (m-1) solution | Type | m-1-2 | m-1-3 | m-1-3 | m-1-3 | m-1-3 | m-1-3 | m-1-3 | m-1-3 | m-1-3 | m-1-3 |
| | | Quantity | 15.4 | 3.1 | 6.2 | 12.3 | 27.7 | 38.5 | 53.8 | 15.4 | 15.4 | 15.4 |
| | Polymerizable unsaturated monomer having a hydrophilic group (m-2) | Acrylic acid | 31.5 | 10 | 14 | 18 | 29 | 22.5 | 29 | 27 | 27 | 27 |
| | | 2-hydroxyethyl acrylate | 27 | | | | | | | | | |
| | | Dimethylacrylamide | 13.5 | | | | | | | | | |
| | Other polymerizable unsaturated monomers (m-3) | Methyl methacrylate | 18 | | | | | | | | | |
| | | Ethyl acrylate | | 88 | 82 | 74 | 53 | 52.5 | 36 | 63 | 63 | 63 |
| Perbutyl-O | | | 0.15 | 0.15 | 0.15 | 0.15 | 0.15 | 0.15 | 0.15 | 2 | 0.5 | 0.12 |
| Content of macromonomer (m-1) [Mass %] | | | 10 | 2 | 4 | 8 | 18 | 25 | 35 | 10 | 10 | 10 |
| Content of polymerizable unsaturated monomer having a hydrophilic group (m-2) [Mass %] | | | 72 | 10 | 14 | 18 | 29 | 22.5 | 29 | 27 | 27 | 27 |
| Content of other polymerizable unsaturated monomers (m-3) [Mass %] | | | 18 | 88 | 82 | 74 | 53 | 52.5 | 36 | 63 | 63 | 63 |
| Weight average molecular weight [×10$^4$] | | | 25 | 24 | 24 | 24 | 23 | 20 | 20 | 8 | 12 | 38 |

| | | | Example | Comparative Example | | | | |
|---|---|---|---|---|---|---|---|---|
| | | | 120 | 20 | 21 | 22 | 23 | 24 |
| Diluted Fluid of Copolymer | | | RC-61 | RC-62 | RC-63 | RC-64 | RC-65 | RC-66 |
| Monomer Component (m) | Macromonomer (m-1) solution | Type | m-1-3 | m-1-15 | | m-1-16 | m-1-17 | |
| | | Quantity | 15.4 | 15.4 | | 15.4 | 15.4 | |

TABLE 6-continued

|  |  |  |  |  |  |  |  |  |
|---|---|---|---|---|---|---|---|---|
|  | Polymerizable unsaturated monomer having a hydrophilic group (m-2) | Acrylic acid | 27 | 27 | 30 | 27 | 27 |  |
|  |  | Methacrylic acid |  |  |  |  |  | 20 |
|  | Other polymerizable unsaturated monomers (m-3) | Methyl methacrylate |  |  |  |  |  | 25 |
|  |  | Ethyl acrylate | 63 | 63 | 70 | 63 | 63 | 15 |
|  |  | PLEX 6954-0 (*3) |  |  |  |  |  | 50 |
| Perbutyl-O |  |  | 0.1 | 0.15 | 0.15 | 0.15 | 0.15 | 0.15 |
| Content of macromonomer (m-1) [Mass %] |  |  | 10 | 10 | 0 | 10 | 10 | 0 |
| Content of polymerizable unsaturated monomer having a hydrophilic group (m-2) [Mass %] |  |  | 27 | 27 | 30 | 27 | 27 | 20 |
| Content of other polymerizable unsaturated monomers (m-3) [Mass %] |  |  | 63 | 63 | 70 | 63 | 63 | 80 |
| Weight average molecular weight [×10⁴] |  |  | 42 | 30 | 30 | 28 | 37 | 30 |

(Note 2)
"NK-ester AM-90G": same as described above.
(Note 3)
"PLEX 6954-0": same as described above.

Production of Aqueous Coating Composition

Examples 121 to 158 and Comparative Examples 25 to 31

Aqueous coating compositions (X-40) to (X-84) having a pH of 8.0 and a solids content of 25% were obtained in the same manner as in Example 26, except that the formulation composition shown in Table 7 was used.

TABLE 7

|  |  |  | Example |  |  |  |  |  |  |  |  |  |
|---|---|---|---|---|---|---|---|---|---|---|---|---|
|  |  |  | 121 | 122 | 123 | 124 | 125 | 126 | 127 | 128 | 129 | 130 |
| Aqueous Coating Composition |  |  | X-40 | X-41 | X-42 | X-43 | X-44 | X-45 | X-46 | X-47 | X-48 | X-49 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 | 100 |
|  |  | Hydroxy-containing acrylic resin solution (A1-6) | 18 | 18 | 18 | 18 | 18 | 18 | 18 | 18 | 18 | 18 |
|  | Hydroxy-containing polyester resin (A2) | Hydroxy-containing polyester resin solution (A2-1) | 43 | 43 | 43 | 43 | 43 | 43 | 43 | 43 | 43 | 43 |
| Curing agent (B) |  | Melamine resin (B-1) | 50 | 50 | 50 | 50 | 50 | 50 | 50 | 50 | 50 | 50 |
| Aluminium pigment dispersion |  | Type | P-1 | P-1 | P-1 | P-1 | P-1 | P-1 | P-1 | P-1 | P-1 | P-1 |
|  |  | Quantity | 62 | 62 | 62 | 62 | 62 | 62 | 62 | 62 | 62 | 62 |
| Diluted fluid of copolymer |  | Type | RC-31 | RC-32 | RC-33 | RC-34 | RC-35 | RC-36 | RC-37 | RC-38 | RC-39 | RC-40 |
|  |  | Quantity | 7.5 | 7.5 | 7.5 | 7.5 | 7.5 | 7.5 | 7.5 | 7.5 | 7.5 | 7.5 |
| Viscosity $V_1$ at a rate of shear of 1000 sec$^{-1}$ [Pa-sec] |  |  | 0.05 | 0.05 | 0.05 | 0.04 | 0.04 | 0.04 | 0.04 | 0.056 | 0.061 | 0.065 |
| Viscosity $V_2$ at a rate of shear of 0.1 sec$^{-1}$ [Pa-sec] |  |  | 37 | 47 | 42 | 35 | 33 | 30 | 33 | 51 | 55 | 60 |
| $V_2/V_1$ |  |  | 744 | 930 | 837 | 884 | 814 | 744 | 837 | 913 | 900 | 930 |

|  |  |  | Example |  |  |  |  |  |  |  |  |  |
|---|---|---|---|---|---|---|---|---|---|---|---|---|
|  |  |  | 131 | 132 | 133 | 134 | 135 | 136 | 137 | 138 | 139 | 140 |
| Aqueous Coating Composition |  |  | X-50 | X-51 | X-52 | X-53 | X-54 | X-55 | X-56 | X-57 | X-58 | X-59 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 | 100 |
|  |  | Hydroxy-containing acrylic resin solution (A1-6) | 18 | 18 | 18 | 18 | 18 | 18 | 18 | 18 | 18 | 18 |
|  | Hydroxy-containing polyester resin (A2) | Hydroxy-containing polyester resin solution (A2-1) | 43 | 43 | 43 | 43 | 43 | 43 | 43 | 43 | 43 | 43 |
| Curing agent (B) |  | Melamine resin (B-1) | 50 | 50 | 50 | 50 | 50 | 50 | 50 | 50 |  | 50 |
|  |  | Melamine resin (B-2) (*4) |  |  |  |  |  |  |  |  | 38 |  |

TABLE 7-continued

| Aluminium pigment | Type | P-1 | P-1 | P-1 | P-1 | P-1 | P-1 | P-1 | P-1 | P-1 | P-1 |
|---|---|---|---|---|---|---|---|---|---|---|---|
| dispersion | Quantity | 62 | 62 | 62 | 62 | 62 | 62 | 62 | 62 | 62 | 62 |
| Diluted fluid | Type | RC-41 | RC-42 | RC-43 | RC-44 | RC-45 | RC-46 | RC-47 | RC-48 | RC-49 | RC-50 |
| of copolymer | Quantity | 7.5 | 7.5 | 7.5 | 7.5 | 7.5 | 7.5 | 7.5 | 7.5 | 7.5 | 7.5 |
| Viscosity $V_1$ at a rate of shear of 1000 $sec^{-1}$ [Pa-sec] | | 0.07 | 0.07 | 0.07 | 0.05 | 0.043 | 0.043 | 0.043 | 0.043 | 0.07 | 0.05 |
| Viscosity $V_2$ at a rate of shear of 0.1 sec [Pa-sec] | | 47 | 47 | 47 | 40 | 30 | 30 | 30 | 30 | 47 | 47 |
| $V_2/V_1$ | | 664 | 664 | 664 | 800 | 692 | 692 | 692 | 692 | 664 | 930 |

| | | | Example | | | | | | | | |
|---|---|---|---|---|---|---|---|---|---|---|---|
| | | | 141 | 142 | 143 | 144 | 145 | 146 | 147 | 148 | 149 | 150 |
| Aqueous Coating Composition | | | X-60 | X-61 | X-62 | X-63 | X-64 | X-65 | X-66 | X-67 | X-68 | X-69 |
| Film-forming resin (A) | Hydroxy-containing acrylic resin (A1) | Water dispersion of water-dispersible hydroxy-containing acrylic resin (A1-1) | 100 | 100 | 100 | 100 | 100 | 100 | 100 | 100 | 100 | 100 |
| | | Hydroxy-containing acrylic resin solution (A1-6) | 18 | 18 | 18 | 18 | 18 | 18 | 18 | 18 | 18 | 18 |
| | Hydroxy-containing polyester resin (A2) | Hydroxy-containing polyester resin solution (A2-1) | 43 | 43 | 43 | 43 | 43 | 43 | 43 | 43 | 43 | 43 |
| Curing agent (B) | Melamine resin (B-1) | | 50 | 50 | 50 | 50 | 50 | 50 | 50 | 50 | 50 | 50 |
| Aluminium pigment | Type | | P-1 | P-1 | P-1 | P-1 | P-1 | P-1 | P-1 | P-1 | P-1 | P-1 |
| dispersion | Quantity | | 62 | 62 | 62 | 62 | 62 | 62 | 62 | 62 | 62 | 62 |
| Diluted fluid | Type | | RC-51 | RC-52 | RC-53 | RC-54 | RC-55 | RC-56 | RC-57 | RC-58 | RC-59 | RC-60 |
| of copolymer | Quantity | | 7.5 | 7.5 | 7.5 | 7.5 | 7.5 | 7.5 | 7.5 | 7.5 | 7.5 | 7.5 |
| Viscosity $V_1$ at a rate of shear of 1000 $sec^{-1}$ [Pa-sec] | | | 0.05 | 0.08 | 0.08 | 0.08 | 0.06 | 0.08 | 0.08 | 0.04 | 0.043 | 0.06 |
| Viscosity $V_2$ at a rate of shear of 0.1 $sec^{-1}$ [Pa-sec] | | | 47 | 25 | 26 | 27 | 28 | 27 | 26 | 29 | 30 | 61 |
| $V_2/V_1$ | | | 930 | 313 | 325 | 338 | 467 | 338 | 325 | 721 | 692 | 1023 |

| | | | Example | | | | | | | | Comparative Example | |
|---|---|---|---|---|---|---|---|---|---|---|---|---|
| | | | 151 | 152 | 153 | 154 | 155 | 156 | 157 | 158 | 25 | 26 |
| Aqueous Coating Composition | | | X-70 | X-71 | X-72 | X-73 | X-74 | X-75 | X-76 | X-77 | X-78 | X-79 |
| Film-forming resin (A) | Hydroxy-containing acrylic resin (A1) | Water dispersion of water-dispersible hydroxy-containing acrylic resin (A1-1) | 100 | | | | | | 100 | 100 | 100 | 100 |
| | | Water dispersion of water-dispersible hydroxy-containing acrylic resin (A1-2) | | 100 | | | | | | | | |
| | | Water dispersion of water-dispersible hydroxy-containing acrylic resin (A1-3) | | | 117 | | | | | | | |
| | | Water dispersion of water-dispersible hydroxy-containing acrylic resin (A1-4) | | | | 100 | | | | | | |
| | | Water dispersion of water-dispersible hydroxy-containing acrylic resin (A1-5) | | | | | 100 | | | | | |
| | | Hydroxy-containing acrylic resin solution (A1-6) | 18 | 18 | | 18 | 18 | 73 | 18 | 18 | 18 | 18 |
| | Hydroxy-containing polyester resin (A2) | Hydroxy-containing polyester resin solution (A2-1) | 43 | 43 | 43 | 43 | 43 | 43 | | | 43 | 43 |
| | | Hydroxy-containing polyester resin solution (A2-2) | | | | | | | | 43 | | |
| | | Hydroxy-containing polyester resin solution (A2-3) | | | | | | | | 43 | | |
| Curing agent (B) | Melamine resin (B-1) | | 50 | 50 | 50 | 50 | 50 | 50 | 50 | 50 | 50 | 50 |
| | Bayhydur VPLS2310 (*5) | | | | | | | 13 | | | | |
| Aluminium pigment | Type | | P-1 | P-1 | P-1 | P-1 | P-1 | P-1 | P-1 | P-2 | P-1 | P-1 |
| dispersion | Quantity | | 62 | 62 | 62 | 62 | 62 | 62 | 62 | 62 | 62 | 62 |
| Diluted fluid | Type | | RC-61 | RC-33 | RC-33 | RC-33 | RC-33 | RC-33 | RC-32 | RC-32 | RC-62 | RC-63 |
| of copolymer | Quantity | | 7.5 | 7.5 | 7.5 | 7.5 | 7.5 | 7.5 | 7.5 | 7.5 | 7.5 | 7.5 |

TABLE 7-continued

| | | | | | | | | | | |
|---|---|---|---|---|---|---|---|---|---|---|
| Viscosity $V_1$ at a rate of shear of 1000 sec$^{-1}$[Pa-sec] | 0.07 | 0.05 | 0.05 | 0.04 | 0.04 | 0.04 | 0.04 | 0.04 | 0.02 | 0.01 |
| Viscosity $V_2$ at a rate of shear of 0.1 sec$^{-1}$[Pa-sec] | 62 | 41 | 43 | 41 | 38 | 29 | 38 | 31 | 5 | 3 |
| $V_2/V_1$ | 890 | 818 | 856 | 1023 | 953 | 721 | 953 | 767 | 233 | 279 |

| | | | Comparative Example | | | | |
|---|---|---|---|---|---|---|---|
| | | | 27 | 28 | 29 | 30 | 31 |
| Aqueous Coating Composition | | | X-80 | X-81 | X-82 | X-83 | X-84 |
| Film-forming resin (A) | Hydroxy-containing acrylic resin (A1) | Water dispersion of water-dispersible hydroxy-containing acrylic resin (A1-1) | 100 | 100 | 100 | 100 | 100 |
| | | Hydroxy-containing acrylic resin solution (A1-6) | 18 | 18 | 18 | 18 | 18 |
| | Hydroxy-containing polyester resin (A2) | Hydroxy-containing polyester resin solution (A2-1) | 43 | 43 | 43 | 43 | 43 |
| Curing agent (B) | | Melamine resin (B-1) | 50 | 50 | 50 | 50 | 50 |
| Aluminium pigment dispersion | | Type | P-1 | P-1 | P-1 | P-1 | P-1 |
| dispersion | | Quantity | 62 | 62 | 62 | 62 | 62 |
| Diluted fluid of copolymer | | Type | RC-64 | RC-65 | RC-66 | | |
| | | Quantity | 7.5 | 7.5 | 7.5 | | |
| Viscosity-controlling agent | | ACRYSOL RM-825 (*6) | | | | 6 | |
| Viscosity $V_1$ at a rate of shear of 1000 sec$^{-1}$[Pa-sec] | | | 0.03 | 0.05 | 0.04 | 0.05 | 0.02 |
| Viscosity $V_2$ at a rate of shear of 0.1 sec$^{-1}$[Pa-sec] | | | 14 | 19 | 18 | 7 | 1 |
| $V_2/V_1$ | | | 465 | 372 | 450 | 140 | 50 |

(Note 4)
Melamine resin (B-2): same as described above.
(Note 5)
"Bayhydur VPLS2310": same as described above.
(Note 6)
"ACRYSOL RM-825": same as described above.

Method of Forming Coating Films

Examples 159 to 196 and Comparative Examples 32 to 38

Test panels of Examples 159 to 196 and Comparative Examples 32 to 38 were obtained in the same manner as in Example 58, except that the aqueous coating composition shown in Table 8 was used in place of the aqueous coating composition (X-1).

Evaluation Test 2

Each test panel obtained in the Examples 159 to 196 and Comparative Examples 32 to 38 was tested for DOI, flip-flop property, metallic mottling, and water resistance, and these properties were comprehensively evaluated. Each test method is as described in the Evaluation Test 1.

Table 8 shows the test results of the coating film performance.

TABLE 8

| | | Aqueous coating composition | DOI | Luster Flip-flop property | Metallic mottling | Water resistance | Comprehensive evaluation |
|---|---|---|---|---|---|---|---|
| Example | 159 | X-40 | 10 | A | A | A | A |
| | 160 | X-41 | 8 | A | A | A | A |
| | 161 | X-42 | 9 | A | A | A | A |
| | 162 | X-43 | 10 | A | A | A | A |
| | 163 | X-44 | 10 | A | A | A | A |
| | 164 | X-45 | 11 | A | A | A | A |
| | 165 | X-46 | 10 | A | A | A | A |
| | 166 | X-47 | 10 | A | A | A | A |
| | 167 | X-48 | 10 | A | A | A | A |
| | 168 | X-49 | 10 | A | A | A | A |
| | 169 | X-50 | 10 | B | A | B | B |
| | 170 | X-51 | 10 | B | A | A | B |
| | 171 | X-52 | 10 | B | A | A | B |
| | 172 | X-53 | 11 | A | A | A | A |
| | 173 | X-54 | 10 | A | A | A | A |
| | 174 | X-55 | 10 | A | A | A | A |
| | 175 | X-56 | 10 | A | A | B | B |
| | 176 | X-57 | 10 | A | B | B | B |
| | 177 | X-58 | 10 | B | A | B | B |
| | 178 | X-59 | 8 | A | A | A | A |
| | 179 | X-60 | 8 | A | A | B | B |

TABLE 8-continued

|  |  | Aqueous coating composition | DOI | Luster | | | Comprehensive evaluation |
|---|---|---|---|---|---|---|---|
|  |  |  |  | Flip-flop property | Metallic mottling | Water resistance |  |
|  | 180 | X-61 | 11 | B | A | A | B |
|  | 181 | X-62 | 10 | B | A | A | B |
|  | 182 | X-63 | 9 | B | A | A | B |
|  | 183 | X-64 | 10 | A | A | A | A |
|  | 184 | X-65 | 10 | B | A | A | B |
|  | 185 | X-66 | 11 | B | A | A | B |
|  | 186 | X-67 | 11 | B | B | A | B |
|  | 187 | X-68 | 10 | A | A | A | A |
|  | 188 | X-69 | 9 | A | B | A | B |
|  | 189 | X-70 | 9 | B | B | A | B |
|  | 190 | X-71 | 10 | A | B | A | B |
|  | 191 | X-72 | 10 | A | B | A | B |
|  | 192 | X-73 | 11 | B | B | B | B |
|  | 193 | X-74 | 11 | B | B | B | B |
|  | 194 | X-75 | 12 | B | B | B | B |
|  | 195 | X-76 | 11 | A | A | B | B |
|  | 196 | X-77 | 10 | B | B | A | B |
| Comparative Example | 32 | X-78 | 25 | D | D | A | D |
|  | 33 | X-79 | 28 | D | D | A | D |
|  | 34 | X-80 | 16 | D | D | A | D |
|  | 35 | X-81 | 18 | D | D | A | D |
|  | 36 | X-82 | 17 | C | C | A | D |
|  | 37 | X-83 | 26 | D | D | A | D |
|  | 38 | X-84 | 30 | D | D | A | D |

Production of Copolymer

Examples 197 to 228 and Comparative Examples 39 to 43

Synthesis was carried out in the same manner as in Example 1, except that the composition shown in Table 9 below was used, thereby obtaining diluted fluids of copolymer (RC-67) to (RC-103) having a solids content of 20%.

Table 9 below shows the composition of raw materials (parts) and weight average molecular weight of the diluted fluids of copolymer (RC-67) to (RC-103).

TABLE 9

| | | | | Example | | | | | | | | |
|---|---|---|---|---|---|---|---|---|---|---|---|---|
| | | | | 197 | 198 | 199 | 200 | 201 | 202 | 203 | 204 | 205 |
| Diluted fluid of copolymer | | | | RC-67 | RC-68 | RC-69 | RC-70 | RC-71 | RC-72 | RC-73 | RC-74 | RC-75 |
| Monomer Component (m) | Macromonomer (m-1) solution | | Type | m-1-1 | m-1-3 | m-1-4 | m-1-5 | m-1-6 | m-1-7 | m-1-8 | m-1-9 | m-1-10 |
| | | | Quantity | 15.4 | 15.4 | 15.4 | 7.7 | 15.4 | 15.4 | 15.4 | 15.4 | 15.4 |
| | Polymerizable unsaturated monomer having a hydrophilic group (m-2) | N-substituted (meth) acrylamide | N,N-dimethylacrylamide | 31.5 | 31.5 | 31.5 | 33 | 31.5 | 18 | 27 | 45 | 63 |
| | | | N-isopropylacrylamide | 31.5 | 31.5 | 31.5 | 33 | 31.5 | 45 | 36 | 18 | |
| | | | 2-hydroxyethyl acrylate | 27 | 27 | 27 | 29 | 27 | 27 | 27 | 27 | 27 |
| Perbutyl-O | | | | 0.15 | 0.15 | 0.15 | 0.15 | 0.15 | 0.15 | 0.15 | 0.15 | 0.15 |
| Content of macromonomer (m-1) [Mass %] | | | | 10 | 10 | 10 | 5 | 10 | 10 | 10 | 10 | 10 |
| Content of polymerizable unsaturated monomer having a hydrophilic group (m-2) [Mass %] | | | | 90 | 90 | 90 | 95 | 90 | 90 | 90 | 90 | 90 |
| Content of other polymerizable unsaturated monomers (m-3) [Mass %] | | | | 0 | 0 | 0 | 0 | 0 | 0 | 0 | 0 | 0 |
| Weight average molecular weight [×10$^4$] | | | | 31 | 31 | 31 | 31 | 31 | 25 | 32 | 34 | 36 |

| | | | | Example | | | | | | |
|---|---|---|---|---|---|---|---|---|---|---|
| | | | | 206 | 207 | 208 | 209 | 210 | 211 | 212 |
| Diluted fluid of copolymer | | | | RC-76 | RC-77 | RC-78 | RC-79 | RC-80 | RC-81 | RC-82 |
| Monomer Component (m) | Macromonomer (m-1) solution | | Type | m-1-11 | m-1-12 | m-1-13 | m-1-18 | m-1-19 | m-1-20 | m-1-21 |
| | | | Quantity | 15.4 | 15.4 | 15.4 | 15.4 | 15.4 | 15.4 | 15.4 |
| | Polymerizable unsaturated monomer having a hydrophilic | N-substituted (meth) acrylamide Polymerizable | N,N-dimethylacrylamide | 31.5 | 27 | 27 | 31.5 | 31.5 | 31.5 | 36 |
| | | | N-isopropylacrylamide | 31.5 | 27 | 27 | 31.5 | 31.5 | 31.5 | 36 |
| | | | NK-ester | | | | | | | |

TABLE 9-continued

| | | | | | | | | | |
|---|---|---|---|---|---|---|---|---|---|
| | group (m-2) | unsaturated monomer having a polyoxyalkylene chain | AM-90G (*2) | | | | | | |
| | | N-vinyl-2-pyrrolidone | | | | | | | |
| | | 2-hydroxyethyl acrylate | | 27 | 36 | 36 | 27 | 27 | 27 |
| | | Acrylic acid | | | | | | | | 18 |
| | | Methacrylic acid | | | | | | | | |
| | Other polymerizable unsaturated monomers (m-3) | Methyl methacrylate | | | | | | | | |
| | | Ethyl acrylate | | | | | | | | |
| Perbutyl-O | | | | 0.15 | 0.15 | 0.15 | 0.15 | 0.15 | 0.15 | 0.15 |
| Content of macromonomer (m-1) [Mass %] | | | | 10 | 10 | 10 | 10 | 10 | 10 | 10 |
| Content of polymerizable unsaturated monomer having a hydrophilic group (m-2) [Mass %] | | | | 90 | 90 | 90 | 90 | 90 | 90 | 90 |
| Content of other polymerizable unsaturated monomers (m-3) [Mass %] | | | | 0 | 0 | 0 | 0 | 0 | 0 | 0 |
| Weight average molecular weight [×10⁴] | | | | 31 | 31 | 31 | 31 | 31 | 31 | 20 |

| | | | | Example | | | | | |
|---|---|---|---|---|---|---|---|---|---|
| | | | | 213 | 214 | 215 | 216 | 217 | 218 |
| Diluted fluid of copolymer | | | | RC-83 | RC-84 | RC-85 | RC-86 | RC-87 | RC-88 |
| Monomer Component (m) | Macromonomer (m-1) solution | Type | | m-1-3 | m-1-3 | m-1-3 | m-1-2 | m-1-2 | m-1-3 |
| | | Quantity | | 15.4 | 15.4 | 15.4 | 15.4 | 15.4 | 15.4 |
| | Polymerizable unsaturated monomer having a hydrophilic group (m-2) | N-substituted (meth) acrylamide | N,N-dimethyl-acrylamide | | | | | | |
| | | | N-isopropyl-acrylamide | | | | | | |
| | | Polymerizable unsaturated monomer having a polyoxyalkylene chain | NK-ester AM-90G (*2) | 63 | | | | | |
| | | | N-vinyl-2-pyrrolidone | | 63 | | | | |
| | | | 2-hydroxyethyl acrylate | 27 | 27 | 72 | | | |
| | | | Acrylic acid | | | | 27 | | 18 |
| | | | Methacrylic acid | | | | | 45 | |
| | Other polymerizable unsaturated monomers (m-3) | Methyl methacrylate | | | | | | | 18 |
| | | Ethyl acrylate | | | | 18 | 63 | 45 | 54 |
| Perbutyl-O | | | | 0.15 | 0.15 | 0.15 | 0.15 | 0.15 | 0.15 |
| Content of macromonomer (m-1) [Mass %] | | | | 10 | 10 | 10 | 10 | 10 | 10 |
| Content of polymerizable unsaturated monomer having a hydrophilic group (m-2) [Mass %] | | | | 90 | 90 | 72 | 27 | 45 | 18 |
| Content of other polymerizable unsaturated monomers (m-3) [Mass %] | | | | 0 | 0 | 18 | 63 | 45 | 72 |
| Weight average molecular weight [×10⁴] | | | | 31 | 31 | 31 | 31 | 20 | 31 |

| | | | | Example | | | | | | | | |
|---|---|---|---|---|---|---|---|---|---|---|---|---|
| | | | | 219 | 220 | 221 | 222 | 223 | 224 | 225 | 226 | 227 |
| Diluted fluid of copolymer | | | | RC-89 | RC-90 | RC-91 | RC-92 | RC-93 | RC-94 | RC-95 | RC-96 | RC-97 |
| Monomer Component (m) | Macromonomer (m-1) solution | Type | | m-1-2 | m-1-2 | m-1-2 | m-1-14 | m-1-3 | m-1-3 | m-1-3 | m-1-3 | m-1-3 |
| | | Quantity | | 15.4 | 15.4 | 15.4 | 27.7 | 38.5 | 53.8 | 15.4 | 15.4 | 15.4 |
| | Polymerizable unsaturated monomer having a hydrophilic group (m-2) | N-substituted (meth) acrylamide | N,N-dimethyl-acrylamide | 36 | 31.5 | 58.5 | 28.7 | 26 | | 31.5 | 31.5 | 31.5 |
| | | | N-isopropyl-acrylamide | 36 | | | 28.7 | 26 | | 31.5 | 31.5 | 31.5 |
| | | 2-hydroxyethyl acrylate | | | 27 | 27 | 24.6 | 23 | | 27 | 27 | 27 |
| | | Acrylic acid | | 18 | 31.5 | | | | 29 | | | |
| | Other polymerizable unsaturated monomers (m-3) | Methyl methacrylate | | | | 2.7 | | | | | | |
| | | Ethyl acrylate | | | | | | | | 36 | | |
| | | Isobutyl methacrylate | | | | 1.8 | | | | | | |
| Perbutyl-O | | | | 0.15 | 0.15 | 0.15 | 0.15 | 0.15 | 0.15 | 2.00 | 0.50 | 0.12 |
| Content of macromonomer (m-1) [Mass %] | | | | 10 | 10 | 10 | 18 | 25 | 35 | 10 | 10 | 10 |
| Content of polymerizable unsaturated monomer having a hydrophilic group (m-2) [Mass %] | | | | 90 | 90 | 86 | 82 | 75 | 29 | 90 | 90 | 90 |

TABLE 9-continued

| | | | | | | | | | |
|---|---|---|---|---|---|---|---|---|---|
| Content of other polymerizable unsaturated monomers (m-3) [Mass %] | | | 0 | 0 | 5 | 0 | 0 | 36 | 0 | 0 | 0 |
| Weight average molecular weight [×10$^4$] | | | 20 | 31 | 31 | 23 | 20 | 20 | 8 | 12 | 38 |

| | | | | Example | Comparative Example | | | | |
|---|---|---|---|---|---|---|---|---|---|
| | | | | 228 | 39 | 40 | 41 | 42 | 43 |
| Diluted fluid of copolymer | | | | RC-98 | RC-99 | RC-100 | RC-101 | RC-102 | RC-103 |
| Monomer Component (m) | Macromonomer (m-1) solution | | Type | m-1-3 | m-1-15 | | m-1-16 | m-1-17 | |
| | | | Quantity | 15.4 | 15.4 | | 15.4 | 15.4 | |
| | Polymerizable unsaturated monomer having a hydrophilic group (m-2) | N-substituted (meth) acrylamide | N,N-dimethyl-acrylamide | 31.5 | 31.5 | 35 | 31.5 | 31.5 | |
| | | | N-isopropyl-acrylamide | 31.5 | 31.5 | 35 | 31.5 | 31.5 | |
| | | Polymerizable unsaturated monomer having a polyoxyalkylene chain | PLEX 6954-0 (*3) | | | | | | 50 |
| | | | N-vinyl-2-pyrrolidone | | | | | | |
| | | | 2-hydroxyethyl acrylate | 27 | 27 | 30 | 27 | 27 | |
| | | | Methacrylic acid | | | | | | 20 |
| | Other polymerizable unsaturated monomers (m-3) | | Methyl methacrylate | | | | | | 30 |
| | | | Ethyl acrylate | | | | | | 10 |
| Perbutyl-O | | | | 0.10 | 0.15 | 0.15 | 0.15 | 0.15 | 0.15 |
| Content of macromonomer (m-1) [Mass %] | | | | 10 | 10 | 0 | 10 | 10 | 0 |
| Content of polymerizable unsaturated monomer having a hydrophilic group (m-2) [Mass %] | | | | 90 | 90 | 100 | 90 | 90 | 60 |
| Content of other polymerizable unsaturated monomers (m-3) [Mass %] | | | | 0 | 0 | 0 | 0 | 0 | 40 |
| Weight average molecular weight [×10$^4$] | | | | 42 | 31 | 31 | 28 | 37 | 31 |

(Note 2)
"NK-ester AM-90G": same as described above.
(Note 3)
"PLEX 6954-0": same as described above.

Production Examples 34 to 47

Synthesis was carried out in the same manner as in Production Example 22, except that the composition shown in Table 10 below was used, thereby obtaining water-dispersible acrylic resin water dispersions (A1-7) to (A1-20).

Table 10 shows the composition of raw materials (parts), solids content (%), acid value (mg KOH/g) and hydroxy value (mg KOH/g) of the water-dispersible acrylic resin water dispersions (A1-7) to (A1-20).

TABLE 10

| Production Example | | | | 34 | 35 | 36 | 37 | 38 | 39 | 40 |
|---|---|---|---|---|---|---|---|---|---|---|
| Water dispersion of water-dispersible acrylic resin | | | | A1-7 | A1-8 | A1-9 | A1-10 | A1-11 | A1-12 | A1-13 |
| Monomer emulsion for core | Deionized water | | | 40 | 40 | 40 | 40 | 40 | 40 | 40 |
| | Adekaria Soap SR-1025 | | | 2.8 | 2.8 | 2.8 | 2.8 | 2.8 | 2.8 | 2.8 |
| | Monomer Component (b) | Polymerizable unsaturated monomer having two or more polymerizable unsaturated groups per molecule | Ethylene glycol dimethacrylate | 2 | 2 | 2 | 2 | | | 2 |
| | | | Methylenebis acrylamide | | | | | | 2 | |
| | | | Allyl methacrylate | 1 | 1 | 1 | 1 | 3 | 1 | 1 |
| | | Polymerizable unsaturated monomer having one polymerizable unsaturated group per molecule | Hydrophobic polymerizable unsaturated monomer (b-1) | n-butyl acrylate | 9 | 6 | 10 | 10 | 10 | 10 | 47 |
| | | | Polymerizable unsaturated monomer having a C1 or C2 alkyl group | Methyl methacrylate | 54 | 55 | 52 | 52 | 48 | 52 | 22 |
| | | | | Ethyl acrylate | 11 | 13 | 12 | 12 | 12 | 12 | 5 |
| Monomer emulsion | Deionized water | | | 17 | 17 | 17 | 17 | 17 | 17 | 17 |
| | Adekaria Soap SR-1025 | | | 1.2 | 1.2 | 1.2 | 1.2 | 1.2 | 1.2 | 1.2 |

TABLE 10-continued

| | | | | | | | | | | | |
|---|---|---|---|---|---|---|---|---|---|---|---|
| for shell | Ammonium persulfate | | | | 0.03 | 0.03 | 0.03 | 0.03 | 0.03 | 0.03 | 0.03 |
| Monomer Component (b) | Hydrophobic polymerizable unsaturated monomer (b-1) | | Styrene | | | 1 | 3 | | 3 | | 3 |
| | | | n-butyl acrylate | | 3 | 4 | 11 | 11 | 11 | 11 | 15 |
| | | | 2-ethylhexyl acrylate | | | | | 3 | | 3 | |
| | Hydroxy-containing polymerizable unsaturated monomer (b-2) | | 2-hydroxy ethyl methacrylate | | 2 | 2 | 2 | 2 | 4 | 2 | 2 |
| | Carboxy-containing polymerizable unsaturated monomer (b-3) | | Methacrylic acid | | 2 | 2 | 2 | 2 | 4 | 2 | 2 |
| | Polymerizable unsaturated monomer (b-4) | Polymerizable unsaturated monomer having a C1 or C2 alkyl group | Methyl methacrylate | | 11 | 9 | 4 | 4 | 4 | 4 | 1 |
| | | | Ethyl acrylate | | 5 | 5 | 1 | 1 | 1 | 1 | |
| 5% 2-(dimethylamino) ethanol solution | | | | | 40 | 40 | 40 | 40 | 40 | 40 | 40 |

| | | Production Example | 34 | 35 | 36 | 37 | 38 | 39 | 40 |
|---|---|---|---|---|---|---|---|---|---|
| Water dispersion of water-dispersible acrylic resin | | | A1-7 | A1-8 | A1-9 | A1-10 | A1-11 | A1-12 | A1-13 |
| Total amount of polymerizable unsaturated monomers (amount of monomer component (b)) [parts] | | | 100 | 100 | 100 | 100 | 100 | 100 | 100 |
| Total amount of core-forming monomer components [parts] | | | 77 | 77 | 77 | 77 | 73 | 77 | 77 |
| Total amount of shell-forming monomer components [parts] | | | 23 | 23 | 23 | 23 | 27 | 23 | 23 |
| Content of each monomer [mass %] based on the total amount of polymerizable unsaturated monomers (amount of monomer component (b)) | Hydrophobic polymerizable unsaturated monomer (b-1) | | 12 | 11 | 24 | 24 | 24 | 24 | 65 |
| | Hydroxy-containing polymerizable unsaturated monomer (b-2) | | 2 | 2 | 2 | 2 | 4 | 2 | 2 |
| | Carboxy-containing polymerizable unsaturated monomer (b-3) | | 2 | 2 | 2 | 2 | 4 | 2 | 2 |
| | Polymerizable unsaturated monomer (b-4) other than the polymerizable unsaturated monomers (b-1) to (b-3) | | 84 | 85 | 72 | 72 | 68 | 72 | 31 |
| Content of core-forming monomers [mass %] based on the total amount of core-forming monomer components | Polymerizable unsaturated monomer having two or more polymerizable unsaturated groups per molecule | | 4 | 4 | 4 | 4 | 4 | 4 | 4 |
| | Polymerizable unsaturated monomer having one polymerizable unsaturated group per molecule | | 96 | 96 | 96 | 96 | 96 | 96 | 96 |
| | Polymerizable unsaturated monomer having a C1 or C2 alkyl group | | 84 | 88 | 83 | 83 | 82 | 83 | 35 |
| Content of shell forming monomers [mass %] based on the total amount of shell-forming monomer components | Hydrophobic polymerizable unsaturated monomer (b-1) | | 13 | 22 | 61 | 61 | 52 | 61 | 78 |
| | Hydroxy-containing polymerizable unsaturated monomer (b-2) | | 9 | 9 | 9 | 9 | 15 | 9 | 9 |
| | Carboxy-containing polymerizable unsaturated monomer (b-3) | | 9 | 9 | 9 | 9 | 15 | 9 | 9 |
| | Polymerizable unsaturated monomer (b-4) other than the polymerizable unsaturated monomers (b-1) to (b-3) | | 70 | 61 | 22 | 22 | 19 | 22 | 4 |
| Solids Content [%] | | | 30 | 30 | 30 | 30 | 30 | 30 | 30 |
| Acid Value [mgKOH/g] | | | 13 | 13 | 13 | 13 | 26 | 13 | 13 |
| Hydroxy Value [mgKOH/g] | | | 9 | 9 | 9 | 9 | 17 | 9 | 9 |

| | | | | Production Example | 41 | 42 | 43 | 44 | 45 | 46 | 47 |
|---|---|---|---|---|---|---|---|---|---|---|---|
| Water dispersion of water-dispersible acrylic resin | | | | | A1-14 | A1-15 | A1-16 | A1-17 | A1-18 | A1-19 | A1-20 |
| Monomer emulsion for core | Deionized water | | | | 40 | 40 | 40 | 40 | 40 | 40 | 57 |
| | Adekaria Soap SR-1025 | | | | 2.8 | 2.8 | 2.8 | 2.8 | 2.8 | 2.8 | 4 |
| | Monomer Component (b) | Polymerizable unsaturated monomer having two or more polymerizable unsaturated groups per | Ethylene glycol dimethacrylate | | 2 | 2 | 2 | 2 | | 2 | 2 |
| | | | Allyl methacrylate | | 1 | 1 | 1 | 1 | | 1 | 1 |

TABLE 10-continued

| | | | | | | | | | |
|---|---|---|---|---|---|---|---|---|---|
| | | molecule | | | | | | | |
| | Polymerizable unsaturated monomer having one polymerizable unsaturated group per molecule | Hydrophobic polymerizable unsaturated monomer (b-1) | Styrene | | | | | | 3 | 3 |
| | | | n-butyl acrylate | 10 | 10 | 10 | 14 | 10 | 21 | 21 |
| | | Hydrophobic polymerizable unsaturated monomer (b-2) | 2-hydroxyethyl methacrylate | | 12 | | | | | 2 |
| | | Carboxy-containing polymerizable unsaturated monomer (b-3) | Methacrylic acid | | | | 8 | | | 2 |
| | | Polymerizable unsaturated monomer having a C1 or C2 alkyl group | Methyl methacrylate | 52 | 43 | 52 | 43 | 54 | 56 | 56 |
| | | | Ethyl acrylate | 12 | 9 | 12 | 9 | 13 | 13 | 13 |
| Monomer emulsion for shell | Deionized water | | | 17 | 17 | 17 | 17 | 17 | 17 | |
| | Adekaria Soap SR-1025 | | | 1.2 | 1.2 | 1.2 | 1.2 | 1.2 | 1.2 | |
| | Ammonium persulfate | | | 0.03 | 0.03 | 0.03 | 0.03 | 0.03 | 0.03 | |
| | Monomer Component (b) | Hydrophobic polymerizable unsaturated monomer (b-1) | Styrene | 3 | 1 | 3 | 1 | 3 | | |
| | | | n-butyl acrylate | 11 | 4 | 11 | 4 | 11 | | |
| | | Hydroxy-containing polymerizable unsaturated monomer (b-2) | 2-hydroxyethyl methacrylate | 0.5 | 9 | 2 | 9 | 2 | 2 | |
| | | Carboxy-containing polymerizable unsaturated monomer (b-3) | Methacrylic acid | 2 | 6 | 0.5 | 6 | 2 | 2 | |
| | | Polymerizable unsaturated monomer (b-4) | Polymerizable unsaturated monomer having a C1 or C2 alkyl group | Methyl methacrylate | 5 | 3 | 5 | 3 | 4 | |
| | | | | Ethyl acrylate | 1.5 | | 1.5 | | 1 | |
| 5% 2-(dimethylamino) ethanol solution | | | | 40 | 40 | 40 | 40 | 40 | 40 | 40 |

| | | Production Example | 41 | 42 | 43 | 44 | 45 | 46 | 47 |
|---|---|---|---|---|---|---|---|---|---|
| Water dispersion of water-dispersible acrylic resin | | | A1-14 | A1-15 | A1-16 | A1-17 | A1-18 | A1-19 | A1-20 |
| Total amount of polymerizable unsaturated monomers (amount of monomer component (b)) [parts] | | | 100 | 100 | 100 | 100 | 100 | 100 | 100 |
| Total amount of core-forming monomer components [parts] | | | 77 | 77 | 77 | 77 | 77 | 96 | 100 |
| Total amount of shell-forming monomer components [parts] | | | 23 | 23 | 23 | 23 | 23 | 4 | 0 |
| Content of each monomer [mass %] based on the total amount of polymerizable unsaturated monomers (amount of monomer component (b)) | | Hydrophobic polymerizable unsaturated monomer (b-1) | 24 | 15 | 24 | 19 | 24 | 24 | 24 |
| | | Hydroxy-containing polymerizable unsaturated monomer (b-2) | 1 | 21 | 2 | 9 | 2 | 2 | 2 |
| | | Carboxy-containing polymerizable unsaturated monomer (b-3) | 2 | 6 | 1 | 14 | 2 | 2 | 2 |
| | | Polymerizable unsaturated monomer (b-4) other than the polymerizable unsaturated monomers (b-1) to (b-3) | 74 | 58 | 74 | 58 | 72 | 72 | 72 |
| Content of core-forming monomers [mass %] based on the total amount of core-forming monomer components | | Polymerizable unsaturated monomer having two or more polymerizable unsaturated groups per molecule | 4 | 4 | 4 | 4 | 0 | 3 | 3 |
| | | Polymerizable unsaturated monomer having one polymerizable unsaturated group per molecule | 96 | 96 | 96 | 96 | 100 | 97 | 97 |
| | | Polymerizable unsaturated monomer having a C1 or C2 alkyl group | 83 | 68 | 83 | 68 | 87 | 72 | 69 |
| Content of shell forming monomers [mass %] based on the total amount of shell-forming monomer components | | Hydrophobic polymerizable unsaturated monomer (b-1) | 61 | 22 | 61 | 22 | 61 | 0 | |

TABLE 10-continued

|  |  |  |  |  |  |  |  |
|---|---|---|---|---|---|---|---|
| | Hydroxy-containing polymerizable unsaturated monomer (b-2) | 2 | 39 | 9 | 39 | 9 | 50 |
| | Carboxy-containing polymerizable unsaturated monomer (b-3) | 9 | 26 | 2 | 26 | 9 | 50 |
| | Polymerizable unsaturated monomer (b-4) other than the polymerizable unsaturated monomers (b-1) to (b-3) | 28 | 13 | 28 | 13 | 22 | 0 |
| Solids Content [%] | | 30 | 30 | 30 | 30 | 30 | 30 | 30 |
| Acid Value [mgKOH/g] | | 13 | 39 | 3 | 91 | 13 | 13 | 13 |
| Hydroxy Value [mgKOH/g] | | 2 | 91 | 9 | 39 | 9 | 9 | 9 |

Further, in Table 10, among the water-dispersible acrylic resin water dispersions (A1-7) to (A1-20), (A1-7) to (A1-17) and (A1-19) correspond to the core-shell-type water-dispersible hydroxy-containing acrylic resin (A1′-1), and (A1-7) to (A1-17) correspond to the core-shell-type water-dispersible hydroxy-containing acrylic resin (A1′-2).

Production of Aqueous Coating Composition

Examples 229 to 275 and Comparative Examples 44 to 50

Aqueous coating compositions (X-85) to (X-138) having a pH of 8.0 and a solids content of 25% were obtained in the same manner as in Example 1, except that the formulation composition shown in Table 11 was used.

TABLE 11

| | | | Example | | | | | | | | | |
|---|---|---|---|---|---|---|---|---|---|---|---|---|
| | | | 229 | 230 | 231 | 232 | 233 | 234 | 235 | 236 | 237 | 238 |
| Aqueous Coating Composition | | | X-85 | X-86 | X-87 | X-88 | X-89 | X-90 | X-91 | X-92 | X-93 | X-94 |
| Copolymer | Diluted fluid of copolymer | Type | RC-67 | RC-68 | RC-69 | RC-70 | RC-71 | RC-72 | RC-73 | RC-74 | RC-75 | RC-76 |
| | | Quantity | 6 | 6 | 6 | 6 | 6 | 6 | 6 | 6 | 6 | 6 |
| Water-dispersible acrylic resin (A1′) | Water dispersion of water-dispersible acrylic resin | Type | A1-9 | A1-9 | A1-9 | A1-9 | A1-9 | A1-9 | A1-9 | A1-9 | A1-9 | A1-9 |
| | | Quantity | 100 | 100 | 100 | 100 | 100 | 100 | 100 | 100 | 100 | 100 |
| Curing agent (B) | Melamine resin (B-1) | | 50 | 50 | 50 | 50 | 50 | 50 | 50 | 50 | 50 | 50 |
| Polyester resin | Hydroxy-containing polyester resin solution | Type | A2-1 | A2-1 | A2-1 | A2-1 | A2-1 | A2-1 | A2-1 | A2-1 | A2-1 | A2-1 |
| | | Quantity | 43 | 43 | 43 | 43 | 43 | 43 | 43 | 43 | 43 | 43 |
| Acrylic resin | Hydroxy-containing acrylic resin solution (A1-6) | | 18 | 18 | 18 | 18 | 18 | 18 | 18 | 18 | 18 | 18 |
| Aluminium pigment dispersion | | Type | P-1 | P-1 | P-1 | P-1 | P-1 | P-1 | P-1 | P-1 | P-1 | P-1 |
| | | Quantity | 62 | 62 | 62 | 62 | 62 | 62 | 62 | 62 | 62 | 62 |
| Viscosity $V_1$ at a rate of shear of 1000 sec$^{-1}$ [Pa-sec] | | | 0.04 | 0.04 | 0.03 | 0.03 | 0.03 | 0.03 | 0.046 | 0.051 | 0.06 | 0.06 |
| Viscosity $V_2$ at a rate of shear of 0.1 sec$^{-1}$ [Pa-sec] | | | 39 | 44 | 37 | 34 | 31 | 35 | 54 | 58 | 63 | 49 |

| | | | Example | | | | | | |
|---|---|---|---|---|---|---|---|---|---|
| | | | 239 | 240 | 241 | 242 | 243 | 244 | 245 |
| Aqueous Coating Composition | | | X-95 | X-96 | X-97 | X-98 | X-99 | X-100 | X-101 |
| Copolymer | Diluted fluid of copolymer | Type | RC-77 | RC-78 | RC-79 | RC-80 | RC-81 | RC-82 | RC-83 |
| | | Quantity | 6 | 6 | 6 | 6 | 6 | 6 | 6 |
| Water-dispersible acrylic resin (A1′) | Water dispersion of water-dispersible acrylic resin | Type | A1-9 | A1-9 | A1-9 | A1-9 | A1-9 | A1-9 | A1-9 |
| | | Quantity | 100 | 100 | 100 | 100 | 100 | 100 | 100 |
| Curing agent (B) | Melamine resin (B-1) | | 50 | 50 | 50 | 50 | 50 | 50 | 50 |
| Polyester resin | Hydroxy-containing polyester resin | Type | A2-1 | A2-1 | A2-1 | A2-1 | A2-1 | A2-1 | A2-1 |
| | | Quantity | 43 | 43 | 43 | 43 | 43 | 43 | 43 |
| Acrylic resin | Hydroxy-containing acrylic resin solution (A1-6) | | 18 | 18 | 18 | 18 | 18 | 18 | 18 |
| Aluminium pigment dispersion | | Type | P-1 | P-1 | P-1 | P-1 | P-1 | P-1 | P-1 |
| | | Quantity | 62 | 62 | 62 | 62 | 62 | 62 | 62 |

TABLE 11-continued

| | | | | | | | | | |
|---|---|---|---|---|---|---|---|---|---|
| Viscosity $V_1$ at a rate of shear of 1000 $sec^{-1}$[Pa-sec] | | | 0.06 | 0.06 | 0.04 | 0.05 | 0.04 | 0.06 | 0.04 |
| Viscosity $V_2$ at a rate of shear of 0.1 $sec^{-1}$[Pa-sec] | | | 49 | 48 | 36 | 40 | 40 | 46 | 44 |

| | | | Example | | | | | | |
|---|---|---|---|---|---|---|---|---|---|
| | | | 246 | 247 | 248 | 249 | 250 | 251 | 252 |
| Aqueous Coating Composition | | | X-102 | X-103 | X-104 | X-105 | X-106 | X-107 | X-108 |
| Copolymer | Diluted fluid of copolymer | Type | RC-84 | RC-85 | RC-86 | RC-87 | RC-88 | RC-89 | RC-90 |
| | | Quantity | 6 | 6 | 6 | 6 | 6 | 6 | 6 |
| Water-dispersible acrylic resin (A1') | Water dispersion of water-dispersible acrylic resin | Type | A1-9 | A1-9 | A1-9 | A1-9 | A1-9 | A1-9 | A1-10 |
| | | Quantity | 100 | 100 | 100 | 100 | 100 | 100 | 100 |
| Curing agent (B) | Melamine resin (B-1) | | 50 | 50 | 50 | 50 | 50 | 50 | 50 |
| Polyester resin | Hydroxy-containing polyester resin | Type | A2-1 | A2-1 | A2-1 | A2-1 | A2-1 | A2-1 | A2-1 |
| | | Quantity | 43 | 43 | 43 | 43 | 43 | 43 | 43 |
| Acrylic resin | Hydroxy-containing acrylic resin solution (A1-6) | | 18 | 18 | 18 | 18 | 18 | 18 | 18 |
| Aluminium pigment dispersion | | Type | P-1 | P-1 | P-1 | P-1 | P-1 | P-1 | P-1 |
| | | Quantity | 62 | 62 | 62 | 62 | 62 | 62 | 62 |
| Viscosity $V_1$ at a rate of shear of 1000 $sec^{-1}$[Pa-sec] | | | 0.04 | 0.04 | 0.05 | 0.06 | 0.04 | 0.06 | 0.04 |
| Viscosity $V_2$ at a rate of shear of 0.1 $sec^{-1}$[Pa-sec] | | | 41 | 31 | 48 | 44 | 31 | 45 | 49 |

| | | | Example | | | | | | | | | |
|---|---|---|---|---|---|---|---|---|---|---|---|---|
| | | | 253 | 254 | 255 | 256 | 257 | 258 | 259 | 260 | 261 | 262 |
| Aqueous Coating Composition | | | X-109 | X-110 | X-111 | X-112 | X-113 | X-114 | X-115 | X-116 | X-117 | X-118 |
| Copolymer | Diluted fluid of copolymer | Type | RC-91 | RC-92 | RC-93 | RC-94 | RC-95 | RC-96 | RC-97 | RC-98 | RC-68 | RC-68 |
| | | Quantity | 6 | 6 | 6 | 6 | 6 | 6 | 6 | 6 | 6 | 6 |
| Water-dispersible acrylic resin (A1') | Water dispersion of water-dispersible acrylic resin | Type | A1-10 | A1-9 | A1-9 | A1-9 | A1-9 | A1-9 | A1-9 | A1-9 | A1-7 | A1-8 |
| | | Quantity | 100 | 100 | 100 | 100 | 100 | 100 | 100 | 100 | 100 | 100 |
| Curing agent (B) | Melamine resin (B-1) | | | 50 | 50 | 50 | 50 | 50 | 50 | 50 | 50 | 50 |
| | Melamine resin (B-2)(*4) | | 38 | | | | | | | | | |
| Polyester resin | Hydroxy-containing polyester resin | Type | A2-1 | A2-1 | A2-1 | A2-1 | A2-1 | A2-1 | A2-1 | A2-1 | A2-1 | A2-1 |
| | | Quantity | 43 | 43 | 43 | 43 | 43 | 43 | 43 | 43 | 43 | 43 |
| Acrylic resin | Hydroxy-containing acrylic resin solution (A1-6) | | 18 | 18 | 18 | 18 | 18 | 18 | 18 | 18 | 18 | 18 |
| Aluminium pigment dispersion | | Type | P-1 | P-1 | P-1 | P-1 | P-1 | P-1 | P-1 | P-1 | P-1 | P-1 |
| | | Quantity | 62 | 62 | 62 | 62 | 62 | 62 | 62 | 62 | 62 | 62 |
| Viscosity $V_1$ at a rate of shear of 1000 $sec^{-1}$[Pa-sec] | | | 0.04 | 0.05 | 0.07 | 0.07 | 0.03 | 0.033 | 0.05 | 0.06 | 0.05 | 0.05 |
| Viscosity $V_2$ at a rate of shear of 0.1 $sec^{-1}$[Pa-sec] | | | 49 | 49 | 49 | 45 | 30 | 31 | 65 | 66 | 38 | 41 |

| | | | Example | | | | | | | | | |
|---|---|---|---|---|---|---|---|---|---|---|---|---|
| | | | 263 | 264 | 265 | 266 | 267 | 268 | 269 | 270 | 271 | 272 |
| Aqueous Coating Composition | | | X-119 | X-120 | X-121 | X-122 | X-123 | X-124 | X-125 | X-126 | X-127 | X-128 |
| Copolymer | Diluted fluid of copolymer | Type | RC-68 | RC-68 | RC-68 | RC-68 | RC-68 | RC-68 | RC-68 | RC-68 | RC-68 | RC-68 |
| | | Quantity | 6 | 6 | 6 | 6 | 6 | 6 | 6 | 6 | 6 | 6 |
| Water-dispersible acrylic resin (A1') | Water dispersion of water-dispersible acrylic resin | Type | A1-10 | A1-11 | A1-12 | A1-13 | A1-14 | A1-15 | A1-16 | A1-17 | A1-18 | A1-19 |
| | | Quantity | 100 | 100 | 120 | 100 | 100 | 100 | 100 | 100 | 100 | 100 |
| Curing agent (B) | Melamine resin (B-1) | | 50 | 50 | 40 | 50 | 50 | 50 | 50 | 50 | 50 | 50 |
| | Bayhydur VPLS2310 (*5) | | | | 26 | | | | | | | |
| Polyester resin | Hydroxy-containing polyester resin | Type | A2-1 | A2-1 | A2-1 | A2-1 | A2-1 | A2-1 | A2-1 | A2-1 | A2-1 | A2-1 |
| | | Quantity | 43 | 43 | 43 | 43 | 43 | 43 | 43 | 43 | 43 | 43 |
| Acrylic resin | Hydroxy-containing acrylic resin solution (A1-6) | | 18 | 18 | | 18 | 18 | 18 | 18 | 18 | 18 | 18 |

TABLE 11-continued

|  |  |  | | | | | | | | | | | |
|---|---|---|---|---|---|---|---|---|---|---|---|---|---|
| Aluminium pigment dispersion | Type | | P-1 | P-1 | P-1 | P-1 | P-1 | P-1 | P-1 | P-1 | P-1 | P-1 |
| | Quantity | | 62 | 62 | 62 | 62 | 62 | 62 | 62 | 62 | 62 | 62 |
| Viscosity $V_1$ at a rate of shear of 1000 sec$^{-1}$[Pa-sec] | | | 0.05 | 0.06 | 0.05 | 0.06 | 0.05 | 0.07 | 0.04 | 0.06 | 0.08 | 0.05 |
| Viscosity $V_2$ at a rate of shear of 0.1 sec$^{-1}$[Pa-sec] | | | 45 | 48 | 45 | 55 | 44 | 42 | 43 | 64 | 57 | 47 |

|  |  |  | Example | | | Comparative Example | | | | | | |
|---|---|---|---|---|---|---|---|---|---|---|---|---|
|  |  |  | 273 | 274 | 275 | 44 | 45 | 46 | 47 | 48 | 49 | 50 |
| Aqueous Coating Composition | | | X-129 | X-130 | X-131 | X-132 | X-133 | X-134 | X-135 | X-136 | X-137 | X-138 |
| Copolymer | Diluted fluid of copolymer | Type | RC-68 | RC-68 | RC-68 | RC-99 | RC-100 | RC-101 | RC-102 | RC-103 | | |
| | | Quantity | 6 | 6 | 6 | 6 | 6 | 6 | 6 | 6 | | |
| Water-dispersible acrylic resin (A1') | Water dispersion of water-dispersible acrylic resin | Type | A1-20 | A1-9 | A1-9 | A1-9 | A1-9 | A1-9 | A1-9 | A1-9 | A1-9 | A1-9 |
| | | Quantity | 100 | 100 | 100 | 100 | 100 | 100 | 100 | 100 | 100 | 100 |
| Curing agent (B) | Melamine resin (B-1) | | 50 | 50 | 50 | 50 | 50 | 50 | 50 | 50 | 50 | 50 |
| Polyester resin | Hydroxy-containing polyester resin | Type | A2-1 | A2-2 | A2-3 | A2-1 | A2-1 | A2-1 | A2-1 | A2-1 | A2-1 | A2-1 |
| | | Quantity | 43 | 43 | 43 | 43 | 43 | 43 | 43 | 43 | 43 | 43 |
| Acrylic resin | Hydroxy-containing acrylic resin solution (A1-6) | | 18 | 18 | 18 | 18 | 18 | 18 | 18 | 18 | 18 | 18 |
| Aluminium pigment dispersion | | Type | P-1 | P-1 | P-2 | P-1 | P-1 | P-1 | P-1 | P-1 | P-1 | P-1 |
| | | Quantity | 62 | 62 | 62 | 62 | 62 | 62 | 62 | 62 | 62 | 62 |
| Viscosity-controlling agent | ACRYSOL RM-825 (*6) | | | | | | | | | | 4.8 | |
| Viscosity $V_1$ at a rate of shear of 1000 sec$^{-1}$[Pa-sec] | | | 0.05 | 0.03 | 0.03 | 0.02 | 0.01 | 0.02 | 0.05 | 0.03 | 0.04 | 0.02 |
| Viscosity $V_2$ at a rate of shear of 0.1 sec$^{-1}$[Pa-sec] | | | 38 | 40 | 32 | 4 | 2 | 14 | 19 | 14 | 4 | 1 |

(Note 4)
Melamine resin (B-2): same as described above.
(Note 5)
"Bayhydur VPLS2310": same as described above.
(Note 6)
"ACRYSOL RM-825": same as described above.

Method of Forming Coating Films

Examples 276 to 322 and Comparative Examples 51 to 57

Test panels of Examples 276 to 322 and Comparative Examples 51 to 57 were obtained in the same manner as in Example 58, except that the aqueous coating composition shown in Table 12 was used in place of the aqueous coating composition (X-1).

Evaluation Test 3

Each test panel obtained in Examples 276 to 322 and Comparative Examples 51 to 57 was tested for smoothness, DOI, flip-flop property, metallic mottling, and water resistance. The test methods are as follows:

Smoothness: Smoothness was evaluated for each test panel based on the Long Wave (LW) values measured by "Wave Scan" (product name, manufactured by BYK-Gardner). The lower the LW value, the higher the smoothness of the coated surface.

DOI, flip-flop property, metallic mottling, and water resistance were tested and evaluated according to the method described in the Evaluation Test 1.

For coating vehicles and the like in the field to which the present invention pertains, high smoothness is preferred, in addition to excellent DOI, flip-flop property, metallic mottling, and water resistance. Accordingly, in the Evaluation Test 3, the comprehensive evaluation was conducted according to the following criteria:

A: The smoothness ((LW) value) is 10 or lower, DOI ((SW) value) is 12 or lower, and all of the flip-flop property, metallic mottling, and water resistance are A.

B: The smoothness ((LW) value) is 10 or lower, DOI ((SW) value) is 12 or lower, and each of the flip-flop property, metallic mottling, and water resistance is either A or B, with at least one of them being B.

C: The smoothness ((LW) value) is 10 or lower, DOI ((SW) value) is 12 or lower, and each of the flip-flop property, metallic mottling, and water resistance is A, B, or C, with at least one of them being C.

D: The smoothness ((LW) value) is 11 or higher, DOI ((SW) value) is 13 or higher, or at least one of the flip-flop property, metallic mottling, and water resistance is D.

Table 12 shows the test results of the coating film performance.

TABLE 12

|  |  | Aqueous coating composition | Smoothness | DOI | Luster Flip-flop property | Luster Metallic mottling | Water resistance | Comprehensive evaluation |
|---|---|---|---|---|---|---|---|---|
| Example | 276 | X-85 | 7 | 8 | A | A | A | A |
|  | 277 | X-86 | 7 | 7 | A | A | A | A |
|  | 278 | X-87 | 6 | 8 | A | A | A | A |
|  | 279 | X-88 | 6 | 8 | A | A | A | A |
|  | 280 | X-89 | 6 | 9 | A | A | A | A |
|  | 281 | X-90 | 6 | 8 | A | A | A | A |
|  | 282 | X-91 | 8 | 8 | A | A | A | A |
|  | 283 | X-92 | 8 | 8 | A | A | A | A |
|  | 284 | X-93 | 9 | 8 | A | A | A | A |
|  | 285 | X-94 | 9 | 8 | B | A | B | B |
|  | 286 | X-95 | 9 | 8 | B | A | A | B |
|  | 287 | X-96 | 9 | 8 | B | A | A | B |
|  | 288 | X-97 | 7 | 9 | A | A | A | A |
|  | 289 | X-98 | 9 | 9 | B | A | B | B |
|  | 290 | X-99 | 7 | 8 | A | A | A | A |
|  | 291 | X-100 | 9 | 8 | B | A | A | B |
|  | 292 | X-101 | 7 | 8 | A | B | A | B |
|  | 293 | X-102 | 7 | 8 | A | B | A | B |
|  | 294 | X-103 | 7 | 9 | B | B | A | B |
|  | 295 | X-104 | 8 | 8 | A | A | A | A |
|  | 296 | X-105 | 9 | 8 | B | A | A | B |
|  | 297 | X-106 | 7 | 9 | B | A | A | B |
|  | 298 | X-107 | 9 | 8 | B | A | A | B |
|  | 299 | X-108 | 7 | 7 | A | A | A | A |
|  | 300 | X-109 | 7 | 7 | A | A | B | B |
|  | 301 | X-110 | 8 | 8 | A | A | A | A |
|  | 302 | X-111 | 10 | 9 | B | A | A | B |
|  | 303 | X-112 | 10 | 10 | B | A | B | B |
|  | 304 | X-113 | 6 | 9 | B | B | A | B |
|  | 305 | X-114 | 6 | 8 | A | A | A | A |
|  | 306 | X-115 | 8 | 7 | A | B | A | B |
|  | 307 | X-116 | 9 | 7 | B | B | A | B |
|  | 308 | X-117 | 8 | 8 | B | B | B | B |
|  | 309 | X-118 | 8 | 8 | B | A | B | B |
|  | 310 | X-119 | 8 | 8 | A | B | A | B |
|  | 311 | X-120 | 9 | 8 | A | B | B | B |
|  | 312 | X-121 | 8 | 8 | A | B | A | B |
|  | 313 | X-122 | 9 | 9 | A | B | A | B |
|  | 314 | X-123 | 8 | 8 | A | A | B | B |
|  | 315 | X-124 | 10 | 8 | B | B | B | B |
|  | 316 | X-125 | 7 | 8 | A | B | A | B |
|  | 317 | X-126 | 9 | 10 | B | A | B | B |
|  | 318 | X-127 | 10 | 8 | B | B | B | B |
|  | 319 | X-128 | 8 | 8 | A | B | B | B |
|  | 320 | X-129 | 8 | 9 | B | B | B | B |
|  | 321 | X-130 | 6 | 9 | A | A | B | B |
|  | 322 | X-131 | 6 | 9 | B | B | A | B |
| Comparative Example | 51 | X-132 | 25 | 25 | D | D | A | D |
|  | 52 | X-133 | 27 | 27 | D | D | A | D |
|  | 53 | X-134 | 25 | 14 | D | D | A | D |
|  | 54 | X-135 | 25 | 16 | D | D | A | D |
|  | 55 | X-136 | 16 | 16 | C | C | A | D |
|  | 56 | X-137 | 24 | 25 | D | D | A | D |
|  | 57 | X-138 | 30 | 30 | D | D | A | D |

The invention claimed is:

1. An aqueous coating composition containing a copolymer obtained by copolymerization of a monomer component (m) comprising:

(m-1) a macromonomer having (i) a backbone that comprises a polymer chain having a number average molecular weight of 1,000 to 10,000 obtained by polymerizing a monomer component (I) that contains 5 to 100 mass % of a C4-C24 alkyl-containing polymerizable unsaturated monomer (a), and (ii) a polymerizable unsaturated group; and (m-2) a polymerizable unsaturated monomer containing a hydrophilic group, and a film-forming resin (A), wherein a proportion of the copolymer is in a range of 0.1 to 5 parts by mass, based on 100 parts by mass of the film-forming resin (A).

2. The aqueous coating composition according to claim 1, wherein the film-forming resin (A) is a water-dispersible hydroxy-containing acrylic resin (A1') having an acid value of 1 to 100 mg KOH/g and a hydroxy value of 1 to 100 mg KOH/g, obtained through copolymerization of a monomer component (b) comprising 5 to 70 mass % of a hydrophobic polymerizable unsaturated monomer (b-1), 0.1 to 25 mass % of a hydroxy-containing polymerizable unsaturated monomer (b-2), 0.1 to 20 mass % of a carboxy-containing polymerizable unsaturated monomer (b-3), and 0 to 94.8 mass % of a polymerizable unsaturated monomer (b-4) other than the polymerizable unsaturated monomers (b-1) to (b-3).

3. The aqueous coating composition according to claim 2, wherein component (m-2) is at least one kind of polymerizable unsaturated monomer selected from the group consisting of N-substituted (meth)acrylamide, polymerizable unsaturated monomer having a polyoxyalkylene chain, N-vinyl-2-pyrrolidone, 2-hydroxyethyl acrylate, acrylic acid and methacrylic acid.

4. The aqueous coating composition according to claim 2, wherein the water-dispersible hydroxy-containing acrylic resin (A1') is a core-shell-type water-dispersible hydroxy-containing acrylic resin (A1'-1), which has a core-shell structure having, as a core, copolymer (I) containing, as monomer components, 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule, based on the total mass of monomer components constituting the core, and wherein the core-shell-type water-dispersible hydroxy-containing acrylic resin (A 1'-1) contains 5 to 70 mass % of a hydrophobic polymerizable unsaturated monomer (b-1), 0.1 to 25 mass % of a hydroxy-containing polymerizable unsaturated monomer (b-2), 0.1 to 20 mass % of carboxy-containing polymerizable unsaturated monomer (b-3), and 0 to 94.8 mass % of a polymerizable unsaturated monomer (b-4) other than the polymerizable unsaturated monomers (b-1) to (b-3), based on the total mass of monomer components constituting the core and the shell.

5. The aqueous coating composition according to claim 2, wherein the water-dispersible hydroxy-containing acrylic resin (A1') is a core-shell-type water-dispersible hydroxy-containing acrylic resin (A1'-2) comprising a core portion that is a copolymer (I) consisting of, as monomer components, about 0.1 to 30 mass % of a polymerizable unsaturated monomer having two or more polymerizable unsaturated groups per molecule and about 70 to 99.9 mass % of a polymerizable unsaturated monomer having one polymerizable unsaturated group per molecule; and a shell portion that is a copolymer (II) consisting of, as monomer components, 5 to 80 mass % of a hydrophobic polymerizable unsaturated monomer (b-1), 0.1 to 50 mass % of a hydroxy-containing polymerizable unsaturated monomer (b-2), 0.1 to 50 mass % of a carboxy-containing polymerizable unsaturated monomer (b-3), and 0 to 94.8 mass % of polymerizable unsaturated monomer (b-4) other than the polymerizable unsaturated monomers (b-1) to (b-3), and wherein a solids content mass ratio of copolymer (I) to copolymer (II) is in a range of 5/95 to 95/5.

6. The aqueous coating composition according to claim 1, wherein monomer component (m) contains 1 to 40 mass % of component (m-1) and 5 to 99 mass % of component (m-2), based on the total mass of monomer component (m).

7. The aqueous coating composition according to claim 1, wherein the film-forming resin (A) is a resin having an ester bond.

8. The aqueous coating composition according to claim 1, wherein the film-forming resin (A) is a water-dispersible acrylic resin obtained by emulsion polymerization using a surfactant.

* * * * *